US007117186B2

(12) United States Patent
Koza et al.

(10) Patent No.: US 7,117,186 B2
(45) Date of Patent: Oct. 3, 2006

(54) METHOD AND APPARATUS FOR AUTOMATIC SYNTHESIS OF CONTROLLERS

(75) Inventors: John R. Koza, 25372 La Rena La., Los Altos Hills, CA (US) 94022; Martin A. Keane, Chicago, IL (US); Jessen Yu, Sunnyvale, CA (US); Forrest H Bennett, III, Palo Alto, CA (US); William Mydlowec, Sunnyvale, CA (US)

(73) Assignee: John R. Koza, Los Altos Hills, CA (US)

( * ) Notice: Subject to any disclaimer, the term of this patent is extended or adjusted under 35 U.S.C. 154(b) by 422 days.

(21) Appl. No.: 10/355,443

(22) Filed: Jan. 30, 2003

(65) Prior Publication Data
US 2004/0030414 A1   Feb. 12, 2004

Related U.S. Application Data

(63) Continuation of application No. 09/393,863, filed on Sep. 10, 1999, now Pat. No. 6,564,194.

(51) Int. Cl.
*G08N 5/00* (2006.01)
(52) U.S. Cl. .......................... 706/13; 706/45
(58) Field of Classification Search ................. 706/13; 703/6, 14
See application file for complete search history.

(56) References Cited

U.S. PATENT DOCUMENTS

| | | | |
|---|---|---|---|
| 5,867,397 A * | 2/1999 | Koza et al. .............. | 703/14 |
| 6,360,191 B1 * | 3/2002 | Koza et al. .............. | 703/6 |
| 6,424,959 B1 * | 7/2002 | Bennett et al. ........... | 706/13 |
| 6,532,453 B1 * | 3/2003 | Koza et al. .............. | 706/13 |
| 6,564,194 B1 * | 5/2003 | Koza et al. .............. | 706/13 |

* cited by examiner

*Primary Examiner*—Wilbert L. Starks, Jr.
(74) *Attorney, Agent, or Firm*—Blakely, Sokoloff, Taylor & Zafman LLP

(57) ABSTRACT

A general automated method for synthesizing the design of both the topology and parameter values for controllers is described. The automated method automatically makes decisions concerning the total number of signal processing blocks to be employed in the controller, the type of each signal processing block, the topological interconnections between the signal processing blocks, the values of all parameters for the signal processing blocks, and the existence, if any, of internal feedback between the signal processing blocks within the controller. The general automated method can simultaneously optimize prespecified performance metrics (such as minimizing the time required to bring the plant outputs to the desired values as measured by the integral of the time-weighted absolute error or the integral of the squared error), satisfy time-domain constraints (such as overshoot, disturbance rejection, limits on control variables, and limits on state variables), and satisfy frequency domain constraints (bandwidth).

12 Claims, 26 Drawing Sheets

```
1)   .PID controller and two-lag plant
2)   *
3)   * Control variable (output of controller) is at 590
4)   * Reference signal is at 508
5)   * Plant output (feedback to controller) is at 596 (594)
6)   *
7)   X1   508   596      512     SUBV_SUBCKT
8)   B2   538   0        V=V(512) *214.0
9)   B3   548   0        V=V(512) *1000.0
10)  X4   548   0        568     DII_SUBCKT
11)  B5   558   0        V=V(512) *15.5
12)  X6   558   578              DIFFB_SUBCKT
13)  X7   538   568      578  590 ADD3_SUBCKT
14)  *
15)  * 2-Lag plant
16)  * Plant input is at 590
17)  * Plant output (feedback to controller) is at 596 (594)
18)  *
19)  X8   590   626      622  624 LIMIT_SUBCKT
20)  X9   626   632      636     LAG_SUBCKT
21)  X10  636   642      594     LAG_SUBCKT
22)  V11  622   0        DC   40
23)  V12  624   0        DC   -40
24)  V13  632   0        DC   1
25)  V14  642   0        DC   1
26)  *
27)  * Calculation of integral of time-weighted error (ITAE)
28)  *
29)  X15  508   594      508  7  ITAE_SUBCKT
30)  *
31)  * Reference signal 508
32)  *
33)  VP16 508   0        PULSE(0.0  1  0.1  0.001  0.001  10  15)
34)  *
35)  * Commands to SPICE for transient analysis and plot
36)  *
37)  .TRAN 0.08  9.6  0.0  0.04  UIC
38)  .PLOT TRAN V(7)
39)  *
40)  * Subcircuit Definition for SUBV
41)  *
42)  .SUBCKT SUBV  1   2   3
43)  B1            3   0         V=V(1)-V(2)
44)  .ENDS SUBV
45)  *
46)  * Subcircuit Definition for ADDV
47)  *
48)  .SUBCKT ADDV  1   2   3
49)  B1            3   0         V=V(1)+V(2)
50)  .ENDS ADDV
51)  *
52)  * Subcircuit Definition for ADD3
53)  *
54)  .SUBCKT ADD3  1   2   3   4
55)  B1            4   0         V=V(1)+V(2)+V(3)
56)  .ENDS ADD3
57)  *
```

FIG. 10a

```
58)  * Subcircuit Definition for INVERTER
59)  *
60)  .SUBCKT INVERTER_SUBCKT 1 2
61)  B1           2 0           V=-V(1)
62)  .ENDS INVERTER_SUBCKT
63)  *
64)  * Subcircuit Definition for MULV
65)  *
66)  .SUBCKT MULV 1 2 3
67)  B1           3 0           V=V(1) *V(2)
68)  .ENDS MULV*
69)  *
70)  * Subcircuit Definition for DIVV
71)  *
72)  .SUBCKT DIVV 1 2 3
73)  B1           3 0           V=V(1) / V(2)
74)  .ENDS DIVV
75)  *
76)  * Subcircuit Definition for ABSV
77)  *
78)  .SUBCKT ABSV 1 2
79)  B1           2 0           V=ABS (V(1))
80)  .ENDS ABSV
81)  *
82)  * Subcircuit Definition for DIFFB (DERIVATIVE)
83)  *
84)  .SUBCKT DIFFB_SUBCKT 1 2
85)  G1           4 0 1 0       1
86)  L1           4 0           1
87)  B1           2 0           V=-V(4)
88)  .ENDS DIFFB_SUBCKT
89)  *
90)  * Subcircuit Definition for DII
91)  *
92)  .SUBCKT DII_SUBCKT 1 2 3
93)  G1           4 0 1 2       1
94)  R1           4 0           1000Meg
95)  C1           4 0           1 TC=0V
96)  X1           4 3           INVERTER_SUBCKT
97)  .ENDS DII_SUBCKT
98)  *
99)  * Subcircuit DEFINITION for LAG
100) *
101) .SUBCKT LAG_SUBCKT 1 2 3
102) X1           1 3 4         DII_SUBCKT
103) X2           4 5 3         MULV
104) X3           6 2 5         DIVV
105) V1           6 0           DC 1
106) .ENDS LAG_SUBCKT
107) *
108) * Subcircuit Definition for LEAD
109) *
110) .SUBCKT LEAD_SUBCKT 1 2 3
111) X1           1 4           DIFF_SUBCKT
112) X2           2 4 5         MULV
113) X3           1 5 3         ADDV
114) .ENDS LEAD_SUBCKT
```

FIG. 10b

```
115) *
116) * Subcircuit Definition for LAG2
117) *
118) .SUBCKT LAG2_SUBCKT 1 2 3 4
119) X1           1  4  5            DII_SUBCKT
120) B2           6  0
121) + V=0.5 * V(5) * V(2) / V(3)
122) X3           6  7  4            LAG_SUBCKT
123) B1           7  0
124) .ENDS LAG2_SUBCKT
125) *
126) * Subcircuit Definition for LIMIT
127) *
128) .SUBCKT LIMIT_SUBCKT 1 2 3 4
129) B1           2  0
130) + V=URAMP (V(1) - V(4)) + V(4) - URAMP (V(1) - V(3))
131) .ENDS LIMIT_SUBCKT
132) *
133) * Model for SSW
134) *
135) .MODEL SSW SW()
136) *
137) * Subcircuit Definition for ITAE
138) *
139) .SUBCKT ITAE_SUBCKT 31 32 34 33
140) VOSPCT       3  0              DC 0.02V
141) VOSPEN      11  0              DC 10V
142) X1           6 34  4           DIVV
143) V2          10  0              DC 1
144) X3           9 12  7           MULV
145) S4          11  9  4  3        SSW
146) S5          14 13 31  0        SSW
147) V6          14  0              DC 1
148) X7          15 34 33           DIVV
149) X8           7 18 17           MULV
150) X9           6 12              ABSV
151) X10         32 31  6           SUBV
152) X11         13  0 18           DII_SUBCKT
153) X12         17  0 15           DII_SUBCKT
154) R13          9 10              1k
155) R14          0 13              1k
156) R15          0 33              1k
157) .ENDS ITAE_SUBCKT
158) *
159) * END command for SPICE input file
160) *
161) .END
```

FIG. 10c

METHOD AND APPARATUS FOR AUTOMATIC SYNTHESIS OF CONTROLLERS

RELATED APPLICATIONS

This application is a continuation of currently U.S. patent application Ser. No. 09/393,863, filed on Sep. 10, 1999 now U.S. Pat. No. 6,564,194.

FIELD OF THE INVENTION

The present invention relates to the field of automatic synthesis of complex structures; more particularly, the present invention relates to the automatic synthesis of the topology and parameter values for controllers and control systems.

BACKGROUND OF THE INVENTION

Controllers (control systems) are ubiquitous in industry. A purpose of a controller is to solicit an actual response of a system that is to be controlled (conventionally called the plant) to match a desired response (called the reference signal or command signal).

There are many different measures of merit that are commonly used for controllers. For example, it is common to want to minimize the time required to bring about the desired response of the plant. For example, the occupant of a chilly room may set a thermostat to request that the room temperature be raised to 70 degrees. The reference signal is 70 degrees. The controller causes fuel to flow into the furnace so as to cause the furnace to heat the room to 70 degrees. As the temperature of the room is rising, the controller may measure the difference between the reference signal (the desired temperature) and the room's actual temperature (the plant response). The measure of merit for this controller may be based on the amount of time it takes to warm the room to the desired temperature.

The measure of merit for a controller typically involves several different (and usually conflicting) considerations. For example, in addition to wanting to minimize the time required to bring about the desired change in the plant, it is also common to simultaneously want to avoid significantly overshooting the desired values for the plant response. For example, although the occupant wants the temperature to reach 70 degrees quickly, he doesn't want to accomplish this goal by first raising the temperature to 110 degrees (overshooting the reference signal) and then letting the room cool to the desired 70 degrees. In fact, it would be ideal if the temperature quickly rose to 70 degrees without any overshoot above 70 degrees.

The cost of energy is often a major additional competing consideration in measuring the merit of a controller. Different strategies for causing a plant to reach a desired state generally have a different cost in terms of the cost of energy. Thus, the measure of merit for a controller may consist of a specified mixture reflecting the time required to bring about the desired change in the plant, the energy required to effect the change, and the avoidance of overshoot.

In addition to the above considerations, it is common to place certain practical limits on the value of the control variable(s) so that the plant is not presented with extreme values for the control variable(s). For example, a limiter would prevent a control variable from heating the room to 110 degrees. Similarly, it is common to place certain practical limits on the plant's internal state variables so that they do not exceed certain prespecified limits.

Furthermore, since all real world plants and controllers are imperfect devices, it is also desirable that a controller operate robustly in the face of perturbations or disturbances in the actual behavior of the plant or controller. It is also desirable to suppress and ignore high frequency noise in the reference signal, the control variable, and the actual plant response.

Real-world controllers must consider the fact that the actual value of a control variable must be finite (e.g., cannot be an impulse of infinite amplitude) and that real-world plants do not respond instantaneously.

Many, if not most, real-world controllers are operated manually. However, the focus here is on automatic controllers—that is, controllers that automatically process reference signal(s) and plant output(s) (and possibly other inputs) in order to create the control signals.

The underlying principles of controllers are broadly the same whether the system is mechanical, electrical, thermodynamic, hydraulic, biological, economic, etc. and whether the variable of interest is temperature, velocity, voltage, water pressure, interest rates, heart rate, humidity, etc. Moreover, many controllers incorporate elements from several different engineering domains. For example, the variable of interest for a home heating system is temperature, the setting of the thermostat and the room's current temperature are usually converted into an electrical signal, these electrical signals are usually processed by an electrical controller (analog or digital), the control mechanism is usually a mechanical valve that permits oil to flow into the furnace, while the furnace is a thermodynamic system.

In spite of the multidisciplinary aspects of control engineering, there are several reasons why it is often convenient to discuss controllers in purely electrical terms. First, many real-world sensors, reference signals, control variables, and controllers are, in fact, electrical. Second, regardless of whether the controller or plant is actually electrical, control engineers often use electrical terminology as a common language for modeling plants and controllers. Third, it is possible to use electrical simulators, such as the SPICE simulator (described in *SPICE 3 Version 3F5 User's Manual* by Thomas Quarles, A. R. Newton, D. O. Pederson, and A. Sangiovanni-Vincentelli, Department of Electrical Engineering and Computer Science, University of California, Berkeley, Calif.:1994) for solving control problems. Electrical simulators are useful because the systems of simultaneous integro-differential equations used in electrical engineering also apply to many aspects of control engineering.

Design is a major activity of practicing engineers. Engineers are often called upon to design controllers that satisfy certain prespecified high-level design goals. The creation of a design for a complex structure, such as a controller, typically involves intricate tradeoffs between competing considerations. Design is ordinarily thought to require human intelligence.

Controllers can be composed of a variety of types of one or more signal processing blocks that process signals in the time-domain, including, for example, but not limited to, gain, lead, lag, integrator, differentiator, adder, inverter, subtractor, and multiplier. Each of these processing blocks has one or more inputs and a single output. The input to a controller typically consists of the reference signal(s) and the plant response(s) or, sometimes, just the difference (error) between each reference signal and the corresponding plant response. The output of a controller consists of control variable(s) that are passed to the plant.

One or more parameter values are required to completely specify many of the signal processing blocks used in controllers. For example, the complete specification of a gain block requires specification of its amplification factor (e.g., 100-to-1 or 40 decibel amplification). The specification of these parameter values (which are typically numerical values) is sometimes called the "sizing."

The individual signal processing blocks of a controller are coupled to one another in a particular topological arrangement. The topology of a controller entails the specification of the total number of processing blocks to be employed in the controller, the type of each block (e.g., gain, lead, lag, integrator, differentiator, adder, inverter, subtractor, and multiplier), and the connections between the input point(s) and the output point of each block in the controller.

The design (e.g., synthesis) of a controller requires specification of both the topology and parameter values (sizing) such that the controller satisfies certain user-specified high-level design requirements.

Search Techniques

Controllers may be designed using purely analytical methods. Search techniques offer a potential way to discover a satisfactory solution to a problem when no analytical method is available.

There are many techniques for searching a space of candidate designs for an optimal or near-optimal controller (e.g., point in the search space), including, but not limited to, hill climbing, simulated annealing, and genetic programming.

A search through any search space is an iterative process that involves starting with one or more entities (points) from the search space, ascertaining the merit of the entity for solving the problem at hand, creating a new candidate entity by modifying existing entity(ies), ascertaining the merit of the new candidate entity, and using the merit measure to select among entities. The measure or merit is typically called the "fitness measure" when referring to genetic programming, the "energy level" when referring to simulated annealing, and the "objective function" measure when referring to hill climbing. Some of the other additional terms that are commonly used for merit include payoff, score, and profit. The term "fitness" will be used herein to refer to the conception of "merit." The individual steps of the iterative search process are typically called "generations" when referring to genetic programming, "time-steps" or "cycles" when referring to simulated annealing, and "steps" when referring to hill climbing.

Search techniques do not find solutions by analysis and proof. Instead, they search a space for a solution. Consequently, search techniques typically require large amounts of computation. As S. P. Boyd and C. H. Barratt stated in *Linear Controller Design: Limits of Performance* (Prentice Hall, Englewood Cliffs, N.J.:1991, page 11) in discussing the "challenges for controller design,"

> The challenge for controller design is to productively use the enormous computing power available. Many current methods of computer-aided controller design simply automate procedures developed in the 1930's through the 1950's, for example, plotting root loci or Bode plots. Even the 'modern' state-space and frequency-domain methods(which require the solution of algebraic Riccati equations) greatly underutilize available computing power.

Search by Use of Hill Climbing

Simple hill climbing involves starting with a single initial entity (point) in the search space, ascertaining the fitness of the entity, creating a new candidate entity, ascertaining the fitness of the new candidate entity, and using the fitness measure to select between the preexisting entity and the new candidate entity. The new candidate entity is created by a problem-specific modification operation (often a probabilistic operation) that modifies the current entity (point) in the search space in order to obtain a new (usually nearby) candidate entity in the search space. In hill climbing, a new candidate point with a better fitness than the preexisting point is unconditionally selected. Hill climbing is a point-to-point search technique in the sense that the search proceeds from a single point in the search space of the problem to another single point.

Conducting a search using hill climbing through a space of entities in a nontrivial problem very often results in the search becoming trapped at a local optimum point rather than finding the global optimum point of the search space. In hill climbing (and all other search techniques), it may be necessary to make multiple runs (assuming that the problem-specific modification operation is probabilistic so that different runs can potentially produce different outcomes).

Search by Use of Simulated Annealing

Simulated annealing (Optimization by simulated annealing, by S. Kirkpatrick, C. D. Gelatt, and M. P. Vecchi, in *Science* 220, 1983, pages 671–68) resembles hill climbing in that it is a point-to-point search technique. Like hill climbing, simulated annealing employs a problem-specific probabilistic modification operation (typically termed a "mutation" when referring to simulated annealing) for modifying the current entity (point) in the search space in order to obtain a new candidate entity. At each step of the search, the current point in the search space is modified using the modification operator and the new point's fitness is ascertained.

Specifically, simulated annealing involves starting with a single initial entity (point) in the search space, ascertaining the fitness of the entity, creating a new candidate entity, ascertaining the fitness of the new candidate entity, and using the fitness measure to select between the preexisting entity and the new candidate entity. Simulated annealing always selects the new candidate entity if it is better than the preexisting entity. That is, it operates in the same way as hill climbing in such cases.

However, simulated annealing differs from hill climbing in the way it handles the case when the new candidate entity is worse than the preexisting entity. In this case, the Metropolis algorithm and the Boltzmann equation are applied to determine whether to accept a non-improving new candidate entity. A run of simulated annealing is governed by an annealing schedule in which a temperature T changes as the run proceeds (typically in an exponentially monotonically decreasing way). The effect of the Metropolis algorithm and the Boltzmann equation are that the probability of acceptance of a non-improving modification is greater if the fitness difference is small or if the temperature T is high. Thus, fairly large non-improving modifications are likely to be accepted early in the run (when the temperature is high). That is, simulated annealing resembles blind random search in early stages of the run. However, later in the run (when the system has cooled), only small non-improving modifications are likely to be accepted. That is, simulated annealing resembles hill climbing in later stages of the run. If a modification is not accepted at any step of the run of simulated annealing, the probabilistic modification operator is re-invoked to produce another new point.

Search by Use of Genetic Programming

"Genetic programming" (also referred to as the "non-linear genetic algorithm" or the "hierarchical genetic algorithm" in previous years) is described in the book entitled *Genetic Programming: On the Programming of Computers by Means of Natural Selection*, by John R. Koza, Cambridge, Mass.: The MIT Press, 1992; the book entitled *Genetic Programming II: Automatic Discovery of Reusable Programs*, by John R. Koza, Cambridge, Mass,: The MIT Press, 1994; *Genetic Programming III: Darwinian Invention and Problem Solving* by John R. Koza, Forrest H Bennett III, David Andre, and Martin A. Keane, San Francisco, Calif.; Morgan Kaufmann Publishers, 1999; and in U.S. Pat. Nos. 4,935,877, 5,136,686, 5,148,513, 5,343,554, 5,742,738, and 5,867,397.

Genetic programming is referred to as "non-linear" or "hierarchical" because the original genetic algorithm described by John H. Holland in *Adaptation in Natural and Artificial Systems: An Introductory Analysis with Applications to Biology, Control, and Artificial Intelligence*, Ann Arbor, Mich.: University of Michigan Press, Second edition, Cambridge, Mass.: The MIT Press, 1975, operated on linear strings of characters (resembling chromosomes in nature), whereas genetic programming operates on hierarchical program trees of various sizes and shapes.

Genetic programming is capable of evolving computer programs that solve, or approximately solve, a variety of problems from a variety of fields. Genetic programming may start with a "primordial ooze" of randomly generated programs composed of the available programmatic ingredients. It then applies the principles of animal husbandry to breed a new (and often improved) population of programs. Genetic programming may perform the breeding in a domain-independent way using the Darwinian principle of survival of the fittest, an analog of the naturally-occurring genetic operation of crossover (sexual recombination), and occasional mutation. The crossover operation is designed to create syntactically valid offspring programs (given closure amongst the set of ingredients). Genetic programming combines the expressive high-level symbolic representations of computer programs with the near-optimal efficiency of learning associated with Holland's genetic algorithm. A program that solves (or approximately solves) a given problem often emerges from this process.

As demonstrated in the book entitled *Genetic Programming II: Automatic Discovery of Reusable Programs*, by John R. Koza, Cambridge, Mass.: The MIT Press, 1994, genetic programming can evolve multi-part programs having a main program and one or more reusable, parameterized, hierarchically-called subprograms (called automatically defined functions or ADFs). See U.S. Pat. No. 5,343,554, entitled "A Non-Linear Genetic Process for Data Encoding and for Solving Problems Using Automatically Defined Functions", issued Aug. 30, 1994, by Koza, John R., and Rice, James P.

The architecture of a multi-part program may consist of a result-producing branch and automatically defined function(s) and involves:

(1) the total number of automatically defined functions, (2) the number of arguments (if any) possessed by each automatically defined function, and (3) if there is more than one automatically defined function in a program, the nature of the hierarchical references (including recursive references), if any, allowed among the automatically defined functions.

There are a variety of ways of determining the architecture for a computer program that is to be evolved using genetic programming, such as (1) the human user may pre-specify the architecture of the overall program as part of his or her preparatory steps prior to launching the run; and (2) architecture-altering operations may be used during the run to automatically create the architecture of the program during the run.

Architecture-altering operations, such as described in *Genetic Programming III: Darwinian Invention and Problem Solving* (1999), enable genetic programming to automatically determine the number of subroutines, the number of arguments that each possesses, and the nature of the hierarchical references, if any, among such automatically defined functions. See U.S. Pat. No. 5,742,738, entitled "Simultaneous Evolution of the Architecture of a Multi-part Program to Solve a Problem Using Architecture Altering Operations," issued Apr. 21, 1998, by Koza, John R., Andre, David, and Tackett, Walter Alden. Certain additional architecture-altering operations also enable genetic programming to automatically determine whether and how to use internal memory, iterations, and recursion in evolved programs. See *Genetic Programming III: Darwinian Invention and Problem Solving* by John R. Koza, Forrest H Bennett III, David Andre, and Martin A. Keane, San Francisco, Calif.; Morgan Kaufmann Publishers, 1999.

Genetic programming has been successfully used to solve many difficult problems involving the search of complex spaces. For example, genetic programming has been used for automatically creating the topology and sizing for an analog electrical circuit from a high-level statement of the circuit's desired behavior. See U.S. Pat. No. 5,867,397, entitled "Method and Apparatus for Automated Design of Complex Structures Using Genetic Programming," issued Feb. 2, 1999.

Genetic programming may breed computer programs to solve problems by executing the following steps:

(1) Generate an initial population of random compositions (i.e., programs) of the functions and terminals of the problem.

(2) Iteratively perform the following substeps (referred to herein as a generation) on the population until the termination criterion has been satisfied:

(A) Execute each program in the population and assign it a fitness value using the fitness measure.

(B) Create a new population of programs by applying the following operations. The operations are applied to program(s) selected from the population with a probability based on fitness (with reselection allowed).

(i) Reproduction: Copy the selected program to the new population.

(ii) Crossover: Create a new offspring program for the new population by recombining randomly chosen parts of two selected programs.

(iii) Mutation: Create one new offspring program for the new population by randomly mutating a randomly chosen part of the selected program.

(iv) Architecture-altering operations: Select an architecture-altering operation from the available repertoire of such operations and create one new offspring program for the new population by applying the selected architecture-altering operation to the selected program.

(3) Designate the individual program that is identified by result designation (e.g., the best-so-far individual) as the result of the run of genetic programming. This result may be a solution (or an approximate solution) to the problem.

Genetic programming conducts a search for a solution, or approximate solution, to a problem.

Simulated annealing is similar to genetic programming in that it sometimes accepts a newly created point that is known to be inferior in the hope that it will lead to better points. That is, neither simulated annealing nor genetic programming is a purely greedy search algorithm. Simulated annealing differs from genetic programming in that simulated annealing unconditionally accepts an improving modification while genetic programming does not always do this. Simulated annealing and hill climbing differ from searches conducted by the genetic programming in that simulated annealing and hill climbing are point-to-point search techniques. That is, only one entity (point) is retained at each generation of the search in simulated annealing or hill climbing. There is no population of entities in simulated annealing or hill climbing (as there is in genetic programming). Because there is no population in simulated annealing or hill climbing, there is no analog to the crossover operation of genetic programming (where two parents mate, or recombine, to produce offspring).

Genetic programming is preferable to hill climbing because hill climbing operates on only a single entity (point) in the search space of the problem and because hill climbing greedily unconditionally selects a better point in preference to a worse point. Because of this, hill climbing tends to become trapped on local optimum points that are not global optimum points. Simulated annealing also operates on a single entity (point) in the search space of the problem; however, simulated annealing is preferable to hill climbing because it typically uses the Metropolis algorithm and the Boltzmann equation to avoid becoming entrapped on locally optimum points.

Genetic programming is preferable to simulated annealing (which resembles a genetic algorithm operating on a population of size 1) because the existence of a population greater than one permits crossover (recombination) to occur between two (or more) parents, each chosen probabilistically based on their fitness. Experience indicates that the recombination of parts of already fit parents often yields superior offspring in a far more rapid way than that provided by search techniques that lack recombination.

There has been extensive previous work on the problem of automating various aspects of the design of controllers using non-analytic search techniques such as simulated annealing, artificial intelligence, genetic algorithms, and fuzzy logic. Many of the preexisting techniques address only the aspect of automatically determining the parameter values (sizing) of the processing blocks of the controller. Many of these techniques require the user to supply a reasonably good working controller as a starting point. Many of the techniques require repeated interactive intervention by the human user during the design process. Generally, the decisions that are automated are only a small subset of the decisions that must be made in solving a non-trivial problem.

Genetic programming has been previously applied to certain simple control problems, including discrete-time problems where the evolved program receives the system's current state as input, performs an arithmetic or conditional calculation on the inputs, and computes a value for a control variable. These techniques have been applied to problems of cart centering, broom balancing, backing a tractor-trailer truck to a loading dock, controlling the food foraging strategy of a lizard, and navigating a robot with a nonzero turning radius to a destination point (called the "fly to" problem when applied to aircraft). See Koza, John R. and Keane, Martin A., Cart centering and broom balancing by genetically breeding populations of control strategy programs. In *Proceedings of International Joint Conference on Neural Networks*. Washington, Jan. 15–19, 1990. Hillsdale, N.J.: Lawrence Erlbaum. Volume I; Koza, John R. and Keane, Martin A., Genetic breeding of non-linear control strategies for broom balancing. In *Proceedings of the Ninth International Conference on Analysis and Optimization of Systems*. Antibes, France, June, 1990. Berlin: Springer-Verlag; and Koza, John R., Forrest H Bennett, III, David Andre, and Martin Keane, *Genetic Programming III: Darwinian Invention and Problem Solving*, San Francisco, Calif.: Morgan Kaufman, 1999. In addition, genetic programming has been previously used to evolve an analog electrical circuit for a discrete-time robotic controller (Koza, John R., Forrest H Bennett, III, David Andre, and Martin Keane, *Genetic Programming III: Darwinian Invention and Problem Solving*, San Francisco, Calif.: Morgan Kaufman, 1999).

REFERENCES CITED

U.S. Patents

U.S. Pat. No. 4,697,242, "Adaptive Computing System Capable of Learning and Discovery", issued Sep. 29, 1987, Holland et al.

U.S. Pat. No. 4,881,178, "Method of Controlling a Classifier System," issued Nov. 14, 1989, Holland et al.

U.S. Pat. No. 4,935,877, "Non-Linear Genetic Algorithms for Solving Problems," issued Jun. 19, 1990, Koza.

U.S. Pat. No. 5,136,686, "Non-Linear Genetic Algorithms for Solving Problems by Finding a Fit Composition of Functions," issued Aug. 4, 1992, Koza.

U.S. Pat. No. 5,148,513, "A Non-Linear Genetic Process for Use with Plural Co-Evolving Populations," issued Sep. 15, 1992, Koza, John R., and Rice, James P.

U.S. Pat. No. 5,343,554, "A Non-Linear Genetic Process for Data Encoding and for Solving Problems Using Automatically Defined Functions," issued Aug. 30, 1994, Koza, John R., and Rice, James P.

U.S. Pat. No. 5,742,738, "Simultaneous Evolution of the Architecture of a Multi-part Program to Solve a Problem Using Architecture Altering Operations," issued Apr. 21, 1998, Koza, John R., Andre, David, and Tackett, Walter Alden.

U.S. Pat. No. 5,867,397, "Method and Apparatus for Automated Design of Complex Structures Using Genetic Programming", issued Feb. 2, 1999, Koza, John R., Bennett III, Forrest H, and Andre, David.

OTHER PUBLICATIONS

Anderson, Bjorn, Svensson, Per, Nordin, Peter, and Nordahl, Mats. 1999. Reactive and memory-based genetic programming for robot control. In Poli, Riccardo, Nordon, Peter, Langdon, William B., and Fogarty, Terence C. 1999. *Genetic Programming: Second European Workshop. EuroGP'99. Proceedings*. Lecture Notes in Computer Science. Volume 1598. Berlin, Germany: Springer-Verlag. Pages 161–172.

Angeline, Peter J. 1997. An alternative to indexed memory for evolving programs with explicit state representations. In Koza, John R., Deb, Kalyanmoy, Dorigo, Marco, Fogel, David B., Garzon, Max, Iba, Hitoshi, and Riolo, Rick L. (editors). *Genetic Programming 1997: Proceedings of the Second Annual Conference*, Jul. 13–16, 1997, Stanford University. San Francisco, Calif.: Morgan Kaufmann. Pages 423–430.

Angeline, Peter J. 1998a. Multiple interacting programs: A representation for evolving complex behaviors. *Cybernetics and Systems*. 29(8) 779–806.

Angeline, Peter J. 1998b. Evolving predictors for chaotic time series. In Rogers, S., Fogel, D., Bezdek, J., and Bosacchi, B. (editors). *Proceedings of SPIE (Volume 3390): Application and Science of Computational Intelligence*, Bellingham, Wash.: SPIE—The International Society for Optical Engineering. Pages 170–180.

Angeline, Peter J. and Fogel, David B. 1997. An evolutionary program for the identification of dynamical systems. In Rogers, S. (editor). *Proceedings of SPIE (Volume 3077): Application and Science of Artificial Neural Networks III*. Bellingham, Wash.: SPIE—The International Society for Optical Engineering. Pages 409–417.

Astrom, Karl J. and Hagglund, Tore. 1995. *PID Controllers: Theory, Design, and Tuning*. Second Edition. Research Triangle Park, N.C.: Instrument Society of America.

Banzhaf, Wolfgang, Nordin, Peter, Keller, Robert E., and Francone, Frank D. 1998. *Genetic Programming—An Introduction*. San Francisco, Calif.: Morgan Kaufmann and Heidelberg: dpunkt.

Banzhaf, Wolfgang, Nordin, Peter, Keller, and Olmer, Markus. 1997. Generating adaptive behavior for a real robot using function regression with genetic programming. In Koza, John R., Deb, Kalyanmoy, Dorigo, Marco, Fogel, David B., Garzon, Max, Iba, Hitoshi, and Riolo, Rick L. (editors). *Genetic Programming 1997: Proceedings of the Second Annual Conference*, Jul. 13–16, 1997, Stanford University. San Francisco, Calif.: Morgan Kaufmann. Pages 35–43.

Boyd, S. P. and Barratt, C. H. 1991. *Linear Controller Design: Limits of Performance*. Englewood Cliffs, N.J.: Prentice Hall.

Crawford, L. S., Cheng, V. H. L. and Menon, P. K. 1999. Synthesis of flight vehicle guidance and control laws using genetic search methods. *Proceedings of 1999 Conference on Guidance, Navigation, and Control*. Reston, Va.: American Institute of Aeronautics and Astronautics. Paper AIAA-99-4153.

Dewell, Larry D. and Menon, P. K. 1999. Low-thrust orbit transfer optimization using genetic search. *Proceedings of 1999 Conference on Guidance, Navigation, and Control*. Reston, Va.: American Institute of Aeronautics and Astronautics. Paper AIAA-99-4151.

Dorf, Richard C. and Bishop, Robert H. 1998. *Modern Control Systems*. Eighth edition. Menlo Park, Calif.: Addison-Wesley.

Friedman, George J., 1956. *Selective Feedback Computers for Engineering Synthesis and Nervous System Analogy*. Master's thesis. University of California at Los Angeles. In Fogel, David B. 1998. *Evolutionary Computation: The Fossil Record* (editor). Piscataway, N.J.: IEEE Press. Pages 29–84.

Holland, John H., Adaptation in Natural and Artificial Systems: An Introductory Analysis with Applications to Biology, Control, and Artificial Intelligence. Ann Arbor, Mich.: University of Michigan Press. Second edition. Cambridge, Mass.: The MIT Press, 1975.

Kirkpatrick, S., Gelatt, C. D., and Vecchi, M. P. 1983. Optimization by simulated annealing. *Science* 220, pages 671–680.

Koza, John R., and Keane, Martin A. 1990a. Cart centering and broom balancing by genetically breeding populations of control strategy programs. In *Proceedings of International Joint Conference on Neural Networks*, Washington, Jan. 15–19, 1990. Hillsdale, N.J.: Lawrence Erlbaum. Volume I, Pages 198–201.

Koza, John R., and Keane, Martin A. 1990b. Genetic breeding of non-linear optimal control strategies for broom balancing. In *Proceedings of the Ninth International Conference on Analysis and Optimization of Systems*. Antibes, France, June, 1990. Berlin: Springer-Verlag. Pages 47–56.

Koza, John R., Forrest H Bennett, III, David Andre, and Martin Keane. 1999. Genetic Programming III: Darwinian Invention and Problem Solving, San Francisco, Calif.: Morgan Kaufman, 1999.

Koza, John R., Genetic Programming: On the Programming of Computers by Means of Natural Selection. Cambridge, Mass.: The MIT Press, 1992.

Koza, John R., Genetic Programming II: Automatic Discovery of Reusable Programs. Cambridge, Mass.: The MIT Press, 1994.

Man, K. F., Tang, K. S., Kwong, S., and Halang, W. A. 1997. *Genetic Algorithms for Control and Signal Processing*. London: Springer-Verlag.

Man, K. F., Tang, K. S., Kwong, S., and Halang, W. A. 1999. *Genetic Algorithms: Concepts and Designs*. London: Springer-Verlag.

Marenbach, Peter, Bettenhausen, Kurt D., and Freyer, Stephan. 1996. Signal path oriented approach for generation of dynamic process models. In Koza, John R., Goldberg, David E., Fogel, David B., and Riolo, Rick L. (editors). *Genetic Programming 1996: Proceedings of the First Annual Conference*, Jul. 28–31, 1996, Stanford University. Cambridge, Mass.: MIT Press. Pages 327–332.

Menon, P. K., Yousefpor, M., Lam, T., and Steinberg, M. L. 1995. Nonlinear flight control system synthesis using genetic programming. *Proceedings of 1995 Conference on Guidance, Navigation, and Control*. Reston, Va.: American Institute of Aeronautics and Astronautics. Pages 461–470.

Nordin, Peter. 1997. *Evolutionary Program Induction of Binary Machine Code and its Application*. Munster, Germany: Krehl Verlag.

Ogata, Katsuhiko. 1997. *Modern Control Engineering*. Third edition. Upper Saddle River, N.J.: Prentice Hall.

Quarles, Thomas, Newton, A. R., Pederson, D. O., and Sangiovanni-Vincentelli, A. 1994. *SPICE 3 Version 3F5 User's Manual*. Department of Electrical Engineering and Computer Science, University of California, Berkeley, Calif. March 1994.

Sterling, Thomas L., Salmon, John, and Becker, Donald J., and Savarese, How to Build a Beowulf: A Guide to Implementation and Application of PC Clusters. Cambridge, Mass.: The MIT Press, 1999.

Sweriduk, G. D., Menon, P. K., and Steinberg, M. L. 1998. Robust command augmentation system design using genetic search methods. *Proceedings of 1998 Conference on Guidance, Navigation, and Control*. Reston, Va.: American Institute of Aeronautics and Astronautics. Pages 286–294.

Sweriduk, G. D., Menon, P. K., and Steinberg, M. L. 1999. Design of a pilot-activated recovery system using genetic search methods. *Proceedings of 1998 Conference on Guidance, Navigation, and Control*. Reston, Va.: American Institute of Aeronautics and Astronautics.

Teller, Astro. 1998. Algorithm Evolution with Internal Reinforcement for Signal Understanding. PhD Thesis. Computer Science Department. Carnegie Mellon University. Pittsburgh, Pa.

Teller, Astro. 1999. The internal reinforcement of evolving algorithms. In Spector, Lee, Langdon, William B., O'Reilly, Una-May, and Angeline, Peter (editors). 1999. Advances in Genetic Programming 3. Cambridge, Mass.: The MIT Press. Pages - - - .

Thompson, Adrian. 1998. *Hardware Evolution: Automatic Design of Electronic Circuits in Reconfigurable Hardware by Artificial Evolution*. London: Springer-Verlag.

Whigham, Peter A. 1995b. Grammatically-based genetic programming. In Rosca, Justinian (editor). *Proceedings of the Workshop on Genetic Programming: From Theory to Real-World Applications*. University of Rochester. National Resource Laboratory for the Study of Brain and Behavior. Technical Report 95-2. June. 1995. Pages 33–41.

Whitley, Darrell, Gruau, Frederic, and Preatt, Larry. 1995. Cellular encoding applied to neurocontrol. In Eshelman, Larry J. (editor). *Proceedings of the Sixth International Conference on Genetic Algorithms*. San Francisco, Calif.: Morgan Kaufmann. Pages 460–467.

SUMMARY OF THE INVENTION

A method and apparatus for the automatic creation of the topology and parameter values for controllers. An iterative process may be run to create a design of a structure that satisfies prespecified high-level design goals. In one embodiment, the present invention operates with a system having a population of entities of various sizes and shapes.

DESCRIPTION OF THE DRAWINGS

The present invention will be understood more fully from the detailed description given below and from the accompanying drawings of the preferred embodiments of the invention, which, however, should not be taken to limit the invention to the specific embodiments but are for explanation and understanding only.

FIG. 10 is an exemplary SPICE input file simulating the PID controller of FIG. 5.

DETAILED DESCRIPTION OF THE INVENTION

Figure 1:
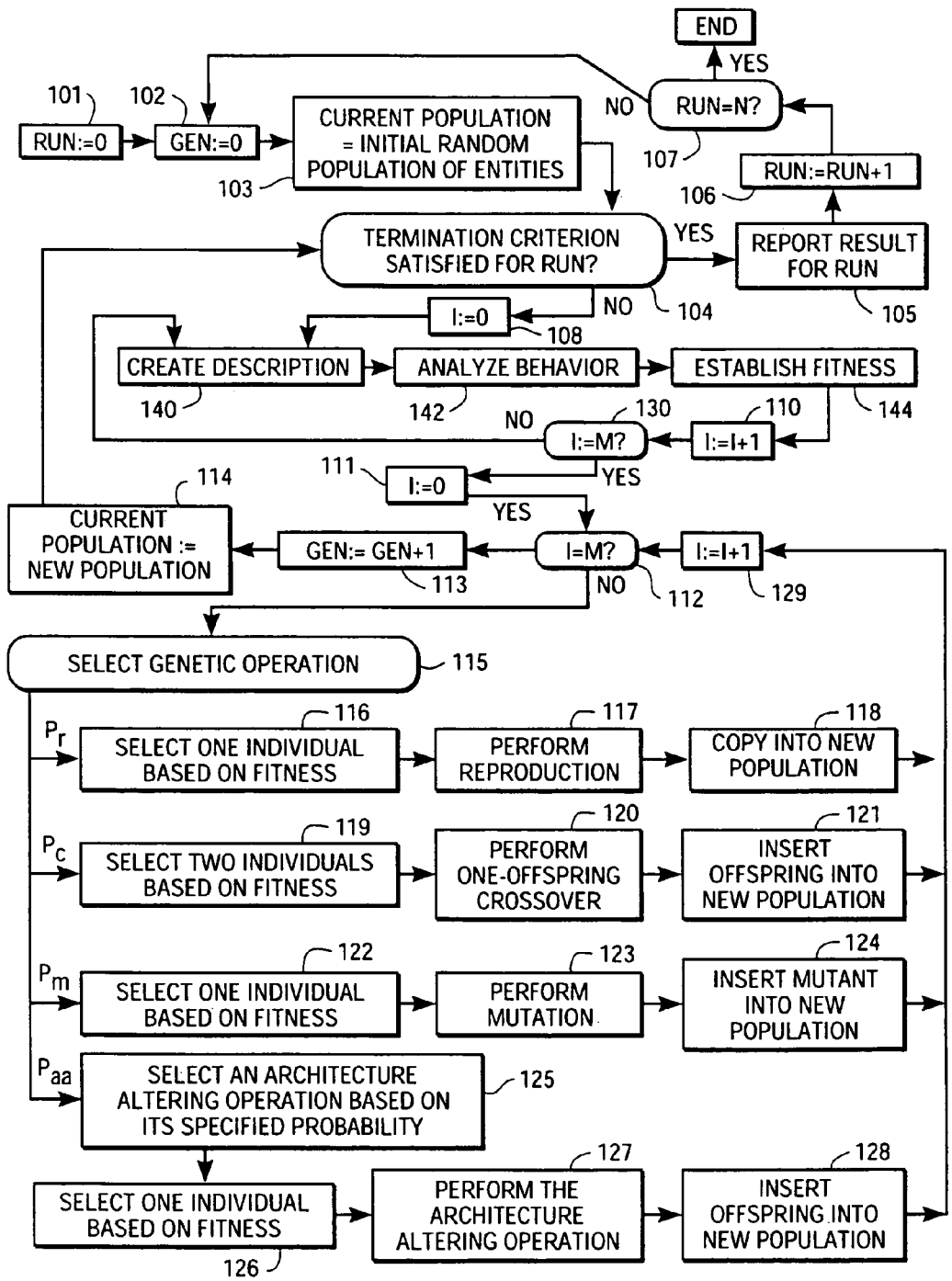
FIG. 1 is a flowchart of one embodiment of a process for synthesizing the design of controllers using genetic programming.

A method and apparatus for the automatic synthesis (e.g., creation) of both the topology and parameter values for controllers is described.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in flowchart form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "computing" or "calculating" or "determining" or "displaying" or "processing" (as contrasted with the term "signal processing" which has a specialized meaning in the field of control) or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations discussed. This apparatus may be specially constructed for the required purposes, or it may comprise a general purpose computer selectively activated or reconfigured by a computer program stored in the computer. The algorithms and displays presented here are not inherently related to any particular computer or other apparatus. Various general purpose machines may be used with programs in accordance with the teachings described, or it may prove convenient to construct a more specialized apparatus to perform the required method steps. The required structure for a variety of these machines will appear from the description below. In addition, the present invention is not described with reference to any -particular programming language. It will be appreciated that a variety of programming languages may be used to implement the teachings of the invention as described here.

OVERVIEW

A method and apparatus for the automatic synthesis (creation) of both the topology and parameter values for controllers is described. In one embodiment, the controller may comprise one or more of a wide variety of different types of signal processing blocks, including, but not limited to gain, lead, lag, integrator, differentiator, adder, inverter, subtractor, and multiplier. The individual blocks are coupled in a particular "topology" to form a controller. In addition, certain signal processing blocks are further specified ("sized") by a set of parameters values (usually numerical).

Once the user specifies the design goals for the controller that is to be designed, an automated design process generates a complete design. This goal-driven automated design process creates the topology and sizing of the controller.

FIG. 1 is a flowchart of one embodiment of a process for generating a design of a controller using genetic programming. The process is performed by processing logic that may comprise hardware, software or a combination of both. The process is performed on a population of entities, each of which represents a controller. The initial population may be created in a variety of ways (e.g., randomly) or may be supplied by the user to begin the process.

Genetic programming starts from a high-level statement of the controller's desired behavior and automatically creates the design of the controller. Genetic programming breeds a population of rooted, point-labeled trees with ordered branches.

Referring to FIG. 1, the overall process of one embodiment comprises several independent runs and each run consists of many generations, all controlled by processing logic. Processing logic initializes variables indicating the current run (Run) (flowchart box 101) and the current generation (Gen) to 0 (flowchart box 102). Next, at flowchart box 103, for generation 0 of run numbered 0 (the first run), the process initially creates an initial population for the run. In one embodiment, this creates a number, M, of individual program trees (typically randomly).

After initialization, processing logic tests whether the termination criteria for the run have been satisfied (flowchart box 104). The criteria is typically based on either reaching a certain maximum number of generations, G, or on satisfying some problem-specific criteria. If the termination criteria has been satisfied, processing logic reports the result of the run (flowchart box 105). In one embodiment, the best individual achieved over the generations is designated and reported as the result of the run. Then, the variable Run is incremented by one (flowchart box 106). Thereafter, processing logic tests whether the variable representing the current run (Run) is equal to a predetermined number (flowchart box 107). If the value of Run is greater than the predetermined maximum number of runs, N, that are intended to be run, then the process ends; otherwise, processing transitions to flowchart box 102 in which the variable Gen is initialized to 0 and the next run begins. If the termination criterion 104 has not been satisfied, processing transitions to flowchart box 108.

Beginning at flowchart box 108, processing logic preferably performs two main iterative loops over the individuals (i) in the population. In the first of these two main iterative loops (flowchart boxes 108, 140, 142, 144, and 110), the fitness of each individual i in the population is determined. In the second of these two main iterative loops (beginning at flowchart box (111), one or more of the genetic operations are performed.

A variable, i, indicating the current entity in the population is initialized to 0 at flowchart box 108. Processing logic ascertains the fitness of an individual entity in the population (flowchart boxes 140–144). In general, the determination of fitness may be implicit or explicit and it may or may not produce a numerical value of fitness. In one embodiment, the determination of fitness is explicit and a numerical value of fitness is determined.

In order to ascertain the fitness of an individual entity, processing logic creates a description of the controller (flowchart box 140). In one embodiment, this description is in the form of a SPICE netlist. In one embodiment, a netlist identifies each signal processing block of the controller, the nodes to which that signal processing block is connected, and the parameter value, if any, of that signal processing block (described in detail below).

Processing logic analyzes the behavior and characteristics of the controller (flowchart box 142). In one embodiment, this analysis is performed by simulating the controller based on its netlist description. In an alternate embodiment, the controller may be analyzed by actually building it and operating it in a real environment. In one embodiment, a 217,000-line SPICE simulator runs as a submodule within the overall process to analyze the controller. In this embodiment, the input to a SPICE simulation is a netlist describing the controller and plant to be analyzed and certain commands that instruct SPICE as to the type of analysis to be performed and the nature of the output to be produced. In one embodiment, SPICE may produce tabular information describing the controller's behavior. In an alternate embodiment, simulators other than SPICE may be used for the simulation. (An exemplary SPICE netlist is described in reference to FIG. 10.)

Processing logic uses the results of the analysis of the controller's behavior and characteristics to establish the fitness of the controller (flowchart box 144). In one embodiment, the fitness measure may be determined by a combination of the following elements: (1) eight time-domain-based elements based on a modified integral of a time-weighted absolute error (ITAE) measuring the achievement of the desired value of the plant response, the controller's robustness, and the controller's avoidance of overshoot, (2) one time-domain-based element measuring the controller's stability when faced with an extreme spiked reference signal, and (3) one frequency-domain-based element measuring the reasonableness of the controller's attenuation by frequency.

In a second embodiment, the fitness measure may be determined by a combination of the following elements: (1) five time-domain-based elements based on a modified integral of time-weighted absolute error (ITAE) measuring the achievement of the desired value of the plant response and the controller's avoidance of overshoot, and (2) one time-domain-based element measuring disturbance rejection. In alternate embodiments, any combination of the above elements, or any other applicable elements not listed, may be used to determine the controller's fitness.

After ascertaining the fitness of an individual entity in the population, processing logic increments the variable i (flowchart box 110) and tests whether the value of variable i is equal to the size, M, of the population (flowchart box 130). If the value of variable i is not equal to the population size, M, then processing transitions to flowchart box 140. If the value of variable i is equal to the population size, M, then the first of the two main iterative loops over the individuals in the population is complete and the second iterative loop is processed.

The second main iterative loop begins with processing logic re-initializing the variable i to 0 (flowchart box 111). Processing logic then tests whether the variable i is equal to the population size, M (flowchart box 112). If i is equal to the population size, M, then processing logic increments the generation indication variable Gen (flowchart box (113) and sets the Current Population equal to the New Population (processing logic 114) and transitions to flowchart box 104.

If the variable i does not equal the population size, M, then processing transitions to flowchart box 115 where processing logic selects a genetic operation. One individual may be selected based on fitness (flowchart box 116), reproduction may be performed (flowchart box 117), and a copy of the resulting entity may be placed into the new population (flowchart box 118). Two individuals based on fitness may be selected (flowchart box 119), one-offspring crossover may be performed (flowchart box 120) and then the offspring may be inserted into the new population (flowchart box 121). One individual may be selected based on fitness (flowchart box 122), mutation may be performed (flowchart box 123), and then the mutant may be inserted into the new population (flowchart box 124). An architecture-altering operation may be selected based on its specified probability (flowchart box 125), one individual may be selected based on fitness (flowchart box 126), an architecture altering operation may be performed (flowchart box 127), and then the offspring may be inserted into the new population (flowchart box 128).

In one embodiment, the selection in flowchart box 115 of the genetic operation is performed probabilistically with each genetic operation having a prespecified probability of being performed at any particular moment. The sum of the probabilities of choosing the reproduction, crossover, mutation, or an architecture-altering operation (of which there are several) is generally one.

Each of the four alternatives begins with a selection step (116, 119, 122, and 125). For example, for the genetic operation of reproduction, processing logic processes flowchart box 116. Note that the selection flowchart box 119 for the crossover operation 120 requires the selection of two individuals from the population based on fitness. In one embodiment, in flowchart boxes 116, 119, 122, and 125, processing logic selects individual(s) from the population with relatively high fitness values in a probabilistic manner. The selection, in one embodiment, is substantially based on the fitness of the individual such that individuals having a relatively high value of fitness are preferred over individuals having a relatively low value of fitness. Note that the same individual in the population may be selected more than once during each generation. In fact, better-fitting individuals are usually reselected during genetic programming.

For each of the alternatives, the appropriate genetic operation is performed. For example, if the operation of reproduction is chosen, then the operation of reproduction is performed at flowchart box 117. If the operation of crossover is chosen, then the crossover operation is performed at flowchart box 120. In one embodiment, a single offspring is produced for the crossover operation. In alternate embodiments, multiple offspring may be produced. If the operation of mutation is chosen, then the mutation operation is performed at flowchart box 123. The architecture-altering operations are performed similarly.

After performing the genetic operations, the newly created individuals are added to the population at flowchart boxes 118, 121, 124, or 128.

Then, at flowchart box 129, the index, i, of the individual in the population is incremented. If the index, i, does not satisfy the test at flowchart box 112 of being equal to the population size, M, processing logic continues processing at flowchart box 115.

If the index, i, satisfies the test at flowchart box 112, then processing logic ends processing the second of the main iterative loops over the individuals in the population. The generation number, GEN, is incremented at flowchart box 113 and processing continues at flowchart box 114.

In one embodiment, processing logic comprises a series of software steps implemented in parallel.

It should be recognized that there are numerous slight variations of the overall process possible. Some of these variations can be used as a matter of convenience. For simplicity, the flowchart does not show certain additional genetic operations such as "permutation" or "define building block" (also called "encapsulation") that are not employed in one embodiment but could be employed in others.

Figure 2:
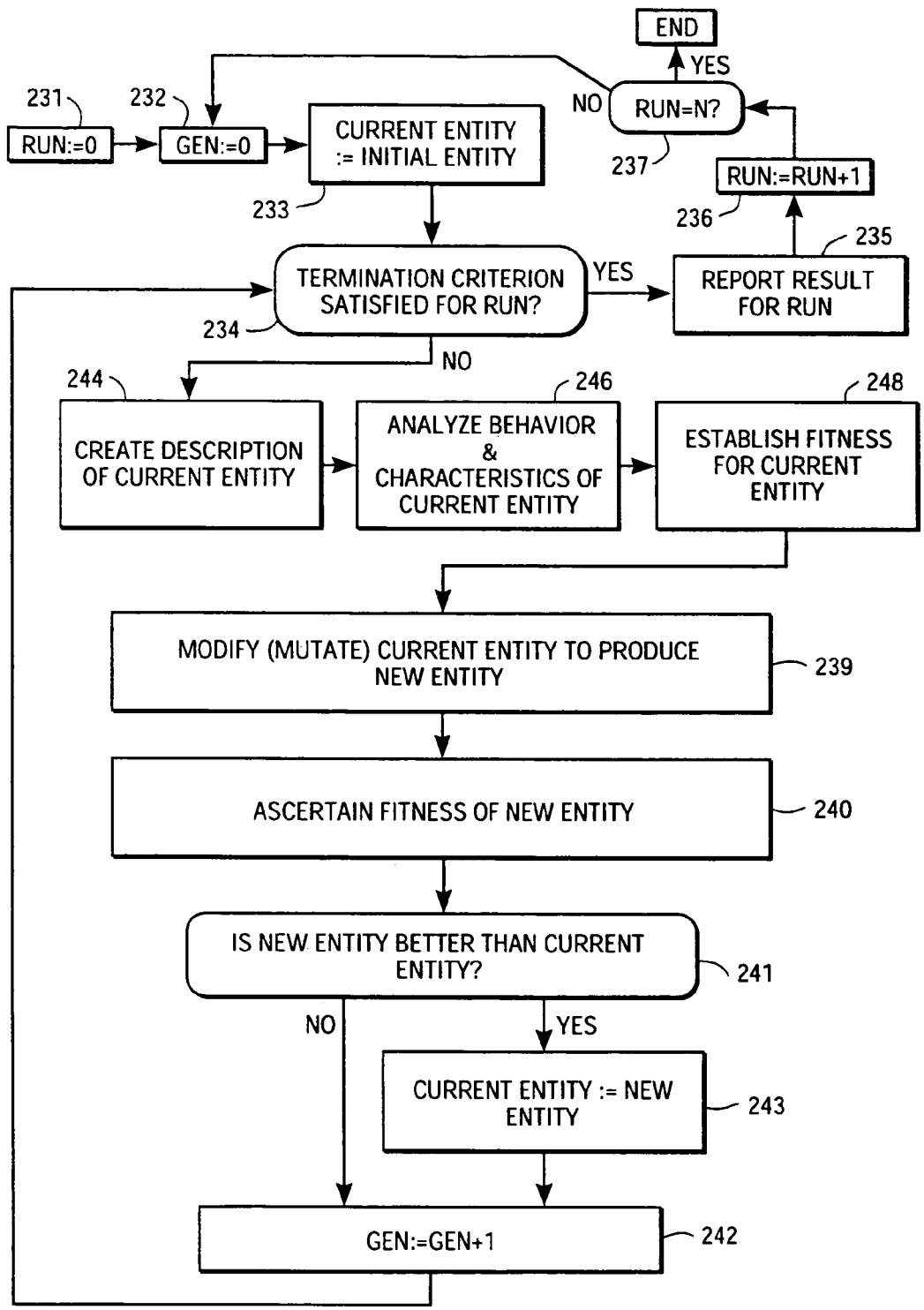
FIG. 2 is a flow chart of one embodiment of a process for performing hill climbing.

FIG. 2 is a flow chart of one embodiment of a process for performing hill climbing. Referring to FIG. 2, processing logic initializes variables indicating the current run (Run) and the current generation (Gen) to 0 (flowchart boxes 231 and 232). Processing logic also initializes the current entity to an initial entity (flowchart box 233). The initial entity in hill climbing may be randomly created; however, it is often a seeded (primed) individual that is believed to be reasonably good.

After initialization, processing logic tests whether the termination criteria for the run have been satisfied (flowchart box 234). If the termination criteria has been met, processing logic reports the result of the run (flowchart box 235) and increments by one the variable Run (flowchart box 236). Thereafter, processing logic tests whether the variable representing the current run (Run) is equal to a predetermined number (flowchart box 237). If the value of Run is equal to the predetermined number, then the process ends; otherwise, processing transitions to flowchart box 232 in which the variable Gen is initialized to 0.

If the termination criteria has not been met, processing transitions to flowchart box 244 where processing logic ascertains the fitness of an individual entity.

In order to ascertain the fitness of an individual entity, processing logic creates a description of the controller (flowchart box 244). In one embodiment, this description is in the form of a SPICE netlist. In one embodiment, a netlist identifies each signal processing block of the controller, the nodes to which that signal processing block is connected, and the parameter value, if any, of that signal processing block (described in detail below).

Processing logic analyzes the behavior and characteristics of the controller (flowchart box 246). In one embodiment, this analysis is performed by simulating the controller based on its netlist description. In an alternate embodiment, the controller may be analyzed by actually building it and operating it in a real environment. In one embodiment, the 217,000-line SPICE simulator runs as a submodule within the overall process to analyze the controller. In this embodiment, the input to a SPICE simulation is a netlist describing the controller and plant to be analyzed and certain commands that instruct SPICE as to the type of analysis to be performed and the nature of the output to be produced. In one embodiment, SPICE may produce tabular information describing the controller's behavior. In an alternate embodiment, simulators other than SPICE may be used for the simulation. (An exemplary SPICE netlist is described in reference to FIG. 10.)

Processing logic uses the results of the analysis of the controller's behavior and characteristics to establish the fitness of the controller (flowchart box 248). In one embodiment, the fitness measure may be determined by a combination of the following elements: (1) eight time-domain-based elements based on a modified integral of a time-weighted absolute error (ITAE) measuring the achievement of the desired value of the plant response, the controller's robustness, and the controller's avoidance of overshoot, (2) one time-domain-based element measuring the controller's stability when faced with an extreme spiked reference signal, and (3) one frequency-domain-based element measuring the reasonableness of the controller's attenuation by frequency.

In a second embodiment, the fitness measure may be determined by a combination of the following elements: (1) five time-domain-based elements based on a modified integral of time-weighted absolute error (ITAE) measuring the achievement of the desired value of the plant response and the controller's avoidance of overshoot, and (2) one time-domain-based element measuring disturbance rejection. In alternate embodiments, any combination of the above elements, or any other applicable elements not listed, may be used to determine the controller's fitness.

After ascertaining the fitness of an individual entity, processing logic modifies (mutates) the current entity to produce a new entity (flowchart box 239) and ascertains the fitness of the new entity (flowchart box 240). Processing logic ascertains the fitness of the new entity as described for flowchart boxes 244–248 above.

Next, processing logic tests whether the new entity is better than the current entity (flowchart box 241). If the new entity is not better than the current entity, then processing always transitions to flowchart box 242 where the variable Gen is incremented by 1. If the new entity is better than the current entity, then the current entity variable is set to the new entity (flowchart box 243) and processing always transitions to flowchart box 242. After incrementing the variable Gen, processing transitions to flowchart box 234.

Figure 3:
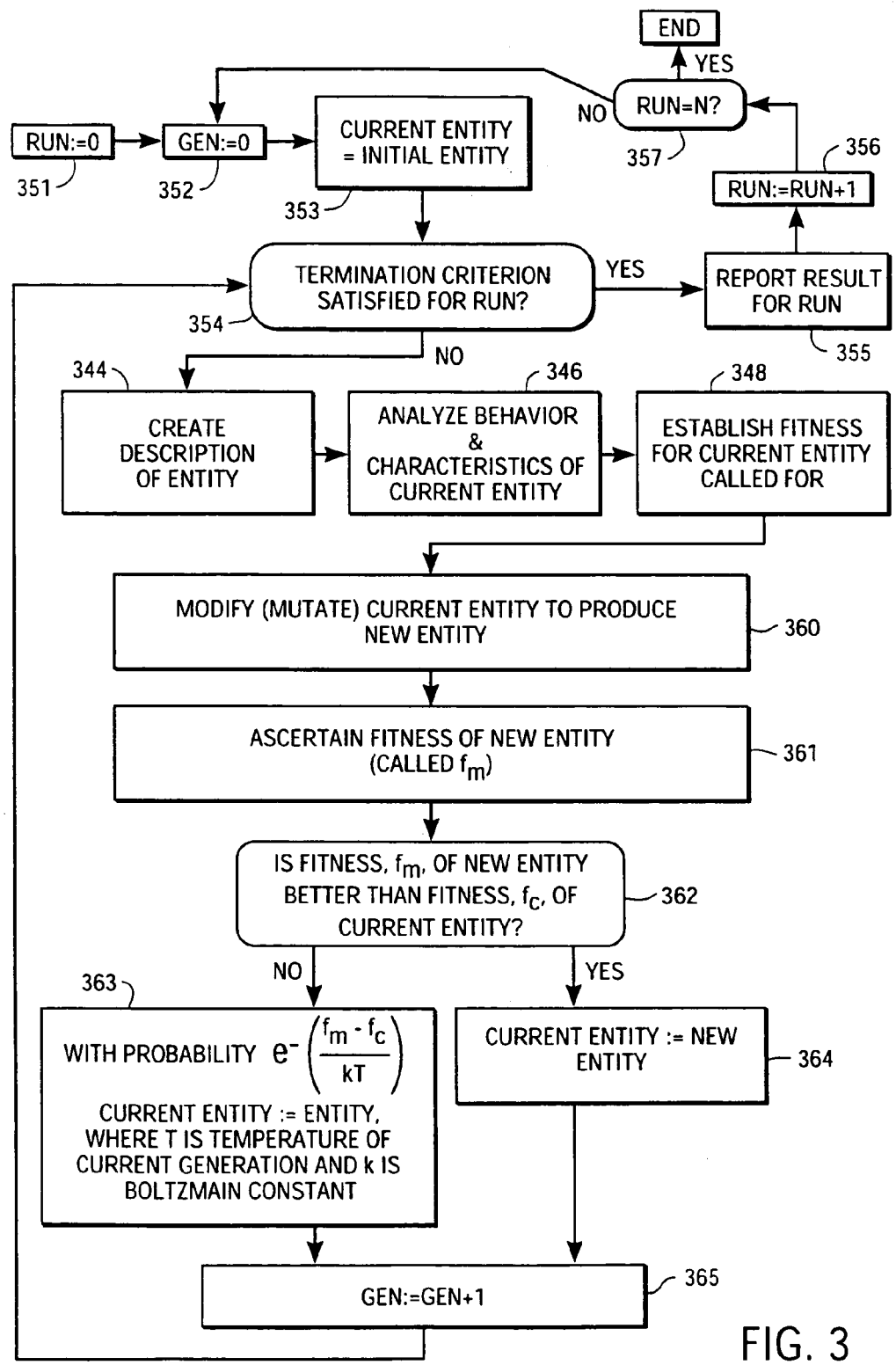
FIG. 3 is a flow chart of one embodiment of a process for performing simulated annealing.

FIG. 3 is a flow chart of one embodiment of a process for performing simulated annealing. Referring to FIG. 3, processing logic initializes variables indicating the current run (Run) and the current generation (Gen) to 0 (flowchart box 351 and 352). Processing logic also initializes the current entity to an initial entity. The initial entity in simulated annealing may be randomly created; however, it is often a seeded (primed) individual that is believed to be reasonably good.

After initialization, processing logic tests whether the termination criteria for the run have been satisfied (flowchart box 354). If the termination criteria has been met, processing logic reports the result of the run (flowchart box 355) and increments by one the variable Run (flowchart box 356). Thereafter, processing logic tests whether the variable representing the current run (Run) is equal to a predetermined number (flowchart box 357). If the value of Run is equal to the predetermined number, then the process ends; otherwise, processing transitions to flowchart box 352 in which the variable Gen is initialized to 0.

If the termination criteria has not been met, processing transitions to flowchart box 344 where processing logic ascertains the fitness of an individual entity.

In order to ascertain the fitness of an individual entity, processing logic creates a description of the controller (flowchart box 344). In one embodiment, this description is in the form of a SPICE netlist. In one embodiment, a netlist identifies each signal processing block of the controller, the nodes to which that signal processing block is connected, and the parameter value, if any, of that signal processing block (described in detail below).

Processing logic analyzes the behavior and characteristics of the controller (flowchart box 346). In one embodiment, this analysis is performed by simulating the controller based on its netlist description. In an alternate embodiment, the controller may be analyzed by actually building it and operating it in a real environment. In one embodiment, a 217,000-line SPICE simulator runs as a submodule within the overall process to analyze the controller. In this embodiment, the input to a SPICE simulation is a netlist describing the controller and plant to be analyzed and certain commands that instruct SPICE as to the type of analysis to be performed and the nature of the output to be produced. In one embodiment, SPICE may produce tabular information describing the controller's behavior. In an alternate embodiment, simulators other than SPICE may be used for the simulation. (An exemplary SPICE netlist is described in reference to FIG. 10.)

Processing logic uses the results of the analysis of the controller's behavior and characteristics to establish the fitness of the controller (flowchart box 348). In one embodiment, the fitness measure may be determined by a combination of the following elements: (1) eight time-domain-based elements based on a modified integral of a time-weighted absolute error (ITAE) measuring the achievement of the desired value of the plant response, the controller's robustness, and the controller's avoidance of overshoot, (2) one time-domain-based element measuring the controller's stability when faced with an extreme spiked reference signal, and (3) one frequency-domain-based element measuring the reasonableness of the controller's attenuation by frequency.

In a second embodiment, the fitness measure may be determined by a combination of the following elements: (1) five time-domain-based elements based on a modified integral of time-weighted absolute error (ITAE) measuring the achievement of the desired value of the plant response and the controller's avoidance of overshoot, and (2) one time-domain-based element measuring disturbance rejection. In alternate embodiments, any combination of the above elements, or any other applicable elements not listed, may be used to determine the controller's fitness.

After ascertaining the fitness of an individual entity, processing logic modifies (mutates) the current entity to produce a new entity (flowchart box 360) and ascertains the fitness of the new entity (flowchart box 361). Processing logic ascertains the fitness of the new entity in flowchart boxes 344, 346, and 348 (in the same manner as described for flowchart boxes 244, 246, and 248).

Next, processing logic tests whether the new entity is better than the current entity (flowchart box 362). If the new entity is not better than the current entity, then processing logic may or may not set the current entity to the new entity (as described below) and then transitions to flowchart box 365 where the variable Gen is incremented by 1. If the new entity is better than the current entity, then the current entity variable is set to the new entity (flowchart box 364) and processing transitions to flowchart box 365. After incrementing the variable Gen, processing transitions to flowchart box 354.

Specifically, suppose that the fitness of the current entity is $f_c$ and the fitness of the new entity is $f_n$. Suppose that the new entity is worse than the current entity (i.e., the new entity is not an improvement). Given the convention that low values of fitness are better, $f_n-f_c$ is positive and the Boltzmann equation assigns a probability of:

$$e^{-(fn-fc)/kT},$$

where k is the Boltzmann constant and T is the temperature of the current generation. If $f_n-f_c$ is positive, then the probability is a negative power of e, namely a positive value less than 1.

If the temperature T is high (as it usually is at early generations of a run of simulated annealing), a non-improving new entity will usually be accepted since the Boltzmann equation will yield a probability near 1.0. If the temperature T is low (as it usually is later in a run of simulated annealing), then it will be unlikely that a non-improving new entity will be accepted. If the difference $f_n-f_c$ is large (and positive), then it will be less likely that a non-improving entity will be accepted, whereas if the difference $f_n-f_c$ small (and positive), then there is a good chance of acceptance of a non-improving entity (i.e., non-greedy choice will be made).

One purpose of a controller is to cause the actual response of a system or (referred to herein as the plant) to match a desired response (referred to herein as the reference signal or the command signal).

Figure 4:
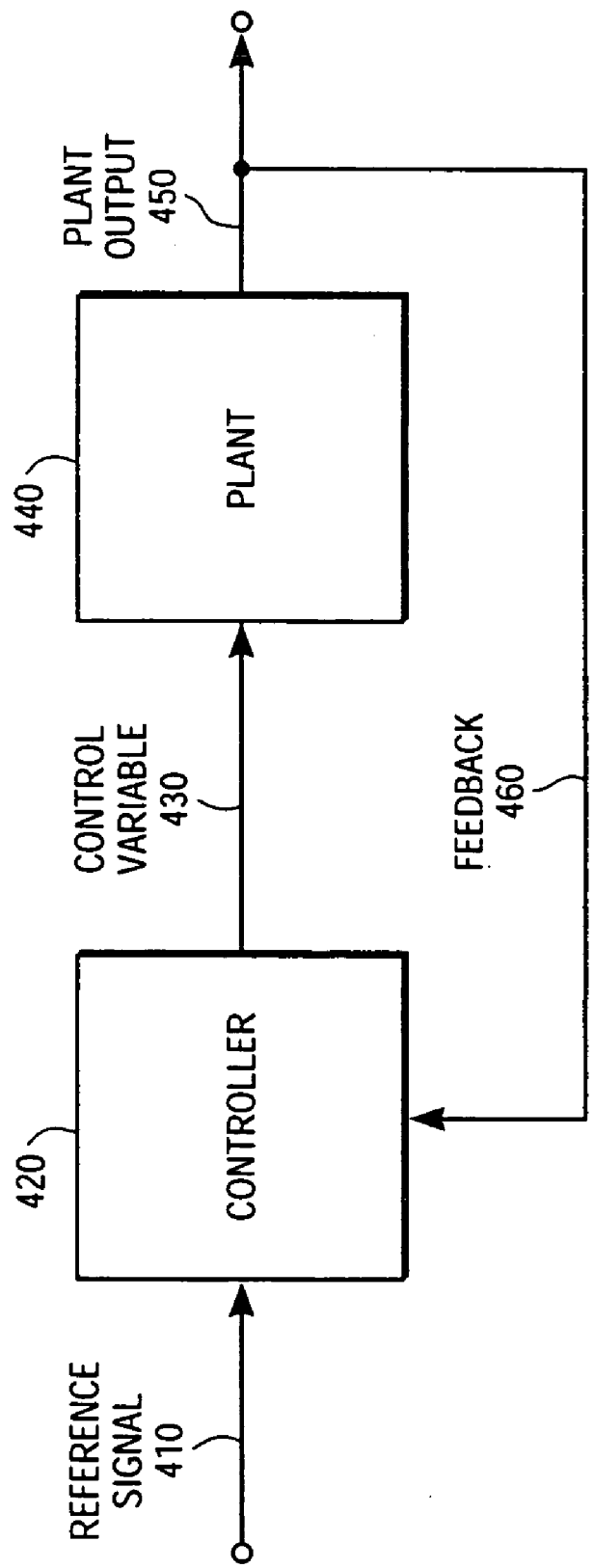
FIG. 4 shows the major elements of an illustrative closed-loop feedback controller with a system.

FIG. 4 shows elements of an illustrative closed-loop feedback controller in a system. Referring to FIG. 4, a controller 420 and a plant 440 are contained in the system. The output of the controller is a control variable 430. The control variable 430 is the input to the plant 440. The plant 440 has one output 450 (referred to herein as the plant response). The controller 420 has two inputs, namely the reference signal 410 and the plant response 450. The system in FIG. 4 is called a "closed loop" system because there is feedback 460 of the plant output 450 back to the controller 420. A feedback loop such as 460 is referred to herein as an external feedback because the feedback loop is external to the controller 420. Controllers without such feedback are called "open loop" controllers. "Open loop" controllers are considerably simpler (and generally less useful in real world applications) than "closed loop" controllers. The actual plant response 450 is typically compared to the externally supplied reference signal 410. This comparison typically entails subtracting these two time-domain signals (i.e., the controller acts only on the difference between the actual plant response 450 and the reference signal 410). When subtraction is used, the subtractor (not shown here) may be shown outside of box 420. In any event, regardless of how the comparison between the plant output and the reference signal is performed and regardless of where it is shown, the purpose of a closed-loop controller is to produce, given the reference signal 410 and the fed-back signal 460, a value for the control variable 430 that causes the plant response to approach and/or match the reference signal in a meritorious way.

Controller 420 may have more than one distinct output (i.e., control variable). Each such control variable is an input to the plant.

Plant 440 may have more than one distinct output 450 that is to be controlled. If a plant has k outputs that are to be controlled, then there are k reference signals and each reference signal is paired with a particular plant output that is to be controlled. Each of the k plant outputs that is to be controlled is compared (e.g., subtracted) from its associated reference signal. The controller uses the results of the k comparisons in determining the output(s) of the controller.

In addition, internal states of a plant are sometimes made available as additional inputs to a controller. Internal states provide additional information to the controller. The number of plant outputs, the number of control variables, and the number of internal states (if any) are, in general, not equal to each other (although they may, by coincidence, be equal).

Figure 5:
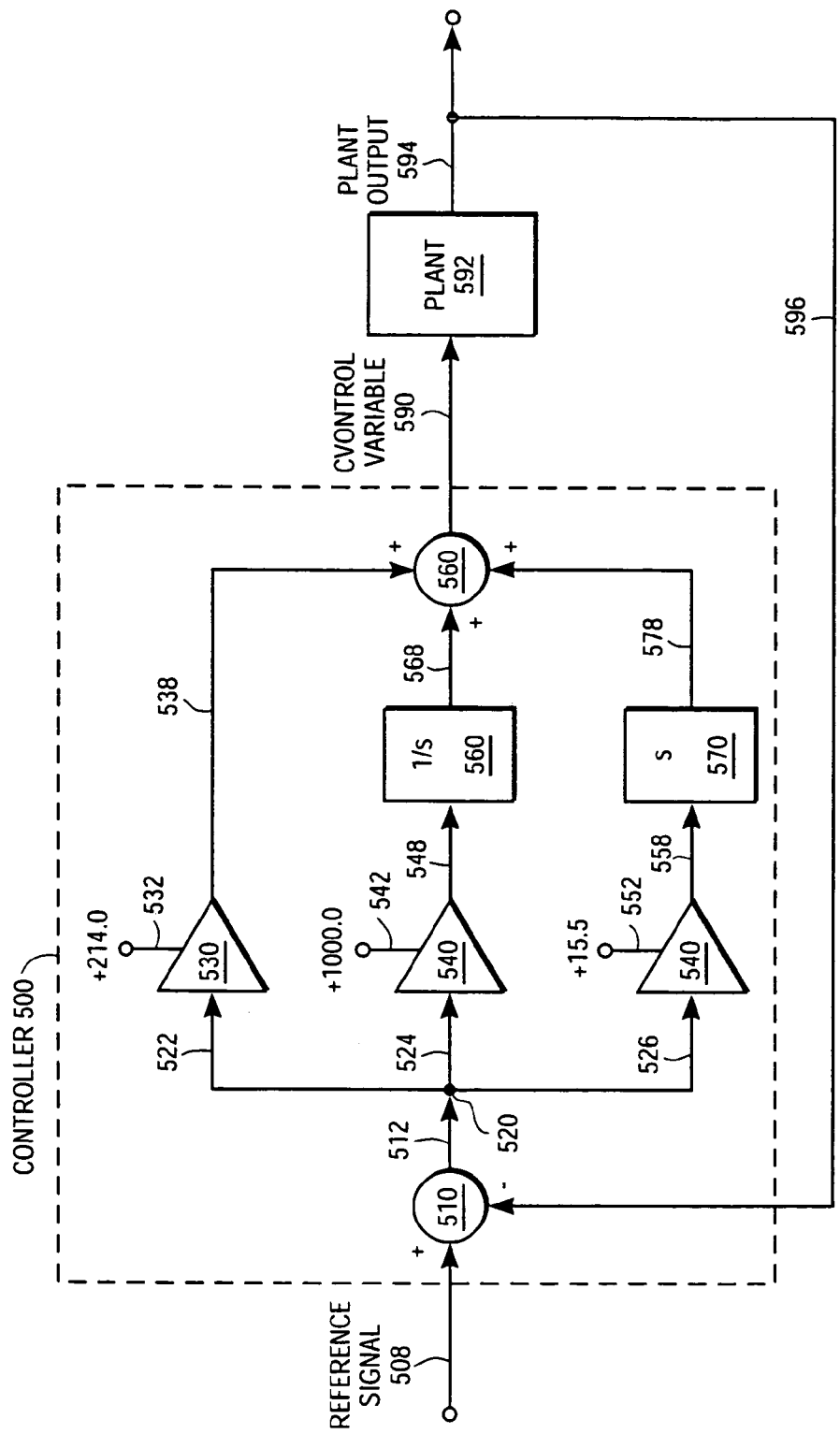
FIG. 5 is a block diagram of an illustrative closed-loop feedback proportional, integral, and derivative ("PID") controller in a system.

FIG. 5 is a block diagram of an illustrative closed-loop feedback controller of the type of controller that is known as a proportional, integral, and derivative ("PID") controller. The closed-loop feedback controller 500 is included in the system. This Figure contains a controller 500 whose output is the control variable signal 590. Control variable 590 is the input signal to the plant 592. The plant's output signal 594 is fed back to the controller, so that the input to the controller 500 consists of the external reference signal 508 as well as the fed-back signal 596 from the plant.

Block diagrams are a useful tool for representing the flow of information in controllers and systems containing controllers. In a block diagram, lines represent signals (say, functions of time). Block diagrams contain various function blocks that process signals. Function blocks in a block diagram have one or more inputs, but always have exactly one output. Lines are directional in that they convey information (a signal) from an origin to a destination. In both of these respects, the directed lines in block diagrams are different from the wires that connect components (e.g., resistors or capacitors) in an electrical circuit.

The internal points of a directed graph may represent signal processing blocks in which lines pointing toward the internal point represent signals coming into the processing block and in which the line pointing away from the internal point represents the block's single output.

In a block diagram for a controller, an external input to the controller is represented by an external point with the directed line pointing away from the point. Similarly, an output from the controller (e.g., the control variable) is represented by an external point with an line pointing toward the point.

In the example in FIG. 5, the directed line 508 conveys an externally supplied reference signal into the function block 510 of controller 500. Function block 510 is an adder. Adders are illustrated as open circles. Adders may have any number of inputs. Each input to an adder is labeled with a positive or negative sign (so that adders may be used to perform both addition and subtraction). Thus, adder 510 performs the function of subtracting the signal 596 (i.e., the fed-back plant output 594) from the externally supplied reference signal 508. The output of function block 510 is the signal on directed line 512. In this example, function block 510 is a subtractor (e.g., comparator) that determines the difference (error) between the plant's actual output 594 and the desired output (the incoming reference signal 508).

Since function blocks produce only one output, there is a need for a way to disseminate a signal to more than one other function block in a block diagram. This need is fulfilled by takeoff points. A takeoff point is represented by a solid circle. In the FIG. 5 example, takeoff point 520 receives signal 512 and trifurcates this signal so that it goes out as signal 522 (and becomes input to function block 530), signal 524 (and becomes input to function block 540), and signal 526 (and becomes input to function block 550).

As previously mentioned, the controller in FIG. 5 is a PID type of controller in which the output of the controller is the sum of a proportional (P) term, an integrating (I) term, and a differentiating (D) term. This sum is performed by function block 580 (a three-input adder).

The first term of this PID controller is a proportional term that passes the comparator's output (512 and 522) into GAIN block 530. GAIN block 530 multiplies (amplifies) its input by a specified constant factor. The amplification factor for GAIN block 530 is the numerical constant 214.0 (532). The amplified result 538 becomes the first of the three inputs to addition block 580. In this figure, GAIN blocks are represented by a triangle with its amplification factor shown as a separate line attached to the triangle. GAIN blocks may also commonly represented as a rectangle with the amplification factor shown inside the rectangle.

The second term of the PID controller is an integral term. In the FIG. 5 example, the comparator's output (524) is first amplified by GAIN block 540 with a gain of 1,000.0 (542) and then passed via the amplified result 548 to INTEGRATOR block 560. INTEGRATOR block 560 then integrates the result (in the time-domain) to produce signal 568. An INTEGRATOR block is illustrated by a rectangle labeled with the transfer function 1/s (where s is the Laplace transform variable). Signal 568 becomes the second of the three inputs to addition block 580.

The third term of the PID controller is a derivative term. In the FIG. 5 example, the comparator's output (526) is first amplified by GAIN block 550 with a gain of 15.5 (552) and then passed via the amplified result 558 to DIFFERENTIATOR block 570. DIFFERENTIATOR block 570 differentiates the result (with respect to time) to produce signal 578. A DIFFERENTIATOR block is illustrated by a rectangle labeled s (where s is the Laplace transform operator). Signal 578 becomes the third of the three inputs to addition block 580.

The output of the controller 500 is the output of addition block 580 (i.e., the control variable signal 590). Control variable 590 is, in turn, the input to the plant 592.

A cycle within the directed graph for a controller represents internal feedback inside that controller.

Notice that this PID controller is a feedforward network in the sense that it has no internal feedback within the controller (i.e., there are no cycles in the directed graph inside controller 500). There is, of course, external feedback in FIG. 5 in the form of the external feedback 596 of the plant output to the subtractor 510 that takes the differences between the plant output and the reference signal 508. Notice also that the output 590 of this PID controller is not made directly available as an input to itself.

A PI controller is similar to a PID controller, but a PI controller consists of only a proportional (P) term and an integrating (I) term (but no derivative term).

PID controllers are in widespread use in industry. As Astrom and Hagglund (1995) noted, Several studies . . . indicate the state of the art of industrial practice of control. The Japan Electric Measuring Instrument Manufacturing Association conducted a survey of the state of process control systems in 1989 . . . . According to the survey, more than 90% of the control loops were of the PID type.

Although PID controllers are in widespread use, the need for better controllers is widely recognized. As Astrom and Hagglund (1995) observed,

[A]udits of paper mills in Canada [show] that a typical mill has more than 2,000 control loops and that 97% use PI control. Only 20% of the control loops were found to work well.

Conventional analytical techniques have been successfully applied over the years to the design of PID controllers and various other specific types of controllers. However, there is no existing general-purpose analytic method for automatically creating a controller for arbitrary linear and non-linear plants that can simultaneously optimize prespecified combinations of performance metrics (such as reducing, and maybe even minimizing, the time required to bring the plant outputs to the desired values as measured by the integral of the time-weighted absolute error or the integral of the squared error), satisfy time-domain constraints (such as overshoot, disturbance rejection, limits on control variables, and limits on state variables), and satisfy frequency domain constraints (bandwidth).

Automatic Synthesis of Controllers

The process of creating (e.g., synthesizing) a design of a controller entails making decisions concerning the total number of processing blocks to be employed in the controller, the type of each block (e.g., lead, lag, gain, integrator, differentiator, adder, inverter, subtractor, and multiplier), the interconnections between the blocks (including the existence, if any, of internal feedback between the processing blocks of the controller) and the values of all numerical parameters for the blocks. In practice today, the design process is channeled along lines established by existing analytical techniques. These conventional analytical techniques often lead to a PID-type controller consisting of exactly one proportional, one integrative, and one derivative processing block.

It would be desirable to have an automatic system for creating, (e.g., synthesizing) the design of a controller that was open-ended in the sense that its outcome was not always a PID controller. It would also be desirable to have an automatic system for synthesizing the design of a controller that was open-ended in the sense that it did not require the human user to pre-specify the topology of the controller (whether a PID topology or other topology), but, instead, automatically produce both the overall topology and parameter values directly from a high-level statement of the requirements of the controller.

In one embodiment, the topology and parameter values for a controller are automatically synthesized. The automatically created controllers may accommodate: one or more externally supplied reference signals; external feedback of one or more plant outputs to the controller; comparisons between the one or more reference signals and their corresponding plant outputs; one or more control variables; zero, one, or more internal state variables of the plant; internal feedback of zero, one, or more signals from one part of the controller to another part of the controller; and direct feedback of the output of the controller as input into the controller.

In one embodiment, the automatically created controller may be composed of processing elements such as, for example, but not limited to, gain blocks, lead blocks, lag blocks, inverter blocks, differential input integrators, differentiators, adders and subtractors and multipliers of time-domain signals, and adders and subtractors and multipliers of numerical values. In one embodiment, these controllers may also contain conditional operators (switches) that operate on time-domain signals.

In addition, the design process described here for automatically creating controllers may readily accommodate time-domain, frequency-domain, and other constraints on the control variables, internal plant state variables, or other variables. The incorporation of these constraints is often intractable using conventional analytical methods.

Repertoire of Functions

The design process described here for automatically creating controllers creates a controller from a composition of functions and terminals.

In one embodiment, the repertoire of functions includes (but is not limited to) a number of functions. These functions are referred to herein as signal processing blocks when they appear in a block diagram of a controller. Any of a number of the following functions may be used to solve a particular problem. In alternate embodiments, other functions may be used. In one embodiment, the following functions are available:

The one-argument INVERTER function negates the time-domain signal represented by its argument.

The one-argument DIFFERENTIATOR function differentiates the time-domain signal represented by its argument. That is, this function applies the transfer function s, where s is the Laplace transform operator.

The one-argument INTEGRATOR function integrates the time-domain signal represented by its one argument. That is, this function applies the transfer function 1/s, where s is the Laplace transform operator.

The two-argument DIFFERENTIAL_INPUT_INTEGRATOR function integrates the time-domain signal representing the difference between its two arguments.

The two-argument LEAD function applies the transfer function 1+τs, where s is the Laplace transform operator and τ is a numerical parameter. The first argument is the time-domain input signal. The second argument, τ, is a numerical parameter representing the time constant (usually expressed in seconds) of the LEAD. The numerical parameter value for this function (and other functions described below) may be represented using one of five different approaches (described below).

The two-argument LAG function applies the transfer function $1/(1+\tau s)$, where s is the Laplace transform operator and τ is a numerical parameter. The first argument is the time-domain input signal. The second argument, τ, is the time constant and is usually expressed in seconds.

The three-argument LAG2 function applies the transfer function $$\frac{\omega_0^2}{s^2 + 2\xi\omega_0 s + \omega_0^2}$$

where s is the Laplace transform operator, $\xi$ is the damping ratio, and $\omega_0$ is the corner frequency. This function has three arguments, namely a time-domain signal and two parameters.

The two-argument ADD_SIGNAL, SUB_SIGNAL, and MULT_SIGNAL functions perform addition, subtraction, and multiplication, respectively, on the time-domain signals represented by their two arguments. The subtraction function is typically implemented as an addition which in which one argument is negated.

The one-argument ABS_SIGNAL function performs the absolute value function on the time-domain signal represented by its argument.

The one-argument SQRT_SIGNAL function performs the square root function on absolute value of the time-domain signal represented by its argument.

The three-argument ADD_3_SIGNAL adds the time-domain signals represented by its three arguments.

The three-argument LIMITER function limits a signal by constraining it between an upper and lower bound. This function returns the value of its first argument (the incoming signal) when its first argument lies between its second and third arguments (the two bounds). If the first argument is greater than its third argument (the upper bound), the function returns its third argument. If its first argument is less than its second argument (the lower bound), the function returns its second argument.

The four-argument DIV_SIGNAL function divides the time-domain signals represented by their two arguments and constrains the resulting output by passing the quotient through a LIMITER function with a specified upper and lower bound. The LIMITER function that is built into the DIV_SIGNAL function protects against the effect of dividing by zero (or by a near-zero value) by returning a specified bound.

The two-argument GAIN function multiplies the time-domain signal represented by its first argument by a constant numerical value represented by its second argument. This numerical value is constant in the sense that it is not a time-domain signal (like the first argument to the GAIN function) and in the sense that this numerical value does not vary when the controller is operating. The GAIN function differs from the MULT_SIGNAL function (described above) in that the second argument of a GAIN function is a constant numerical value, while both arguments of a multiplication function are time-domain signals.

The two-argument BIAS function adds the time-domain signal represented by its first argument to a constant numerical value represented by its second argument. The BIAS function differs from the ADD_SIGNAL function (described above) in that the second argument of a BIAS function is a constant numerical value (i.e., it is not a time-domain signal and its value does not vary when the controller is operating).

The two-argument ADD_NUMERIC, SUB_NUMERIC, and MULT_NUMERIC functions perform addition, subtraction, and multiplication, respectively, on the two constant numerical values represented by their two inputs. These functions operate only on constant numerical values and are used in arithmetic-performing subtrees. Note that the ADD_SIGNAL, SUB_SIGNAL, and MULT_SIGNAL functions operate on time-domain signals, whereas the ADD_NUMERIC, SUB_NUMERIC, and MULT_NUMERIC functions operate on constant numerical values.

The three-argument IF_POSITIVE function is a switching function that operates on three time-domain signals and produces a particular time-domain signal depending on whether its first argument is positive. If, at a given time, the value of the time-domain function in the first argument of the IF_POSITIVE function is positive, the value of the IF_POSITIVE function is the value of the time-domain function in the second argument of the IF_POSITIVE function. If, at a given time, the value of the time-domain function in the first argument of the IF_POSITIVE function is negative or exactly zero, the value of the IF_POSITIVE function is the value of the time-domain function in the third argument of the IF_POSITIVE function. In an alternative embodiment, if, at a given time, the value of the time-domain function in the first argument of the IF_POSITIVE function is exactly zero, the value of the IF_POSITIVE function is the average of the value of the time-domain functions in the second and third arguments of the IF_POSITIVE function.

The four-argument IF_NEAR_ZERO function is a switching function that operates on four time-domain signals and produces a time-domain signal. Its output is its third or fourth argument depending on whether its first argument is close to zero. If, at a given time, the absolute value of the time-domain function in the first argument of the IF_NEAR_ZERO function is less than or equal to the second argument, the value of the IF_NEAR_ZERO function is the value of the time-domain function in the third argument of the IF_NEAR_ZERO function. If, at a given time, the absolute value of the time-domain function in the first argument of the IF_NEAR_ZERO function is greater than the second argument, the value of the IF_NEAR_ZERO function is the value of the time-domain function in the fourth argument of the IF_NEAR_ZERO function.

The one-argument DELAY function implements a transmission line whose one numerical parameter is its time delay. It applies the transfer function $$e^{-sT}$$

where s is the Laplace transform operator and T is the time delay.

Automatically defined functions (e.g., ADF0, ADF1) may also be included in the function set of a particular problem (as described below).

Other Signal Processing Block Functions

The above signal processing block functions are illustrative of the generality and flexibility of the automated design system of the various embodiments described. Many other functions can be created to accommodate the requirements of designing particular classes of controllers. For example, a signal processing block function can be created for other mathematical functions (e.g., squaring, cubing, cube root, logarithm, sine, cosine, exponential) and other versions of the conditional functions.

In addition, functions for discrete-time controllers are well known in the field of control. It is common in the control literature to analyze and design systems in continuous time, but to then implement the controller in discrete time. For example, this approach occurs in sampled data systems with a (usually) fixed time interval between samples. Standard procedures are available to transform continuous-time controllers to discrete-time controllers and to avoid problems (such as aliasing) that arise from the discrete-time sampling of continuous-time signals. These techniques are extensively discussed in the control literature (for example in Astrom and Hagglund, pages 93 to 103).

Repertoire of Terminals

The repertoire of terminals includes (but is not limited to) the following terminals. Typically a particular single problem would not employ all of these possible terminals.

The REFERENCE_SIGNAL is the time-domain signal representing the desired plant response. If there are multiple reference signals, they are named REFERENCE_SIGNAL_0, REFERENCE_SIGNAL_1, and so forth.

The PLANT_OUTPUT is the plant output. If the plant has multiple outputs, the plant outputs are named PLANT_OUTPUT_0, PLANT_OUTPUT_1, and so forth.

The CONTROLLER_OUTPUT is the time-domain signal representing the output of the controller (i.e., the control variable). If the controller has multiple control variables, the control variables are named CONTROLLER_OUTPUT_0, CONTROLLER_OUTPUT_1, and so forth. Note that this signal can be used, if desired, to provide feedback of the controller's output directly back into the controller.

The ERROR terminal is the difference between the time-domain signal representing the desired plant response and the time-domain signal representing the actual to-be-controlled plant response. This terminal is equivalent to $$(\text{SUB\_SIGNAL REFERENCE\_SIGNAL PLANT\_OUTPUT}).$$

If there are multiple reference signals and plant outputs, then the error terminals are named ERROR_1, ERROR_2, and so forth for each reference signal and the plant output to which it is paired. If the ERROR terminal(s) are used, it is not necessary (although it is still permissible) to include the reference signal(s) and plant output(s) in the terminal set of a problem.

If the plant has internal state(s) that are available to the controller, then the terminals STATE_0, STATE_1, etc. are the plant's internal state(s).

The CONSTANT_0 terminal is the constant time-domain signal whose value is always 0. Similar terminals may be defined, if desired, for other particular constant valued time-domain signals.

Additional terminals may also be included in the terminal set to represent numerical parameter values. One of five approaches (described below) may be used for representing numerical parameter values and numerical constant terminals.

Zero-argument automatically defined functions as described below may also be included in the terminal set of a particular problem.

The terminal set of a problem may also include global variables. Global variables are external variables other than the reference signal(s), plant output(s), plant internal state(s), control variable(s), and internally fed-back signal(s), if any. Global variables provide additional information that may be useful to the controller (such as an external parameter such as temperature, the plant's production rate, line speed, flow rate, or the like, or other free variable characterizing the operation of the plant). Global variables may be viewed as free variables of the controller.

Other Terminals

The above terminals are illustrative of the generality and flexibility of the automated design system of the various embodiments described. Other terminals may be used to accommodate the requirements of designing particular classes of controllers.

Automatically Defined Functions

An automatically defined function (ADF) is a function (sometimes referred to herein as a subroutine or DEFUN) whose body is dynamically evolved during the run and which may be invoked (often repeatedly) by the main result-producing branch(es) or by other automatically defined function(s).

In one embodiment, when automatically defined functions are being used, an individual entity consists of a hierarchy of one or more reusable automatically defined functions (function-defining branches, subroutines, subprograms) along with the main result-producing branch(es).

Multi-part program trees having a main program and one or more reusable, parameterized, hierarchically-called automatically defined functions are well-known in the art. For instance, see U.S. Pat. No. 5,343,554, which is incorporated herein by reference.

Automatically defined functions may possess one or more dummy arguments (formal parameters). Often, the automatically defined functions are reused with different instantiations of these dummy arguments. During a run, different automatically defined functions in the function-defining branches of the program may be created; different main programs in the result-producing branch may be created; different instantiations of the dummy arguments of the automatically defined functions in the function-defining branches may be created; and different hierarchical references between the branches may be created.

In one embodiment, when automatically defined functions are being used, the initial random generation is created so that every individual entity conforms to a constrained syntactic structure that includes a particular architectural arrangement of branches (function-defining branches and result-producing branches).

In one embodiment, when crossover is to be performed, a type is assigned to each potential crossover point in the parental computer programs either on a branch-wide basis (referred to herein as branch typing) or on the basis of the actual content of the subtree below the potential crossover point (referred to herein as point typing). Crossover is then performed in a structure-preserving way so as to ensure the syntactic validity of the offspring. Several alternative approaches to typing and structure-preserving crossover are well-known in the art.

It is possible for arithmetic-performing subtrees to invoke automatically defined functions in order to provide reusability of the results of other arithmetic-performing subtrees.

Numerical Parameter Values

Many signal processing block functions (such as, for example, the GAIN, BIAS, LEAD, LAG) possess a numerical parameter value. For example, the GAIN function amplifies an incoming signal by a fixed multiple, called the amplification factor. Similarly, the LEAD and LAG functions each possess an argument representing a time constant. Other signal processing block functions (such as LAG2 and LIMITER) possess more than one numerical parameter values.

Five alternative embodiments that may be used to establish the numerical parameter values are described. In addition, any of a variety of embodiments may be employed that include components of the embodiments described and other suitable components. The first three of these embodiments involve employing a constrained syntactic structure that restricts the numerical parameters to a particular type of structure.

In the first three embodiments, these structures consist of either a single perturbable numerical value (the second embodiment) or an arithmetic-performing subtree containing either perturbable numerical values (the third embodiment) or constant numerical terminals (the first embodiment). The constrained syntactic structure used in these first three embodiments ensures that time-varying signals in the controller (such as the plant output, the controller output, the reference signal, the plant internal states, if any) never affect a parameter value of a signal processing block. The common feature of the first three embodiments is that the resulting numerical value does not vary when the eventual controller is operating in the real world. That is, each parameter value of each signal processing block is always constant-value while the controller is operating.

The fourth and fifth embodiments do not employ a constrained syntactic structure (at least insofar as concerns the representation of numerical parameter values). A single numerical parameter value can be represented using the following five approaches:

(1) an arithmetic-performing subtree consisting of one (and usually more than one) arithmetic functions and one (and usually more than one) constant numerical terminals,
(2) a single perturbable numerical value,
(3) an arithmetic-performing subtree consisting of one (and usually more than one) arithmetic functions and one (and usually more than one) perturbable numerical values,
(4) unrestricted compositions of function and terminals (from the above entire repertoire of functions and terminals) in conjunction with one (and usually more than one) constant numerical value whose value does not change during the time during which the controller operates and does not change individually during the run of the search technique used to create the controller, and
(5) unrestricted compositions of function and terminals (from the above entire repertoire of functions and terminals) in conjunction with one (and usually more than one) perturbable numerical values whose values do not change during the time during which the controller operates, but whose value may change during the run of the search technique used to create the controller.

In a first embodiment, an arithmetic-performing subtree composed of arithmetic functions and constant numerical terminals establishes the numerical parameter value(s) of a signal processing block function. In this embodiment, the arithmetic-performing subtree(s) contains a composition of arithmetic functions (such as addition and subtraction) and constant numerical terminals. The functions in arithmetic-performing subtrees are executed in depth-first order (in accordance with the order of evaluation used in programming languages such as LISP). After the arithmetic-performing subtree is executed, it returns a floating-point value. That value becomes the parameter value for its signal processing function block.

In this first embodiment, the function set, $F_{aps}$, for each arithmetic-performing subtree consists of arithmetic functions, such as addition and subtraction. That is, $$F_{aps} = \{\text{ADD\_NUMERIC}, \text{SUB\_NUMERIC}\}.$$

In one embodiment, a logarithmic scale (described below) is used for interpreting the value returned by an arithmetic-performing subtree. On a (common) logarithmic scale, floating-point numbers ranging between −5.0 and +5.0 are converted into floating-point numbers ranging over 10 orders of magnitude. When this interpretative process is used, multiplication and division (and other functions, such as exponential and logarithmic functions) are usually not included in this function set, $F_{aps}$.

The terminal set, $T_{aps}$, for each arithmetic-performing subtree is $$T_{aps} = \{\Re\}.$$

$\Re$ represents random floating-point constant numerical terminals in a specified range. In this embodiment, these constant numerical terminals may range between +5.0 and −5.0. In the initial random generation (generation 0 of the run), each such constant numerical terminal is set, individually and separately, to a random value in the chosen range. Once set in generation 0, these constant numerical terminals never change during the run. Moreover, these floating-point constant numerical terminals do not vary in value with time (as the controller is operating). These constant numerical terminals are combined in many different ways in arithmetic-performing subtrees as the size and shape of these arithmetic-performing subtrees change during the run as a result of the crossover and mutation operations. As a result, many different numerical values can be created during the run even though no individual constant numerical terminal ever changes during the run. In this first embodiment, automatically defined functions, such as ADF0 may be included in the function set for arithmetic-performing subtrees and their dummy variables (formal parameters), such as ARG0, may be included in the terminal set for arithmetic-performing subtrees. In one embodiment, global variables may be included in the terminal set for arithmetic-performing subtrees.

In a second embodiment, the numerical parameter value(s) of a signal processing block function are established by perturbable numerical values. In this embodiment, each numerical parameter value is implemented as a single perturbable numerical value. These perturbable numerical values may change during the run; however, these perturbable numerical values do not vary in value with time (as the controller is operating). Each perturbable numerical value is subject to a Gaussian perturbation with a specified standard deviation. Each perturbable numerical value may be coded by 30 bits. Each perturbable numerical value ranges between +5.0 and −5.0 (or some other chosen convenient range of values).

In the initial random generation, each such perturbable numerical value is set, individually and separately, to a random value in the chosen range. In later generations, the perturbable numerical value may be perturbed by a relatively small amount determined probabilistically by a Gaussian probability distribution. The existing to-be-perturbed value is considered to be the mean of the Gaussian distribution. A relatively small preset parameter establishes the standard deviation of the Gaussian distribution. This embodiment has the advantage of changing numerical parameter values by a relatively small amount and searching the space of possible parameter values most thoroughly within the immediate neighborhood of the value of the existing value. In one embodiment, the standard deviation of the Gaussian perturbation is one (i.e., corresponding to one order of magnitude if the number is later interpreted on a logarithmic scale as described below). In one embodiment, these perturbations are implemented by a special genetic operation for mutating the perturbable numerical values. It is also possible to perform a special crossover operation on these perturbable numerical values in which a copy of a perturbable numerical value is inserted in lieu of a chosen other perturbable numerical value.

In a third embodiment, arithmetic-performing subtrees and perturbable numerical values may be employed. This embodiment differs from the first embodiment in that perturbable numerical values are used instead of constant numerical terminals. This embodiment differs from the second embodiment in that an entire arithmetic-performing subtree is used (not just a single perturbable numerical value). In this embodiment, a full subtree (including arithmetic functions) is used instead of only a one-point subtree consisting of only a single perturbable numerical value. These perturbable numerical values do change during the run; however, these perturbable numerical values do not vary in value with time (as the controller is operating). This embodiment is advantageous when additional external global variables are present (e.g., where the subtrees consist of arithmetic functions, perturbable numerical values, and additional variable-valued terminals).

In this third embodiment, automatically defined functions, such as ADF0, and their dummy variables (formal parameters), such as ARG0, may be included in the function set for arithmetic-performing subtrees. Further in this embodiment, global variables may be included in the terminal set for arithmetic-performing subtrees.

In a fourth embodiment, a constrained syntactic structure is not employed as in the first three embodiments. In this fourth embodiment, each numerical parameter for a signal processing block is a time-domain signal that may vary when the controller is operating. Terminals representing constant-valued time-domain signals are used in this embodiment. These terminals are analogs in the time domain of the constant numerical values used in the first embodiment. Individually, these constant-valued time-domain signals do not vary during the run of the search technique or during the time when the controller is operating. However, these constant-valued time-domain signals are combined, in an unrestricted way, with one another and with the available functions (such as ADD_SIGNAL, SUB_SIGNAL, and MULT_SIGNAL from the above repertoire of functions) and with the available terminals (such as REFERENCE_SIGNAL, PLANT_OUTPUT, CONTROLLER_OUTPUT from the above repertoire of terminals). After these combinations have been made, the final result for this fourth embodiment is that each numerical parameter for a signal processing block is a time-domain signal that may vary when the controller is operating. The final result for this fourth embodiment is that the numerical parameter for a function (say, the LAG function) is a time-domain signal— thus converting the conventional LAG function into a voltage-controlled LAG function (assuming that the time-domain signal establishing the time constant for the LAG function is considered to be voltage). In contrast, the final result in the first three embodiments is that the numerical parameter for a function (say, the LAG function) is a constant value that never varies when the controller is operating. In this fourth embodiment, the ADD_NUMERIC, SUB_NUMERIC, and MULTI_NUMERIC functions are not used (because ADD_SIGNAL, SUB_SIGNAL, and MULT_SIGNAL serve those purposes).

In a fifth embodiment, a constrained syntactic structure is not employed as in the first three embodiments. In this fourth embodiment, each numerical parameter for a signal processing block is a time-domain signal that may vary when the controller is operating. Perturbable numerical value terminals are used in this embodiment. These perturbable numerical values are treated as constant-valued time-domain signals while the controller is operating. Individually, these perturbable numerical value may vary during the run of the search technique. These perturbable numerical values are combined, in an unrestricted way, with one another and with the available functions (such as ADD_SIGNAL, SUB_SIGNAL, and MULT_SIGNAL from the above repertoire of functions) and with the available terminals (such as REFERENCE_SIGNAL, PLANT_OUTPUT, CONTROLLER_OUTPUT from the above repertoire of terminals). After these combinations have been made, the final result for this fifth embodiment is that each numerical parameter for a signal processing block is a time-domain signal that may vary when the controller is operating. As with the fourth embodiment, the final result for this fifth embodiment is that the numerical parameter for a function (say, the LAG function) is a time-domain signal—thus converting the conventional LAG function into a voltage-controlled LAG function. In this fifth embodiment, the ADD_NUMERIC, SUB_NUMERIC, and MULTI_NUMERIC functions are not used.

The time-varying parameter values permitted in the fourth and fifth embodiments greatly expand the complexity of the controllers that can be created by the process of the present invention.

Although five embodiments to represent the numerical parameter values have been described, it will be apparent to one skilled in the art that the present invention may be practiced by any of a variety of embodiments.

The value returned by arithmetic-performing subtree or perturbable numerical value, determined by any embodiments above, is typically interpreted. In one embodiment of this interpretative process, a logarithmic scale is used for this interpretation. On a (common) logarithmic scale, numbers ranging between −5.0 and +5.0 are converted into numbers ranging over 10 orders of magnitude.

In one embodiment of this interpretive process, a three-step process is used to interpret an arithmetic-performing subtree or single perturbable numerical value. First, the arithmetic-performing subtree or perturbable numerical value is evaluated. Each arithmetic-performing subtree is executed in a depth-first order (in accordance with the order of evaluation used in programming languages such as LISP) to produce a floating-point number. Each perturbable numerical value is decoded (from, for example, its 30-bit encoding) to a floating-point number. The floating-point number that is returned is referred to as X.

Second, X is used to produce an intermediate value U in the range of −5 to +5 in the following way: if the return value X is between −5.0 and +5.0, an intermediate value U is set to the value X returned by the subtree. If the return value X is less than −100 or greater than +100, U is set to a saturating value of zero. If the return value X is between −100 and −5.0, U is found from the straight line connecting the points (−100, 0) and (−5, −5). If the return value X is between +5.0 and +100, U is found from the straight line connecting (5, 5) and (100, 0).

Third, the actual value is calculated as the antilogarithm (base 10) of the intermediate value U (i.e., $10^U$).

The embodiments employing perturbable numerical values have the advantage of conducting the search for parameter values for signal processing blocks in the numerical neighborhood of values that are already known to be reasonably good (because the individuals to which the genetic operations are applied are selected on the basis of fitness). Experience (albeit limited) suggests that the embodiments employing perturbable numerical values generally appear to solve problems more quickly than the other embodiments.

Use of Signal Processing Block Functions and Terminals for Describing A Plant

One purpose of the above repertoire of signal processing block functions and terminals is to provide potential ingredients for controllers (that are to be automatically created during the run using the methods described herein).

This same set of functions and terminals may be used to describe the plant. In control problems, the controller interacts with the plant's output (and reference signal) and the plant interacts with the controller in continuous time. The behavior of each part of the overall system (composed of both the controller and plant) depends, in continuous time, on the behavior of each of the parts. Modeling the plant with the same set of ingredients as the controller is highly advantageous because it permits the controller and plant to be simulated as a whole with a single run of a single simulator. In one embodiment, a SPICE simulator is used to simulate the combination of the controller and plant.

Figure 6:
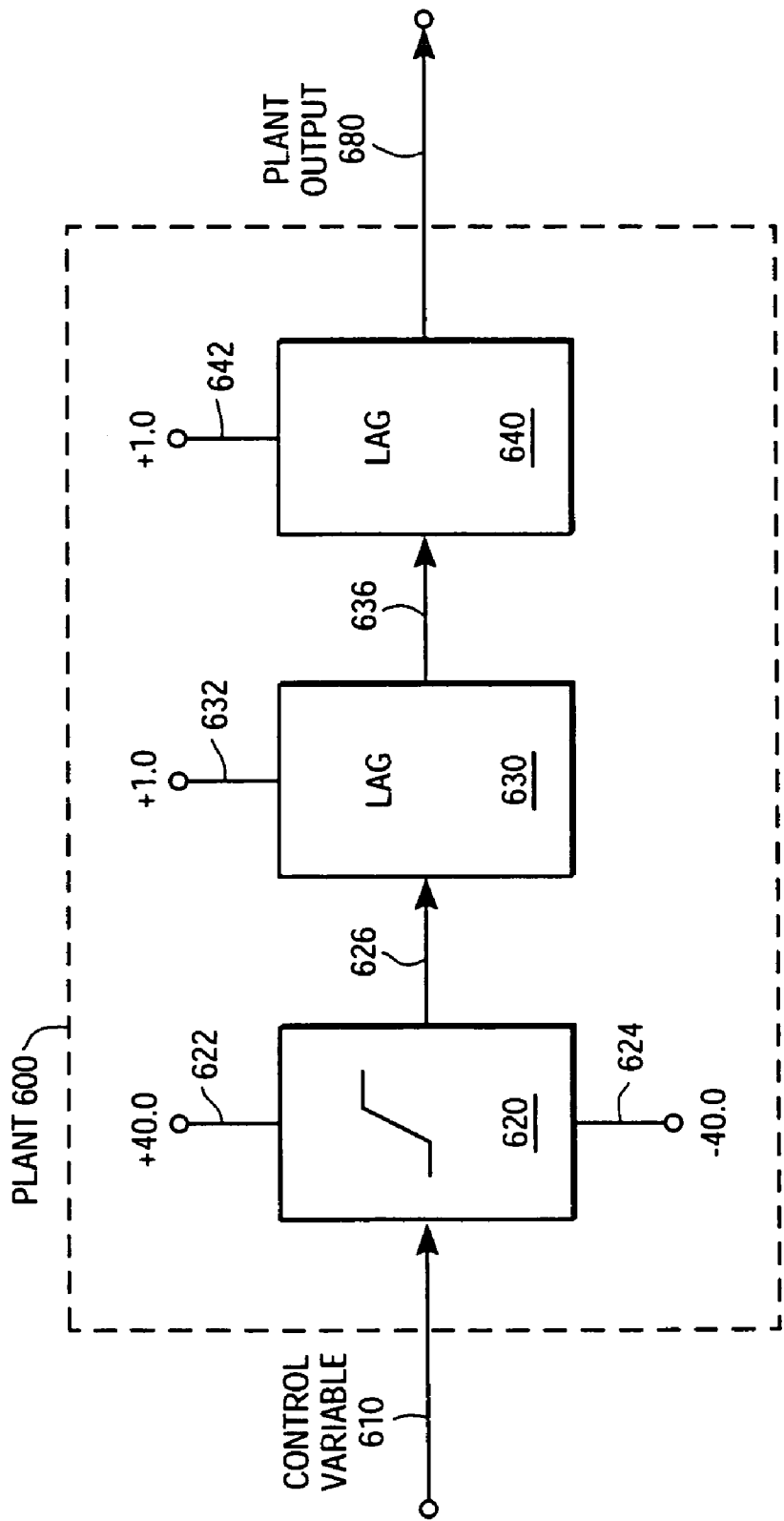
FIG. 6 shows an illustrative two-lag plant with a limiter block.

FIG. 6 illustrates a two-lag plant 600 comprising a series composition of a LIMITER block 620 (with a range −40.0 volts 624 to +40.0 volts 622) and two LAG blocks (630 and 640) (each with a lag of 1.0 (632 and 642 respectively)). Control variable 610 is the input to plant 600. Control variable 610 is first passed into LIMITER function block 620 whose upper limit is established by the numerical parameter +40.0 volts 622 and whose lower limit is established by the numerical parameter −40.0 volts 624. LIMITER function block 620 outputs signal 626 which is passed to first LAG block 630. LAG block 630 establishes a lag based upon the numerical parameter 1.0 (632). LAG block 630 outputs signal 636 which is passed into second LAG block 640. LAG block 640 establishes a lag based upon the numerical parameter 1.0 (642). LAG block 640 yields plant output 680.

Seven Representations for Controllers

In the embodiments described here, seven different representations for controllers are used. In alternate embodiments, any applicable representation may be used. Each representation is useful in its own way for making particular points about controllers, for doing certain types of analysis or simulations, or for facilitating the search for a satisfactory controller in the space of candidate controllers. The seven representations are as follows:
 (1) a block diagram (directed graph),
 (2) a Laplace transform operator,
 (3) a program tree, (4) a symbolic expression (S-expression) in LISP,
(5) an expression in Mathematica,
(6) a connection list for the block diagram, and
(7) a SPICE netlist.

Block Diagram Representation

The block diagram representation for a PID controller has already been described in connection with the discussion concerning FIG. 5 above.

Laplace Transform Operator Representation

In one embodiment, controllers may be represented by a transfer function in the form of quotients of two polynomials in the Laplace transform operators. The techniques for converting a block diagram of a controller into the Laplace transform operator representation are well-known in the art. The Laplace transform operator representation corresponding to the block diagram for the PID controller of FIG. 5 is $$G(s) = 214.0 + \frac{1000.0}{s} + 15.5s$$
$$= \frac{214.0s + 1000.0 + 15.5s^2}{s}$$

In the above expression, the first term is the proportional (P) term of the PID controller. An amplification factor of 214.0 is associated with this proportional term. The second term is the integral (I) term. An amplification factor of 1000.0 is associated with this integrative term. The third term is the derivative (D) term. An amplification factor of 15.5 is associated with this derivative term.

Program Tree Representation

A controller may also be represented as a point-labeled tree with ordered branches (e.g., a program tree). Such program trees may be represented as LISP symbolic expressions (S-expressions).

The terminals of such program trees correspond to inputs to the controller, numerically valued constants, or numerically valued variables. The terminals may include the reference signal, the plant output, and any of the other terminals, such as those in the above repertoire of terminals.

The functions in such program trees correspond to the signal processing blocks in a block diagram representing the controller. The functions may include any of the functions in the above repertoire of functions. Some functions operate on signals while others operate on numerically valued constants or numerically valued variables.

The value returned by a function in a program tree corresponds to the output of that function. The value returned by an entire result-producing branch of the program tree corresponds to an output of the controller (i.e., one control variable) that is to be passed from the controller to the plant. If the controller has more than one control variable, the program tree has one result-producing branch for each control variable.

Each result-producing branch is a composition of the functions and terminals from the above repertoire of functions and terminals.

Figure 7:
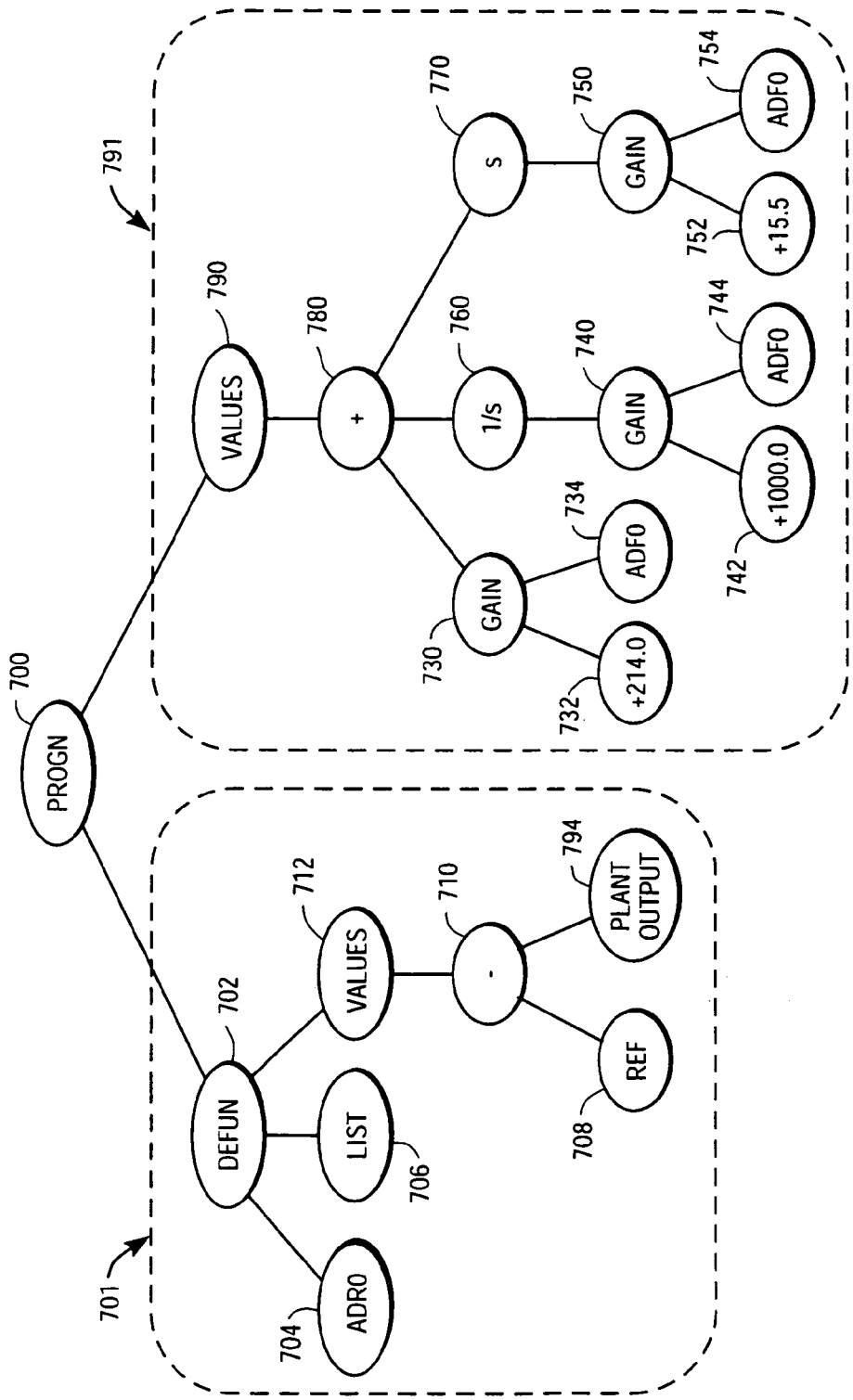
FIG. 7 presents the block diagram for the PID controller of FIG. 5 as a program tree.

FIG. 7 is one representation of the block diagram for the PID controller of FIG. 5. The top-most point of the overall program tree in FIG. 7 is the two-argument PROGN 700. In the LISP programming language, a PROGN sequentially executes its arguments and returns only the value of its final argument. The first argument of the PROGN (i.e., left branch 701) is a function-defining branch that defines the automatically defined function (subroutine) named ADF0. The second argument (i.e., right branch 791) is the main result-producing branch of the overall program.

Within the function-defining branch 701, the automatically defined function ADF0 is defined by DEFUN 702. The function definition for ADF0 has three parts. First, the function definition specifies the name of the automatically defined function, ADF0 704. Second, the function definition specifies the argument list of the function. In one embodiment, the arguments (e.g., ARG0, ARG1, and so forth) may appear as arguments to the LIST 706. In FIG. 7, however, ADF0 has no dummy variables (formal parameters) and LIST 706 has no arguments. Third, the function definition consists of the body of ADF0. In FIG. 7, the body of ADF0 is the subtree appearing as the argument of VALUES 712. In a LISP expression, VALUES returns the value(s) produced by execution of a subtree. In FIG. 7, the body of ADF0 consists of the three points labeled 710, 708, and 794. In this example, the body of ADF0 applies the two-argument subtraction function 710 to two arguments: the reference signal 708 and the plant output 794. Once the automatically defined function (subroutine) ADF0 is defined, the value produced by the subtraction (of the plant output 794 from the reference signal 708) is available elsewhere in the program tree. In the case of the PID controller of FIG. 5, automatically defined function ADF0 corresponds to the takeoff point 520. The takeoff point 520 disseminates the value 512 produced by the subtraction of the plant output 594 from the reference signal 508 to three places 522, 524, and 526.

Referring again to FIG. 7, within the result-producing branch 791, PROGN 700 executes the VALUES 790 that returns the value produced by the 12-point subtree rooted at the three-argument addition (+) function 780.

The first argument of the three-argument addition function 780 is the two-argument GAIN function 730 (corresponding to the gain block 530 of FIG. 5). The first argument of GAIN function 730 is the constant valued signal +214.0 (732) (corresponding to the parameter (amplification factor) of +214.0 (532) of FIG. 5). The second argument of GAIN function 730 is the value returned by automatically defined function (subroutine) ADF0, that is, the difference signal between the reference signal 708 and the plant output 794 (corresponding to the value tapped off the takeoff point 520 of FIG. 5). The value returned by the GAIN function 730 is the first argument to the-three-argument addition function 780 (corresponding to signal 538 and addition function 580 of FIG. 5).

The second argument of the three-argument addition function 780 is the one-argument integration function 760 in which the Laplace transform is 1/s. This one-argument integration function 760 corresponds to integration block 560 of FIG. 5. Referring again to FIG. 7, the one argument input to integration function 760 is the result produced by the two-argument GAIN function 740 (corresponding to gain block 540 of FIG. 5). The first argument of GAIN function 740 is the constant valued signal +1000.0 (742) (corresponding to the amplification factor of +1000.0 (542) of FIG. 5). The second argument of GAIN function 740 is the value returned by ADF0 704, namely the difference between the reference signal 708 and the plant output 794 (corresponding to the value tapped off the takeoff point 520 of FIG. 5). The value returned by the integration function 760 is the second argument to the three-argument addition function 780 (corresponding to signal 568 and addition function 580 of FIG. 5).

The third argument of the three-argument addition function 780 is the one-argument differentiation function 770 in which the Laplace transform is s. This one-argument differentiation function 770 corresponds to differentiation block 570 of FIG. 5. Referring again to FIG. 7, the one argument input to differentiation function 770 is the result produced by the two-argument GAIN function 750 (corresponding to gain block 550 of FIG. 5). The first argument of GAIN function 750 is the constant valued signal +15.5 (752) (corresponding to the amplification factor of +15.5 (552) of FIG. 5). The second argument of GAIN function 750 is the value returned by ADF0, that is the difference signal between the reference signal 708 and the plant output 794 (corresponding to the value tapped off the takeoff point 520 of FIG. 5). The value returned by the differentiation function 770 is the third argument to the three-argument addition function 780 (corresponding to signal 578 and addition function 580 of FIG. 5).

The value produced by the 12-point subtree rooted at the three-argument addition function 780 (corresponding to the signal produced by addition block 580 of FIG. 5) is returned to VALUES 790. This value becomes the value returned by PROGN 700 and becomes the output of the overall program of FIG. 7. The value returned by PROGN 700 is the output of the controller (corresponding to the control variable 590 of FIG. 5).

Optionally each of the three occurrences at 734, 744, and 754 of the invocation of ADF0 may be replaced by a three-point subtree consisting of a subtraction function operating on the reference signal and the plant output without affecting the value returned by PROGN 700. However, FIG. 7 corresponds more closely to the block diagram of FIG. 5 because the explicit definition of ADF0 in FIG. 7 reflects the fact that the block diagram of FIG. 5 has a takeoff point (520) that disseminates this difference signal to three places (522, 524, and 526).

PID controllers do not employ internal feedback within the controller. That is, PID controllers are feed-forward in the sense that the incoming signals (the reference signal and the plant output) move progressively through the various signal processing blocks of the controller in such a way that there is never an instance where the output of a signal processing block of the controller is fed back as the input to an earlier signal processing block of the controller. However, internal feedback may be useful with different types of controllers.

Figure 8:
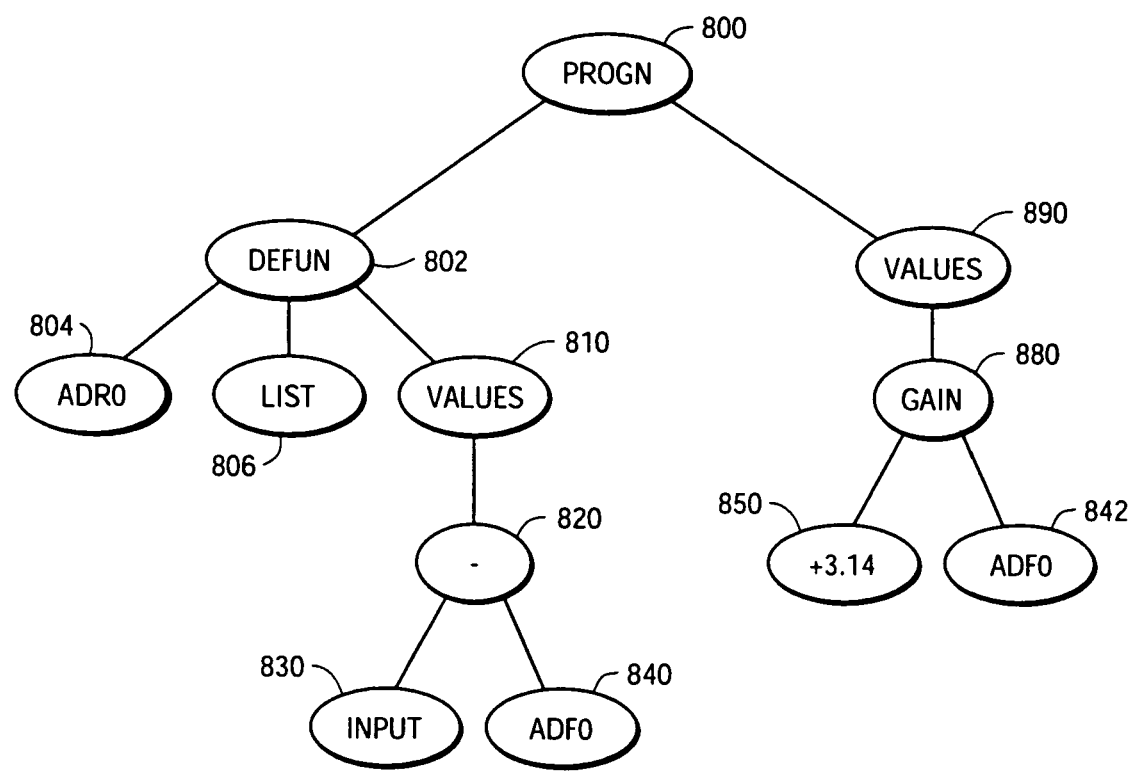
FIG. 8 illustrates how internal feedback (recursion) can be represented by a S-expression.
Figure 9:
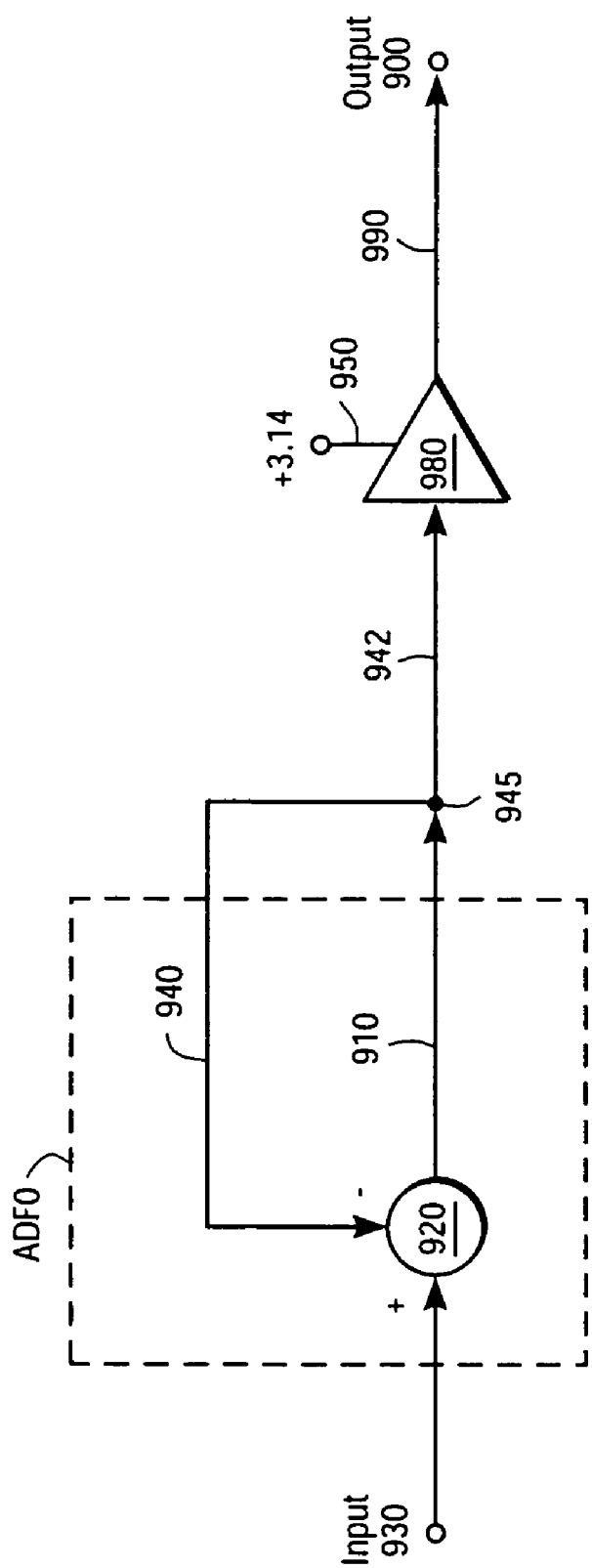
FIG. 9 illustrates how internal feedback can be represented in a block diagram.

In one embodiment, automatically defined functions (such as, for example, ADF0 in FIG. 7) may provide a mechanism for implementing internal feedback within a controller. FIG. 8 illustrates internal feedback (recursion) as represented by a LISP S-expression. FIG. 9 illustrates internal feedback as represented by a block diagram.

Referring to FIG. 8, the overall program tree consists of a function-defining branch for automatically defined function ADF0 and a result-producing branch. The tree is rooted at PROGN 800.

Within the result-producing branch in the right part of FIG. 8, VALUES 890 returns the value produced by the three-point subtree rooted at the two-argument GAIN function 880. The GAIN function 880 amplifies the signal ADF0 842 by an amplification factor of +3.14 (850).

Within the function-defining branch in the left part of FIG. 8, the automatically defined function ADF0 is defined by DEFUN 802. The name of the automatically defined function is ADF0 (804). The argument list is rooted at LIST 806 and is empty. The body of the ADF0 function is the three-point subtree rooted at the two-argument subtraction function 820 and consists of the three points 820, 830, and 840. The body of ADF0 applies the two-argument addition function to INPUT 830 and to ADF0 840. This sum is returned to VALUES 810 and becomes the value returned by ADF0 whenever ADF0 is invoked. Note that in the style of ordinary computer programming, a reference to ADF0 from inside the function definition for ADF0 would be considered to be a recursive reference. In the context of control structures, ADF0 is simply a signal that is made available for dissemination throughout the overall program tree (in particular, to 842 and 840). That is, the automatically defined function creates a takeoff point.

FIG. 9 is the block diagram corresponding to the S-expression of FIG. 8. Referring to FIG. 9, signal 940 is subtracted from input signal 930 by subtraction block 920. The sum 910 is then passed to takeoff point 945. Takeoff point 945 disseminates the output of addition block 920 to two places. First, takeoff point 945 disseminates the output of addition block 920 (via connection 942) to GAIN block 980. GAIN block 980 amplifies this signal by an amplification factor of +3.14 (950) and produces the final output at OUTPUT 900. Second, takeoff point 945 sends the output of addition block 920 via connection 940 to addition block 920. The signal at takeoff point 945 corresponds to the signal produced by ADF0 and makes this signal available as internal feedback (recursion) to addition block 920 inside ADF0. The portion of the block diagram of a controller generated by an automatically defined function (whether created for the purpose of internal feedback within the controller or for the purpose of disseminating a value to more than one point within the controller) may be viewed as a sub-controller.

Figure 21:
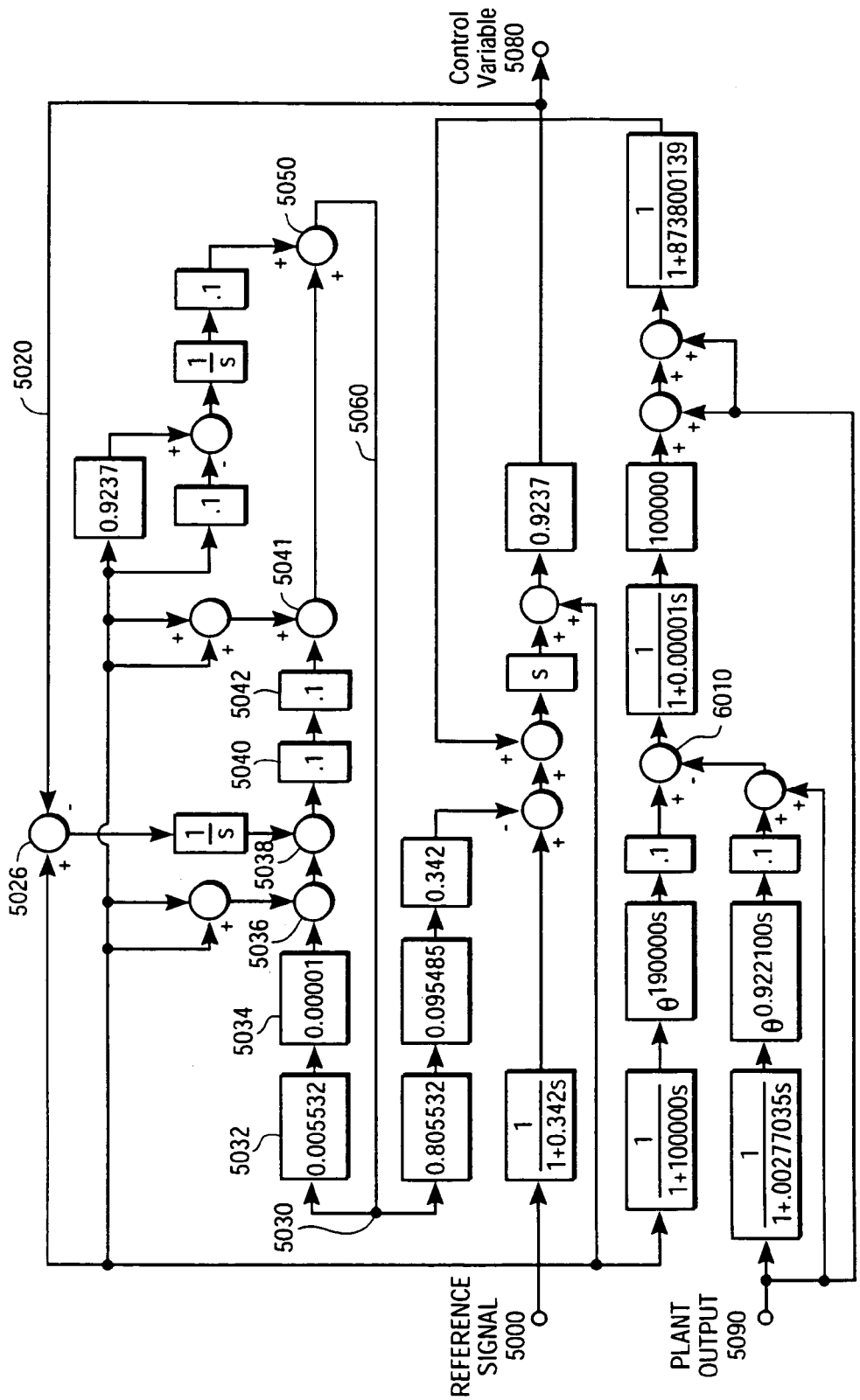
FIG. 21 shows internal feedback of the output of the best-of-generation controller from generation 155 for plant with five-second delay

The example of FIGS. 8 and 9 were created for the purpose of illustration. FIG. 21 (explained in detail later) presents an example of internal feedback that was produced by an actual run of the process of the present invention.

In interpreting the effect of automatically defined functions in a program tree representing a controller, it is important to remember that the controller interacts with the plant's output and reference signal and that the plant interacts with the controller's output. These interactions may occur simultaneously in continuous time for continuous-time controller (or in discrete time for discrete-time controllers). For both types of controllers, the behavior of each part of the overall system (composed of both the controller and plant) depends on the simultaneous behavior of each of the parts of the system. Thus, the interpretation of a program tree with automatically defined functions representing a controller differs from the interpretation of a program tree representing an ordinary computer program. Typically, the individual functions of an ordinary computer program are executed separately, in time, in accordance with a specified "order of evaluation" so that the result of the execution of one function is available at the time when the next function is executed. For example, the functions in a subroutine (automatically defined function) in an ordinary computer program would typically be executed at the time the subroutine is invoked and the subroutine would typically then produce a result that is then available when the next function is executed. There is no "order of evaluation" in controllers.

Symbolic Expression Representation

The PID controller of FIG. 5 may be represented by a composition of functions and terminals from the above repertoire of functions and terminals. This representation is in accord with the style of symbolic expressions (S-expressions) in the LISP programming language.

The LISP program below consists of a function definition (DEFUN) for automatically defined function (subroutine) ADF0 and a main result-producing branch. A LISP S-expression for the FIG. 5 example is as follows:

| 1  | (PROGN |
|----|--------|
| 2  | (DEFUN ADF0 ( ) |
| 3  | (VALUES |
| 4  | (− REFERENCE PLANT_OUTPUT))) |
| 5  | (VALUES |
| 6  | (+ |
| 7  | (GAIN 214.0 ADF0) |
| 8  | (DERIVATIVE (GAIN 1000.0 ADF0)) |
| 9  | (INTEGRATOR (GAIN 15.5 ADF0)))) |
| 10 | ) |

In this S-expression, lines 2 through 4 constitute the function definition (DEFUN) for automatically defined function (subroutine) ADF0 and lines 5 through 9 constitute the main result-producing branch. The zero-argument automatically defined function ADF0 computes the difference between the reference signal and the plant output and makes the result available to the main result-producing branch. The result-producing branch, in turn, refers to this difference three times.

On line 7, the GAIN signal processing function amplifies the difference (the value returned by ADF0) by an amplification factor of +214.0. On line 8, the GAIN function amplifies the difference (ADF0) by +1,000.0 and the DERIVATIVE function then differentiates the time-domain signal produced by this GAIN function. On line 9, the GAIN function amplifies the difference (ADF0) by +15.5 and the INTERGRATOR function then integrates the time-domain signal produced by this GAIN function. The three-argument addition function on line 6 sums the results produced on lines 7, 8, and 9 and the VALUES on line 5 returns the result of the overall program.

In this example, the automatically defined function (subroutine) ADF0 provides the mechanism for disseminating a particular signal (the difference) to multiple places (on lines 7, 8, and 9) and corresponds to the takeoff point 520 of FIG. 5.

Mathematica Representation

The above LISP S-expression for the PID controller of FIG. 5 may be converted to the following two equations:

$$\text{RPB0}==((214.0 \bullet \text{ADF0})+((1000.0 \bullet \text{ADF0})*s)+((15.5 \bullet \text{ADF0})/s))$$

$$\text{ADF0}==(\text{REFERENCE-PLANT\_OUTPUT})$$

The "Solve" command of a symbolic algebra package such as Mathematica to solve the above system of two equations for RPB0 and ADF0 yields $$\text{RPB0}=(214.0+15.5/s+1000.0*s)(\text{REFERENCE-PLANT\_OUTPUT})$$

$$\text{ADF0}=\text{REFERENCE-PLANT\_OUTPUT}$$

This solution represents the transfer functions at the points labeled RPB0 and ADF0 of the controller.

Since RPB0 is the output of the controller, the transfer function of the controller is $$(214.0+15.5/s+1000.0*s)(\text{REFERENCE-PLANT\_OUTPUT})$$

Although the Mathematica representation of this PID controller has no internal feedback, Mathematica may be used for other controllers which do have internal feedback.

Connection List for Block Diagrams

A connection list for a block diagram is a data structure that defines both the topology and the parameter values of each element of a block diagram. Each line of a connection list for a block diagram corresponds to one signal processing block of the block diagram. Each line of a connection list of a block diagram contains the name of a processing block, the points to which each input and output of that processing block is connected, and the parameters(s), if any, of that signal processing block.

The connection list for the block diagram of the PID controller of FIG. 5 and the plant of FIG. 6 is as follows:

1 508 596 512 SUBTRACT
2 512 538 GAIN 214.0
3 512 548 GAIN 1000.0
4 548 568 INTEGRATOR
5 512 558 GAIN 15.5
6 558 578 DERIVATIVE
7 538 568 578 590 ADDITION
8 590 626 LIMITER −40.0 40.0
9 626 636 LAG 1.0
10 636 596 LAG 1.0

Note that the above connection list includes both the controller and the plant. Each line of a connection list begins with a group of two or more numbers, each number representing an input or output signal of one signal processing block in the block diagram. The connection list for a block diagram reflects the directionality of all connections between signal processing blocks. In this regard, the last of this group of numbers represents the (one) output signal of the signal processing block. The one (or more) other number of this group represent the input(s) to the signal processing block. If the signal processing function possesses parameter values, then the parameter value(s) follow the name of the function.

Lines 1 through 7 of this connection list represent the block diagram of the controller of FIG. 5 while lines 8 through 10 represent the block diagram of the plant of FIG. 6.

Line 1 of this connection list for a block diagram indicates that the two-argument SUBTRACT function (corresponding to 510 of FIG. 5), has inputs 508 and 596, and has output signal 512. In this example, the inputs to this function are ordered. The first input 508 represents the positive input to the SUBTRACT function while the second input 596 represents the negative input.

Line 2 indicates that the one-argument GAIN function (corresponding to 530 of FIG. 5) has input signal 512 and output signal 538. In addition, line 2 indicates that the function has a parameter value (amplification factor) for this signal processing block of +214.0 (corresponding to 532 of FIG. 5). Output 512 of the SUBTRACT function of line 1 is the input to this GAIN function of line 2, and the input to the GAIN functions in lines 3 and 5. Line 2 corresponds to the proportional part of the PID controller of FIG. 5.

Line 3 indicates that GAIN function (corresponding to 540 of FIG. 5) has input signal 512 and output signal 548. In addition, line 3 indicates that the parameter value (amplification factor) for this signal processing block is +1000.0 (corresponding to 542 of FIG. 5). Line 4 indicates that INTERGRATOR function (corresponding to 560 of FIG. 5) has input signal 548 and output signal 568. Lines 3 and 4 together correspond to the integrative part of the PID controller of FIG. 5.

Line 5 indicates that GAIN function (corresponding to 550 of FIG. 5) has input signal 512 and output signal 558. In addition, line 5 indicates that the parameter value (amplification factor) for this signal processing block is +15.5 (corresponding to 552 of FIG. 5). Line 6 indicates that DERIVATIVE function (corresponding to 570 of FIG. 5) has input signal 558 and output signal 578. Lines 5 and 6 together correspond to the derivative part of the PID controller of FIG. 5.

Line 7 indicates that the three-argument ADDITION function (corresponding to 580 in FIG. 5) has positive inputs 538, 568, and 578 and that this ADDITION function has output signal 590, corresponding to the control variable of the PID controller (590 of FIG. 5).

Line 8 indicates that the three-argument LIMITER function (corresponding to 620 of FIG. 6) has input 590, has output signal 626, and that the two parameter values (upper and lower limits) for this LIMITER block are −40.0 and +40.0 (corresponding to 624 and 622, respectively, of FIG. 6).

Line 9 indicates that the two-argument LAG function (corresponding to 630 of FIG. 6) has input 626, has output signal 636, and that the parameter value for this LAG function is +1.0 (corresponding to 632 of FIG. 6).

Line 10 indicates that the two-argument LAG function (corresponding to 640 in FIG. 6) has input 636, has output signal 596 (i.e., the plant output), and that the parameter value for this LAG function is +1.0 (corresponding to 642 of FIG. 6).

This exemplary connection list for a block diagram is a conceptual device that permits the description of both the topology and parameter values of both the controller and plant.

SPICE Netlist Representation

It may be advantageous to use a simulator to simulate the combination of the controller and plant. To do this, the topology and parameter values for the controller and plant are first converted into input suitable to the simulator.

In one embodiment, the SPICE simulator (an acronym for "Simulation Program with Integrated Circuit Emphasis") is used for simulating controllers and plants. SPICE is a large family of programs written over several decades at the University of California at Berkeley for the simulation of analog, digital, and mixed analog/digital electrical circuits. SPICE3 (Quarles, Newton, Pederson, and Sangiovanni-Vincentelli 1994) is currently the most recent version of Berkeley SPICE. It consists of about 217,000 lines of C source code residing in 878 separate files.

The required input to the SPICE simulator, for example, consists of a netlist along with some specific commands and other information required by the SPICE simulator. The netlist contains information about the topology and parameter values of a controller and plant. The required netlist for SPICE can be derived directly from the above connection list for block diagrams. (The input to simulators other than SPICE contain information similar to that contained in the above connection list augmented by certain commands and other information required by the particular simulator).

The SPICE simulator was originally designed for simulating electrical circuits. Circuit diagrams differ from block diagrams in several important ways. In particular, the leads of a circuit's electrical components are joined at nodes, so there is no preordained directionality in circuits (as there is in block diagrams). In addition, SPICE does not ordinarily handle many of the signal processing functions contained in the typical connection list for the block diagram for a controller and plant. In particular, electrical circuits do not contain many of the previously described repertoire of signal processing functions and terminals for controllers, such as derivative, integral, lead, and lag. Nonetheless, the above connection list for a block diagram can be converted into a netlist suitable as input to the SPICE simulator in the manner described below. This is accomplished by using the facility of SPICE to create subcircuit definitions and the facility of SPICE to implement mathematical calculations. As will be shown, the behavior of the signal processing functions that characterize block diagrams (such as derivative, integral, lead, and lag) may be simulated using appropriate combinations of electrical components.

In one embodiment, in order to simulate a circuit with SPICE, the user provides the SPICE simulator with a netlist describing the circuit to be analyzed, and the SPICE commands that instruct SPICE as to the type of analysis to be performed and the nature of the output to be produced.

SPICE commands begin with a period at the beginning of the line. In one embodiment, the input file to SPICE contains the following items:

(1) a command line (always first) that names the circuit to be simulated,
(2) the netlist of the circuit to be simulated,
(3) commands that instruct SPICE to perform certain types of analysis or to perform certain other tasks,
(4) subcircuit definitions, and
(5) an END command (always last).

Certain SPICE commands identify the probe (output) points of the circuit and may specify the desired types of analyses to be performed on the signals at the probe points. For example, a TRAN command causes SPICE to perform a transient analysis in the time domain. A PLOT command causes SPICE to provide the sequence of values of a specified signal (called a "probe point"). SPICE may be instructed to perform more than one type of analysis and to plot more than one value for a particular circuit. Comments in the SPICE input file are indicated by an asterisk at the beginning of the line which are ignored by the SPICE simulator.

FIG. 10 is an exemplary SPICE input file that simulates the PID controller of FIG. 5, the two-lag plant of FIG. 6, and a special additional circuit to calculate the integral of the time-weighted error (ITAE). In addition, the file in FIG. 10 also contains several additional subcircuit definitions that may not be required by this PID controller circuit.

Referring to FIG. 10, lines 7–13 simulate the PID controller 500 of FIG. 5. Lines 19–25 represent the two-lag plant 592 (FIG. 5) and 600 (FIG. 6). Line 29 calls the subcircuit used to calculate the integral of time-weighted error (ITAE). Line 33 provides the reference signal 508 (FIG. 5).

The first active line of the input file to SPICE is line 7 which simulates the subtraction at block 510 of FIG. 5.

```
X1 508 596 512 SUBV_SUBCKT
```

The "X" at the beginning of a line indicates that a subcircuit definition is being invoked. SPICE supports subcircuit definition using the SUBCKT command. The SUBCKT command enables a particular topological combination of components (each with associated component values) to be defined once and thereafter be included in the netlist of a circuit as if they were a single primitive component. Each SUBCKT definition in SPICE consists of the name of the subcircuit, one or more formal parameters that identify its leads, a netlist that defines the subcircuit, and the ENDS command (which includes the name of the subcircuit if nested subcircuit definitions are being used). Each SUBCKT definition has its own local numbering of components and nodes. A subcircuit definition in SPICE resembles a definition for a subroutine in several ways. For example, once defined, a subcircuit may be invoked multiple times. Moreover, a subcircuit may be invoked with different instantiations of their dummy arguments (formal parameters). In this instance, the invoked subcircuit is the SUBV (subtraction) subcircuit. The SLBV subcircuit possesses three dummy variables (formal parameters) and is defined at lines 42–44.

Line 42 of this subcircuit definition connects the subcircuit into the invoking circuit with three nodes, termed 1, 2, and 3. These nodes (1, 2, and 3) are entirely local to the subcircuit definition and may, if desired, be used in other subcircuit definitions or in the main circuit. The body of a subcircuit definition begins on line 43. The B at the beginning of this line indicates that this line is a mathematical formula. In this formula, 0 represents ground. The 3 is associated with the voltage between dummy node 3 and ground (node 0). The variable V is associated with dummy node 3 and the variable V is defined to be the difference between the voltage at dummy node 1 and the voltage at dummy node 2. Thus, this subcircuit performs the the mathematical function of subtracting the voltage at dummy node 2 from the voltage at dummy node 1 and returns a voltage equal to the difference between dummy node 3 and ground (node 0). Line 44 ends the subcircuit definition.

Other mathematical functions may be similarly defined and the definitions for a number of mathematical functions are illustrated in the SPICE input file shown herein. These mathematical functions may include multiplication (MULV), division (DIVV), absolute value (ABS), addition of two inputs (ADDV), addition of three inputs (ADD3), and a one-argument negation (INVERTER) function.

In one embodiment, electrical components may be used to perform the mathematical functions described. For example, subtraction may be performed using an inverter circuit and an adder (joining of two leads) and multiplication (and other functions) may be performed using a computational circuit for multiplication. However, the computational circuit required for multiplication (and certain other mathematical functions) may entail an intricate combination of numerous components. SPICE permits the mixing of mathematical functions and electrical components. SPICE may be used to implement certain mathematical functions by writing a formula.

When the SUBV subcircuit is invoked on line 7, the SPICE file simulates outputting a voltage at node 512 that is equal to the difference between the voltage at node 508 (the reference signal of FIG. 5) and the voltage at node 596 (the plant output).

Line 8 performs the the mathematical function of multiplying the voltage at node 512 by +214.0 (the just-computed difference between the reference signal and the plant output) and outputting a voltage equal to the product between node 538 and ground (node 0). That is, line 8 simulates the proportional (P) part of the PID controller (corresponding to the GAIN function block 530 of FIG. 5).

Referring again to FIG. 10, lines 9 and 10 simulate the integrative (I) part of the PID controller (corresponding to the GAIN function block 540 and the integrative function block 560 of FIG. 5).

Line 9 performs the the mathematical function of multiplying the voltage at node 512 (the difference between the reference signal and the plant output) by +1000.0 and puts a voltage equal to the product between node 548 and ground (node 0). Thus, line 9 simulates the GAIN function block 540 of FIG. 5.

Line 10 invokes the DII subcircuit definition for the DII (DIFFERENTIAL_INPUT_INTEGRATOR) function which is defined at lines 92–97 of FIG. 10. In the example, the integration is simulated with a combination of a 1 farad capacitor (C), line 95, and a 1 Gigaohm resistor (R), line 94. The capacitor has an initial charge (voltage difference) of 0 volts. The voltage across a capacitor is proportional to the integral of current with respect to time. Line 10 simulates the integrative function block 560 of FIG. 5.

Referring again to FIG. 10, lines 11 and 12 simulate the derivative (D) part of the PID controller (corresponding to the GAIN function block 550 and the derivative function block 570 of FIG. 5).

Line 11 performs the the mathematical function of multiplying the voltage at node 512 (the difference between the reference signal and the plant output) by +15.5 and outputs a voltage equal to the product between node 558 and ground (node 0). Thus, line 11 corresponds to the GAIN function block 550 of FIG. 5.

Line 12 invokes the subcircuit definition for the DIFFB (derivative) function. Line 12 thus simulates the derivative function block 570 of FIG. 5. The DIFFB function is defined at lines 84–88 of FIG. 10.

The subcircuit definition at line 84 has two arguments (the two nodes 1 and 2). The body of this subcircuit definition consists of the three lines 85–87. The G at line 85 defines a voltage-controlled current source (VCCS) that converts the voltage between local node 1 and node 0 (ground) to a current flowing from local node 4 to node 0. The L at the beginning of line 86 defines an inductor (with component value of 1 Henry) that is located between local node 4 and ground (node 0). An inductor may be used to simulate the the mathematical function of differentiation. The voltage across an inductor is equal to the inductance L times the derivative of current with respect to time. The B at the beginning of line 87 defines a voltage at local node 4 that is inverted (negated) and the result is associated with dummy node 2. Thus, the DIFFB subcircuit differentiates the incoming voltage at dummy node 1 and places the output voltage at dummny node 2.

Referring again to FIG. 10, fine 13 invokes the three-argument addition subcircuit (ADD3) which is defined at lines 54–56. Line 13 simulates the addition block 580 of FIG. 5 adding 538 (the P part of the PIC controller), 568 (the I part), and 578 (the D part). The output of the ADD3 signal processing block, and the result of line 13, is the control variable 590 (i.e., the output of the controller).

Lines 19–25 of FIG. 10 simulate the two-lag plant (labeled 600 in FIG. 6 and 592 in FIG. 5).

Line 19 invokes the three-argument limiter subcircuit (UMBI) which is defined at lines 128–131. Line 19 simulates limiter block 620 of the plant of FIG. 6. The input to the limiter is the control variable signal 590 of FIG. 5 (i.e., the output of the controller) and the output of the limiter is signal 626 of FIG. 6. The limiter function possesses two numerical arguments: the lower and upper limit for the limiter. Node 622 is referenced on line 19. The upper limit of +40 volts is specified for the limiter on line 22. Also, node 624 is referenced on line 19. The lower limit of −40 volts is specified for the limiter on line 23. (The conventional order of items on lines of an input file to SPICE are different from the order used on the connection list for a block diagram.)

Line 20 of FIG. 10 invokes the first of the two two-argument LAG subcircuits of the plant and simulates the lag block 630 of FIG. 6. The LAG subcircuit is defined at lines 101–106. The input to this first LAG in the plant is signal 626 (coming from the limiter) and its output is signal 636. This first LAG in the plant possesses one numerical argument, namely node 632 referenced on line 20. A parameter value of 1 is specified for the LAG on line 24.

Similarly, line 21 invokes the second of the two LAG subcircuits for the plant. Line 21 simulates the lag block 640 of FIG. 6 and is again defined at lines 101–106. The input to this second LAG in the plant is signal 636 (coming from the first LAG) and its output is the plant output (labeled 594 in FIG. 5 and 680 in FIG. 6). The one numerical argument of this first LAG in the plant is specified by signal 642 in which the value (i.e., 1) is specified on line 25.

The performance of a controller may be evaluated in numerous ways. In one embodiment, the integral of the time-weighted error (MTAE) is frequently a part of the evaluation of the performance of controller. In one embodiment, various signals (usually including both the reference signal(s) and the plant output(s)) are captured and used externally to evaluate the performance of the controller. In an alternate embodiment, the performance of the controller may be evaluated in-line with the controller and plant. This is the case with ITAE. It is highly convenient to do such in-line evaluation when it is possible.

Line 29 invokes a subcircuit ITAE which is defined at lines 139–157 of FIG. 10. This subcircuit calculates the integral of time-weighted error between the reference signal 508 and the plant output 594 and makes the resulting integrated value available at node 7 (a node that may then be probed from the outside in order to compute the fitness of the individual controller). The reference signal here is created by the seven-argument PULSE function in SPICE which is invoked at line 33. In one embodiment, the reference signal in this example file is a step function that starts at 0 volts, rises to 1 volt at 0.1 seconds, has a rise time of 0.001 seconds, has a fall time of 0.001 seconds, has a pulse width of 10 seconds (i.e., greater than the 9.6 seconds of the transient analysis described below), and a period of 15 seconds (again greater than the 9.6 seconds of the transient analysis described below).

The illustrative example of FIG. 10 uses two commands to SPICE, namely a TRAN command (line 37) and a PLOT command (line 38).

The SPICE command

.TRAN 0.08 9.6 0.000 0.04 UIC instructs SPICE to perform a transient analysis in the time domain in step sizes of 0.08 seconds between an ending time of 9.6 seconds and a starting time of 0.000 seconds. The fourth parameter (0.04 seconds) is a limit on the step size used by the SPICE simulator. The "UIC" instructs SPICE to "use the initial conditions for the command (in this case, for the DII subcircuit).

The SPICE command

.PLOT V (7)

instructs SPICE to capture the behavior of the circuit in terms of the voltage v (7) at node 7. The signal at node 7 is the integral of time-weighted error that is calculated by the ITAE subcircuit (invoked on line 29). Thus, the output of the SPICE simulation is the tabular sequence of values of ITAE between 0 and 9.6 seconds. The value of ITAE for the final time (9.6 seconds) may then be used to calculate the fitness of the individual controller, together with other elements of the fitness measure.

Constrained Syntactic Structure of the Individual Trees

An individual tree may consist of a main result-producing branch(es) and zero, one, or more automatically defined functions (function-defining branches). Each of these branches may comprise a variety of functions and terminals in a variety of compositions.

In one embodiment, the functions in the trees are divided into three categories:

(1) signal processing block functions,
(2) automatically defined functions that appear in the function-defining branches and that enable both internal feedback within a controller and the dissemination of the output from a particular signal processing block within a controller to two or more other points in the block diagram of the controller, and
(3) functions that may appear in arithmetic-performing subtrees for the purpose of establishing the numerical parameter value for certain signal processing block functions (the first and third approach for representing numerical parameter values as described above).

Both the trees in the initial generation 0 and any subtrees created by the mutation operation in later generations are randomly created in accordance with a constrained syntactic structure (strong typing) that limits the particular functions and terminals that may appear at particular points in each particular branch of the overall program tree.

If an automatically defined function possesses arguments, then these dummy arguments (called ARG0, ARG1, and so forth) appear in the automatically defined function, but not in the main result-producing branch of the overall tree. Thus, automatically defined functions may contain ingredients of a different character than other types of subtrees found in the overall program tree.

For example, consider the embodiment in which arithmetic-performing subtrees are used to establish parameter values. These arithmetic-performing subtrees may be subjected to modification during the run by the operations of crossover and mutation. When performing the crossover operation on individuals containing arithmetic-performing subtrees and when the crossover point of the first parent is in an arithmetic-performing subtree, then the choice of crossover points in the second parent is restricted to an arithmetic-performing subtree of the second parent. When performing the mutation operation on arithmetic-performing subtrees, a new subtree is created at the chosen mutation point with the arithmetic-performing subtree using the same random growth method that was used in creating arithmetic-performing subtrees in the initial random generation of the run.

In the embodiment in which the numerical parameter value required by signal processing blocks are established by use of a perturbable numerical values, the approach is different when such perturbable numerical value are subjected to modification during the run. This modification may be performed by a special mutation operation that operates only on perturbable numerical values. The special mutation operation for perturbable numerical values perturbs the existing perturbable numerical value by a relatively small amount determined probabilistically by a Gaussian probability distribution.

Multiple references to the same automatically defined function enable the result produced by an automatically defined function to be disseminated to multiple places in the block diagram of the overall controller.

Thus, both the fact that automatically defined functions may be parameterized and the fact that automatically defined functions may be reused increase the variety and complexity of controllers that may be automatically created using the process of the present invention.

In one embodiment, a constrained syntactic structure is used to create all subtrees in the overall tree. The constraints of this constrained syntactic structure are preserved when genetic operations such as crossover (in genetic programming) are performed (e.g., by using structure-preserving crossover with point typing in genetic programming). Similarly, the constraints are preserved when operations such as mutation (whether in genetic programming, simulated annealing, or hill climbing) are performed. The initial use of a constrained syntactic structure in randomly creating subtrees and the preservation of this constrained syntactic structure when crossover is performed preserves the validity of all individuals throughout the run.

It should be remembered that the individual entities that are encountered during a run of a search technique using the embodiments described herein are, in general, of different sizes and shapes. In general, individuals have different total numbers of functions and terminals. In general, they have different hierarchical arrangements of their functions and terminals. Also, in general, they have different architectural arrangements of their result-producing branch(es) and their automatically defined function(s). Moreover, in general, their automatically defined function(s), if any, each possess different numbers of arguments.

Internal Feedback and Disseminating the Output of a Processing Block to Multiple Destinations The above elements may be sufficient for representing many block diagrams for controllers; however, these elements may not represent certain topologies that are useful for some controllers.

For example, the above elements may not be sufficient for representing internal feedback within a controller. In addition, the above elements may not be sufficient for disseminating the single output of a particular signal processing block to two or more other points (e.g., processing blocks) in the block diagram of the controller.

Many controllers in actual use today are part of a closed loop system in which the output of the controller (i.e., its control variables) are passed into the plant and in which the output of the plant is fed back into the controller—often after taking the difference between the actual plant output and the desired plant output (the reference signal). This arrangement is termed an "external feedback." For example, although the PID controller of FIG. 5 receives external feedback from the plant output by means of the ERROR terminal; however, the PID controller does not have any internal feedback within the controller (i.e., there is no loop in the directed graph inside the box labeled "Controller" in FIG. 5). In FIG. 5, the PID controller is an entirely feedforward network. Although many controllers in actual use today are constructed without internal feedback, internal feedback within a controller may be useful in certain situations.

Also, it is also useful, in many cases, to be able to disseminate the output of a particular processing block within a controller to two or more other points in the block diagram of the controller. There is, for example, such dissemination of the output of any processing block in the PID controller of FIG. 5 to multiple points in the block diagram.

In one embodiment, the automatically defined function (ADF) may provide a convenient mechanism for enabling both internal feedback within a controller and disseminating the output of a particular processing block within a controller to two or more other points in the block diagram of the controller.

In one embodiment, program trees in the initial random generation (generation 0) of a run may consist only of result-producing branches. Automatically defined functions are introduced incrementally (and somewhat sparingly) on subsequent generations by means of the architecture-altering operations. Automatically defined functions provide a mechanism for reusing useful compositions of functions and terminals within the controller. Moreover, in control problems, the function set for each automatically defined function includes each existing automatically defined function (including itself). Thus, automatically defined function provide a mechanism for internal feedback within the to-be-evolved controller. In one embodiment, each automatically defined function is a composition of the functions and terminals appropriate for control problems, all existing automatically defined functions, and (possibly) dummy variables (formal parameters) that permit parameterization of the automatically defined functions.

In one embodiment, each branch of each program tree of the run is created in accordance with a constrained syntactic structure. The validity of the structure of programs trees is preserved by using structure-preserving operations during the run.

Parameterized automatically defined functions provide additional avenues of variety and complexity in the connectivity within the block diagram of a controller. When an automatically defined function possesses a dummy variable (formal parameter), the automatically defined function acquires an additional input that, in general, contributes to the final result that is produced. That is, the final result produced by the automatically defined function is a consequence of all the terminals of the automatically defined function, including the dummy variable (i.e., ARG0).

In one embodiment, for example, the to-be-evolved controller may accommodate one or more externally supplied reference signals, external feedback of one or more plant outputs to the controller, computations of error between the reference signals and the corresponding external plant outputs, one or more internal state variables of the plant, and one or more control variables passed between the controller and the plant. These automatically created controllers may also accommodate internal feedback of one or more signals from one part of the controller to another part of the controller. The amount of internal feedback, if any, is automatically determined during the run.

Two-lag Plant Problem

An example of the process for automatically creating (e.g., synthesizing) a controller is presented below in which a problem calling for the design of a robust controller for a two-lag plant is described. This controller is described in *Modern Control Systems* by Richard C. Dorf and Robert H. Bishop, 8$^{th}$ Editron, Addison-Wesley, Menlo Park, Calif.: 1998 (hereinafter, Dorf & Bishop). In this section, the search technique of genetic programming is applied to this problem to synthesize the controller.

A textbook proportional, integrative, and derivative (PID) compensator preceded by a lowpass pre-filter delivers credible performance on this problem. A PID controller contains a first derivative processing block together with a purely proportional processing block and an integrative processing block. In describing their solution, Dorf & Bishop state that they "obtain the optimum ITAE transfer function." By this, they mean they obtained the optimum controller given that they had decided in advance to employ a PID controller.

The result produced by genetic programming differs from a conventional proportional, integrative, and derivative (PID) controller in that the genetically evolved controller employs a second derivative. The genetically evolved controller is 2.42 times better than the Dorf & Bishop controller as measured by the criterion used by Dorf & Bishop (namely, the integral of the time-weighted absolute error). In addition, as compared to the controller of Dorf & Bishop, the genetically evolved controller has only 71% of the rise time in response to the reference input, has only 32% of the settling time, and is 8.97 times better in terms of suppressing the effects of disturbance at the plant input.

A goal of this illustrative problem is to create both the topology and parameter values for a controller for a two-lag plant such that plant output reaches the level of the reference signal so as to minimize the integral of the time-weighted error (ITAE), such that the overshoot in response to a step input is less than 2%, and such that the controller is robust in the face of significant variation in the plant's internal gain, K, and the plant's time constant, τ.

Specifically, the transfer function of the plant is $$G(s) = \frac{K}{(1+\tau s)^2}.$$

The plant's internal gain, K, is varied from 1 to 2 and the plant's time constant, τ, is varied from 0.5 to 1.0.

Two additional constraints were added to the problem. The first constraint is that the input to the plant is limited to the range between −40 and +40 volts. Limiting the output of the controller (i.e., the control variable passing into the plant) reflects the limitations of real world actuators: a motor has a maximum armature current; a furnace a maximum rate of heat production, etc. The second constraint is that the closed loop frequency response of the system is below a 40 dB per decade lowpass curve whose corner is at 100 Hz. This bandwidth limitation reflects the desirability of limiting the effect of high frequency noise in the reference input. These two constraints are of the type that are often implicit in work in the field of control.

In addition, a 2% overshoot requirement was used for the illustrative problem as compared to a less stringent 4% overshoot used by Dorf & Bishop.

Preparatory Steps for Two-lag Plant

Genetic programming was chosen as the iterative search process used to illustrate this problem (and the other problems below). However, alternate search process may be used. In one embodiment, before applying genetic programming to a problem, six major preparatory steps are preferred: (1) identify the terminals for the program trees, (2) identify the functions for the program trees, (3) define the fitness measure, (4) choose control parameters for the run, (5) determine the termination criterion and method of result designation, and (6) determine the architecture of the program trees.

Program Architecture for Two-lag Plant

Since there is one result-producing branch in the program tree for each output from the controller and this problem involves a one-output controller, each program tree has one result-producing branch. Each program tree also has up to five automatically defined functions. Each program tree in the initial random generation (generation 0) has no automatically defined functions. However, in subsequent generations, architecture-altering operations may insert and delete automatically defined functions to individual program trees. The insertion of an automatically defined function is a precondition for the creation of internal feedback within a controller. Thus, the architecture-altering operations that create automatically defined functions are the vehicle by which genetic programming may create internal feedback within a controller.

Terminal Sets for Two-lag Plant

In this problem, arithmetic-performing subtrees involving constant numerical terminals were used to establish the values of the numerical parameter(s) for the signal processing blocks in the overall program tree. That is, the first of the five embodiments (described above) for representing numerical parameter values for signal processing block functions was used. A constrained syntactic structure enforces a different function and terminal set for the arithmetic-performing subtrees (as opposed to all other parts of the program tree).

The terminal set, T, for every part of the result-producing branch and any automatically defined functions, except the arithmetic-performing subtrees, is

T={CONSTANT_0, REFERENCE_SIGNAL, CONTROLLER_OUTPUT, PLANT_OUTPUT}.

The terminal set, $T_{aps}$, for the arithmetic-performing subtrees that establish parameter values for signal processing blocks is $T_{aps}$={$\Re$}.

Here $\Re$ denotes constant numerical terminals in the range from −1.0 to +1.0.

Function Sets for Two-lag Plant

The function set, F, for every part of the result-producing branch and any automatically defined function, except the arithmetic-performing subtrees, is F={GAIN, INVERTER, LEAD, LAG, LAG2, DIFFERENTIAL_INPUT_INTEGRATOR, DIFFERENTIATOR, ADD_SIGNAL, SUB_SIGNAL, ADD_3_SIGNAL, ADF0, ADF1, ADF2, ADF3, ADF4}.

The function set, $F_{aps}$, for the arithmetic-performing subtrees that establish parameter values for signal processing blocks as follows:

$F_{aps}$={ADD_NUMERIC, SUB_NUMERIC}.

Fitness Measure for Two-lag Plant

The search for a satisfactory controller is conducted in the space of compositions of the available functions and terminals identified above. The search is guided by a fitness measure. The fitness measure is a mathematical implementation of the high-level requirements of the problem. The fitness measure is couched in terms of "what needs to be done"—not "how to do it."

The fitness measure may incorporate measurable, observable, or calculable behavior or characteristic or combination of behaviors or characteristics. The fitness measure for most problems of controller design is multi-objective in the sense that there are several different (usually conflicting) requirements for the controller. Construction of the fitness measure requires translating the high-level requirements of the problem into a precise computation.

In one embodiment, the fitness of each individual is determined by executing the program tree (i.e., the result-producing branch and any automatically defined functions that may be present) to produce an interconnected arrangement of signal processing blocks (that is, the block diagram for the controller). The netlist for the resulting controller is constructed from the block diagram. This netlist is wrapped inside an appropriate set of SPICE commands and the controller is then simulated using our modified version of the SPICE simulator (*SPICE 3 Version 3F5 User's Manual* by Thomas Quarles, A. R. Newton, D. U. Pederson, and A. Sangiovanni-Vincentelli, Department of Electrical Engineering and Computer Science, University of California, Berkeley, Calif,: 1994 (hereinafter Quarles et al.). The SPICE simulator returns tabular and other information from which the fitness of the individual can be computed (as described below).

In an alternate embodiment, some or all of the elements of the fitness measure (e.g., integral of time-weighted absolute error) may be computed directly by the SPICE simulator (using a subcircuit that implements the ITAE). In addition, other simulators, such as SIMULINK from The Math Works Inc., may be used.

For this illustrative problem, the fitness of a controller was measured using 10 elements as follows:

(1) eight time-domain-based elements based on a modified integral of time-weighted absolute error (ITAE) measuring the achievement of the desired value of the plant response, the controller's robustness, and the controller's avoidance of overshoot, (2) one time-domain-based element measuring the controller's stability when faced with an extreme spiked reference signal, and (3) one frequency-domain-based element measuring the reasonableness of the controller's frequency response.

The fitness of an individual controller is the sum of the detrimental contributions of these 10 elements of the fitness measure. The smaller the fitness, the better.

The first eight elements of the fitness measure together evaluate how quickly the controller causes the plant to reach the reference signal, the robustness of the controller in face of significant variations the plant's internal gain and the plant's time constant, and the success of the controller in avoiding overshoot. These eight elements of the fitness measure represent the eight choices of a particular one of two different values of the plant's internal gain, K, in conjunction with a particular one of two different values of the plant's time constant $\tau$, in conjunction with a particular one of two different values for the height of the reference signal. For this illustrative problem, the two values of K were 1.0 and 2.0 and the two values of $\tau$ were 0.5 and 1.0. For this example, the first reference signal was a step function that rises from 0 to 1 volts at t=100 milliseconds and the second reference signal rises from 0 to 1 microvolts at t=100 milliseconds. The two values of K and $\tau$ were used in order to obtain a robust controller. The two step functions were used to deal with the non-linearity caused by the limiter. For each of these eight fitness cases, a transient (time-domain) analysis was performed in the time domain using the SPICE simulator (Quarles, Newton, Pederson, and Sangiovanni-Vincentelli 1994).

The contribution to fitness for each of these first eight elements of the fitness measure is based on the integral of time-weighted absolute error (ITAE):

$$\int_{t=0}^{9.6} t|e(t)|A(e(t))Bdt.$$

The integration runs from time t=0 to t=9.6 seconds. Here e(t) is the difference (error) at time t between the plant output and the reference signal. The integral of time-weighted absolute error penalizes differences that occur later more heavily than differences that occur earlier. In an alternate embodiment, the integral of the squared error (ISE) may be used.

For this problem, the integral of time-weighted absolute error was modified in three ways.

First, a discrete approximation to the integral was used by considering 120 80-millisecond time steps between t=0 to t=9.6 seconds.

Second, each fitness case was multiplied by the reciprocal of the amplitude of the reference signals so that both reference signals (1 microvolt and 1 volt) were equally influential. Specifically, B was a factor that was used to normalize the contributions associated with the two step functions. B multiplies the difference e(t) associated with the 1-volt step function by 1 and multiplies the difference e(t) associated with the 1-microvolt step function by $10^6$.

Third, the integral contained an additional weight, A, that varied depending on e(t) and that heavily penalizes non-compliant amounts of overshoot. The function A weights all variation below the reference signal and up to 2% above the reference signal by a factor of 1.0 and heavily penalizes overshoots over 2% by a factor 10.0.

The ninth element of the fitness measure evaluated the stability of the controller when faced with an extreme spiked reference signal. The spiked reference signal rises to $10^{-9}$ volts at time t=0 and persists for 10-nanoseconds. The reference signal is then 0 for all other times. For this problem, an additional transient analysis was performed using the SPICE simulator for 121 fitness cases representing times t=0 to t=120 microseconds. If the plant output never exceeded a fixed limit of $10^{-8}$ volts (i.e., a order of magnitude greater than the pulse's magnitude) for any of these 121 fitness cases, then this element of the fitness measure was zero. However, if the absolute value of plant output exceeded $10^{-8}$ volts for any time t, then the contribution to fitness was 500×(0.000120−t), where t is a first time (in seconds) at which the absolute value of plant output exceeds $10^{-8}$ volts. This penalty is a ramp starting at the point (0, 0.06) and ending at the point (1.2, 0), so that 0.06 seconds is the maximum penalty and 0 is the minimum penalty.

The tenth element of the fitness measure was designed to constrain the frequency of the control variable so as to avoid extreme high frequencies in the demands placed upon the plant. This term reflects the kind of constraint that is often required in real-world systems in order to prevent damage to delicate components of plants. If the frequency of the control variable is acceptable, this element of the fitness measure will be zero. For this illustrative problem, this element of the fitness measure was based on 121 fitness cases representing 121 frequencies. Specifically, SPICE was instructed to perform an AC sweep of the reference signal over 20 sampled frequencies (equally spaced on a logarithmic scale) in each of six decades of frequency between 0.01 Hz and 10,000 Hz. For this problem, a gain of 0 dB was considered ideal for the 80 fitness cases in the first four decades of frequency between 0.01 Hz and 100 Hz; however, a gain of up to +3 dB was considered acceptable. The contribution to fitness for each of these 80 fitness cases was zero if the gain was ideal or acceptable, but 18/121 per fitness case otherwise. For this problem, the ideal gain for the 41 fitness cases in the two decades between 100 Hz and 10,000 Hz was given by the straight line connecting (100 Hz, −3 dB) and (10,000 Hz, −83 dB) on a graph with a logarithmic horizontal axis and a linear vertical axis. The contribution to fitness for each of these fitness cases was zero if the gain was on or below this straight line, but otherwise 18/121 per fitness case.

Some of the controllers that are randomly created for the initial random generation and that are created by the mutation operation and the crossover operation in later generations of the run cannot be simulated by SPICE. Controllers that cannot be simulated by SPICE were assigned a high penalty value of fitness ($10^8$). These controllers become the worst-of-generation controllers for their generation.

It should be appreciated that the above fitness measure is illustrative of the many different factors and considerations that may be incorporated into the fitness measure that may be used to guide the evolutionary process. For example, the above fitness measure combined five types of elements:

(1) an optimization requirement (i.e., by means of the metric of the integral of the time-weighted error),
(2) time-domain constraints (i.e., the overshoot penalty and the response to the extreme spiked reference signal),
(3) a frequency-domain constraint (i.e., the AC sweep over the frequencies), and
(4) robustness requirements (i.e., the variations in the values of the plant's internal gain, the plant's time constant), and
(5) consistency of treatment in spite of variations in the step size of the reference signal.

These and other factors and considerations may be readily intermixed in constructing a fitness measure.

For example, different optimization metrics may be used including, for example, the integral of the squared error, the settling time (described below), and the rise time (described below). There are numerous other time-domain constraints that may be included in a fitness measure (including, for example, disturbance rejection, as illustrated in the three-lag plant problem below). Stability may be measured in numerous ways other than the response to a spiked reference signal. Similarly, there are numerous other frequency-domain constraints that may be included as elements of a fitness measure. Robustness may be included in a fitness measure with respect to any aspect of the plant that might potentially vary. In addition, the fitness measure may be constructed to include elements measuring the robustness of the behavior of the plant in the face of sensor noise (of the plant output, the reference signal, or the plant's internal states, if any are made available to the controller). Also, the fitness measure may be constructed to impose constraints on the plant's internal states or the control variable (the controller's output) by, for example, penalizing extreme values of the plant's internal states or the control variable. The fitness measure may also be constructed to include elements measuring the robustness of the plant's behavior with respect to changes some external variable that affects the plant's operation (such as temperature, the plant's production rate, line speed, flow rate, or the like, or other free variable characterizing the operation of the plant).

In a similar manner, a fitness measure may include elements measuring the cost of the energy consumed by the plant (or the cost of effecting changes in the plant). In addition, a fitness measure may include an element accounting for the size, complexity, or cost of the controller itself (e.g., measuring the parsimony of the controller).

The 10-element fitness measure described above for the two-lag plant problem is the arithmetic sum of the 10 elements described above. This particular multi-objective fitness measure is an example of constructing an overall fitness by means of a linear combination of contributions from the elements of the fitness measure. There are numerous other well-known methods for constructing multi-objective fitness measures (for use in the fields of genetic algorithms, simulated annealing, and other optimization techniques in general) and these methods have been extensively described in the literature of these fields.

Control Parameters for Two-lag Plant

For the illustrative problem for genetic programming, the population size, M, was 66,000. The percentages of genetic operations on each generation on and after generation 5 were 86% one-offspring crossovers, 10% reproductions, 1% mutations, 1% subroutine creations, 1% subroutine duplications, and 1% subroutine deletions. For this problem, since all the programs in generation 0 had a minimal architecture consisting of just one result-producing branch, the appearance of automatically defined functions was accelerated by using an increased percentage for the architecture-altering operations prior to generation 5. Specifically, the percentages for the genetic operations on each generation up to and including generation 5 were 78% one-offspring crossovers, 10% reproductions, 1% mutations, 5% subroutine creations, 5% subroutine duplications, and 1% subroutine deletions.

A maximum size of 150 points (for functions and terminals) was established for each result-producing branch and a maximum size of 100 points was established for each automatically defined function.

The other parameters for controlling the runs of geretic programming are default values that are applied to many problems, such as those found in *Genetic Programming III: Darwinian Invention and Problem Solving* by John R. Koza, Forrest H Bennett III, David Andre, and Martin A. Keane, San Francisco, Calif.; Morgan Kaufmann Publishers, 1999.

It should be appreciated that a search technique such as genetic programming may be run with many different choices of values for its control parameters. These choices may involve not using one or more of the genetic operations. For example, the crossover percentage can be set to 0%, thereby making the run in the style that is sometimes referred to as "evolutionary programming" or "evolution strategies." The architecture of the overall program tree may be prespecified by the user (i.e., the percentage for architecture-altering operations is set to 0%).

Termination for Two-lag Plant

The maximum number of generations, G, is set to an arbitrary large number (e.g., 501) and the run was manually monitored and manually terminated when the fitness of many successive best-of-generation individuals appeared to have reached a plateau. The single best-so-far individual is harvested and designated as the result of the run.

Parallel Implementations for Two-lag Plant

In one embodiment, the processing logic generates and executes a run on a Beowulf-style parallel cluster computer system consisting of 66 processors (each containing a 533-MHz DEC Alpha microprocessor and 64 megabytes of RAM) arranged in a two-dimensional 6×11 toroidal mesh. The system has a DEC Alpha type computer as host. The processors are connected with a 100 megabit-per-second Ethernet. The processors and the host use the Linux operating system. The so-called distributed genetic algorithm on island model for parallelization was used (*Genetic Programming III: Darwinian Invention and Problem Solving* by John R. Koza, Forest H. Bennett III, David Andre, and Martin A. Keane, San Francisco, Calif.; Morgan Kaufmann Publishers, 1999). That is, subpopulations (referred to herein as demes) are situated at each of the processing nodes of the system. The population size may be, for example, Q=1,000 at each of the D=66 demes (semi-isolated subpopulations) so that the total population size, M, is 66,000. Generations are run asynchronous on each node. After the genetic operations are performed locally on each node, four boatloads of emigrants, each consisting of B=2% (the migration rate used in one embodiment of the system) of the node's subpopulation (selected probabilistically on the basis of fitness) are dispatched to each of the four adjacent processing nodes. The immigrants are assimilated into each destination processing node just after that node dispatches its immigrants to its neighboring nodes.

Results for Two-lag Plant

A run of genetic programming for this illustrative problem starts with the random creation of an initial population of 66,000 controller-constructing program trees (each consisting of only one result-producing branch) composed of the functions and terminals identified above and in accordance with the constrained syntactic structure described above.

The initial random population of a run of genetic programming is a blind random parallel search of the search space of the problem. As such, it provides a baseline for comparing the results of subsequent generations.

The best individual from generation 0 of the only run of this problem had a fitness of 8.26. The S-expression for this individual is shown below (except that 29-point arithmetic-performing subtree establishing the amplification factor for the GAIN function has been replaced by its equivalent numerical value of 62.8637 in line 8):

| | |
|---|---|
| 1. | (gain |
| 2. | (differentiator |
| 3. | (differential_input_integrator |
| 4. | (lag reference_signal 0.708707) |
| 5. | plant_output |
| 6. | ) |
| 7. | ) |
| 8. | 62.8637) |

This best-of-generation individual consists of a lowpass pre-filter (the LAG block) followed by a proportional-only (P) type of controller. This controller is a very poor controller; however, it is a rudimentary starting point for the evolutionary process.

Generation 1 (and each subsequent generation of a run of genetic programming) is created from the population at the preceding generation by performing reproduction, crossover, mutation, and architecture-altering operations on individuals (or pairs of individuals in the case of crossover) selected from the population on the basis of fitness.

Both the average fitness of all individuals in the population as a whole and the fitness of the best individual in the population improve over successive generations.

Sixty percent of the programs of generation 0 for this run of this problem produce controllers that cannot be simulated by SPICE. The unsimulatable programs are the worst-of-generation programs for each generation and receive the high penalty value of fitness ($10^8$). However, the percentage of unsimulatable programs drops to 14% by generation 1 and 8% by generation 10. In other words, the vast majority of the offspring created by Darwinian selection and the crossover operation are simulatable after just a few generations.

Figure 11:
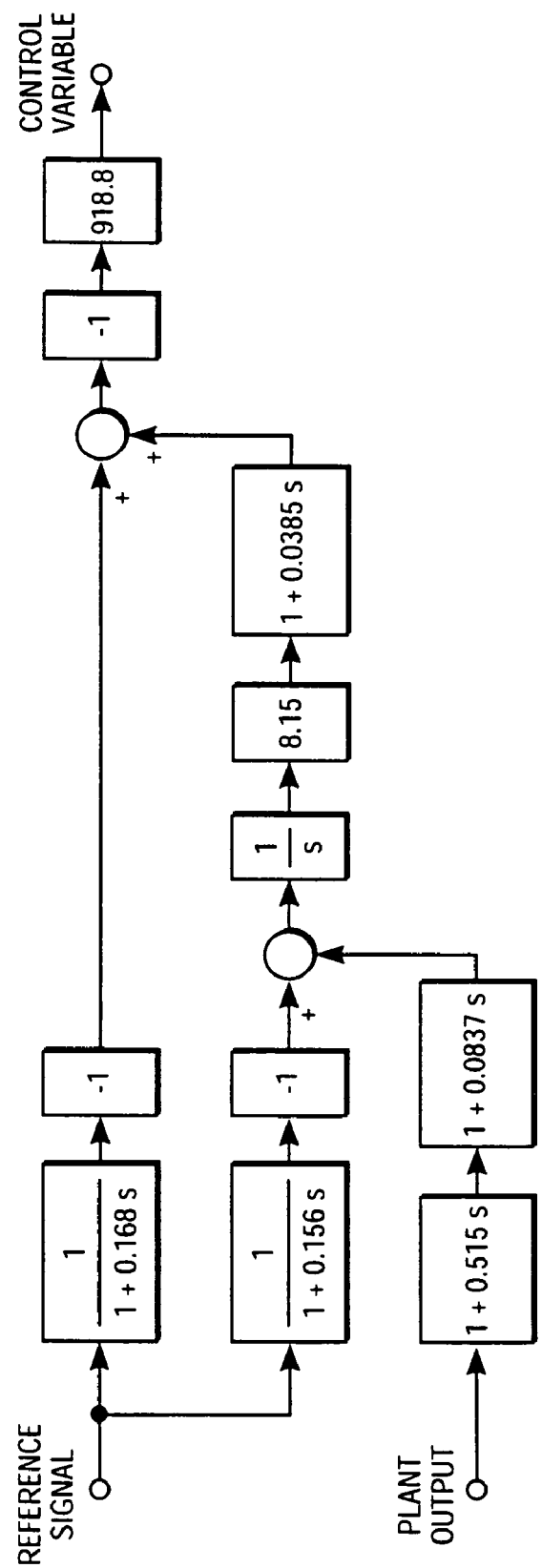
FIG. 11 shows best-of-run controller from generation 32 in the form of a block diagram for the two-lag plant.

The best-of-run individual emerged in generation 32 and had a near-zero fitness of 0.1639. FIG. 11 shows this individual controller in the form of a block diagram.

For this particular run, a majority of the computer time was consumed by the fitness evaluation of candidate individuals in the population. The fitness evaluation (involving 10 SPICE simulations) averaged $2.57 \times 10^9$ computer cycles (4.8 seconds) per individual. The best-of-run individual from generation 32 was produced after evaluating $2.178 \times 10^6$ individuals (66,000 times 33). This required 44.5 hours on our 66-node parallel computer system—that is, the expenditure of $5.6 \times 10^{15}$ computer cycles (5 peta-cycles).

Table 1 shows the contribution of each of the 10 elements of the fitness measure for the best-of-run individual of generation 32 for a two-lag plant.

TABLE 1

Fitness of best-of-run individual of generation 32 for a two-lag plant.

| | Step size (volts) | Internal Gain, K | Time constant, τ | Fitness |
|---|---|---|---|---|
| 0 | 1 | 1 | 1.0 | 0.0220 |
| 1 | 1 | 1 | 0.5 | 0.0205 |
| 2 | 1 | 2 | 1.0 | 0.0201 |
| 3 | 1 | 2 | 0.5 | 0.0206 |
| 4 | $10^{-6}$ | 1 | 1.0 | 0.0196 |
| 5 | $10^{-6}$ | 1 | 0.5 | 0.0204 |
| 6 | $10^{-6}$ | 2 | 1.0 | 0.0210 |
| 7 | $10^{-6}$ | 2 | 0.5 | 0.0206 |
| 8 | Spiked reference signal | | | 0.0000 |
| 9 | AC sweep | | | 0.0000 |
| | TOTAL FITNESS | | | 0.1639 |

Note that the test involving the spiked reference signal and the AC sweep made no detrimental contribution to fitness for this particular best-of-run individual.

Figure 12:
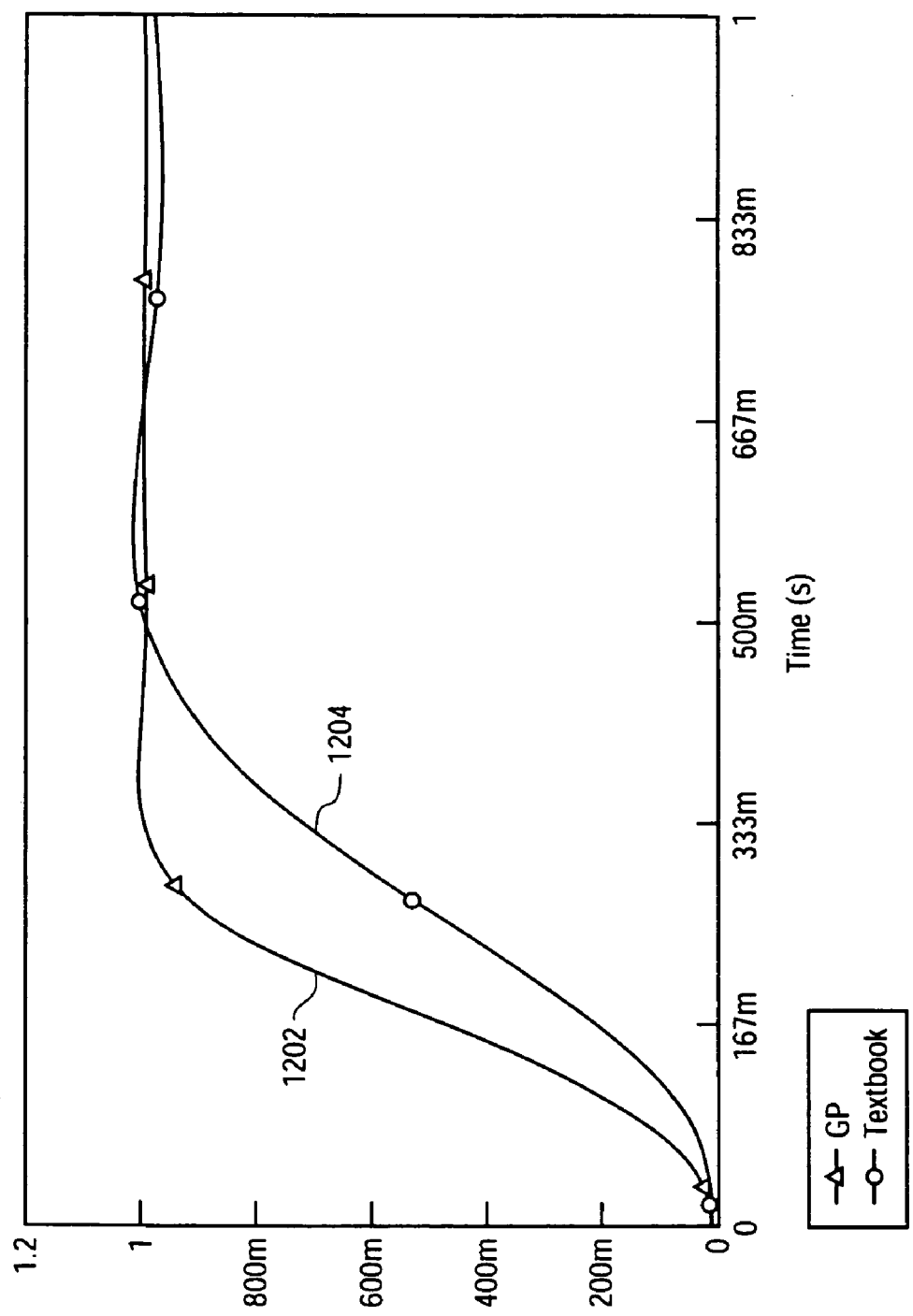
FIG. 12 compares the time-domain response of the best-of-run controller from generation 32 with a textbook controller for the two-lag plant.

FIG. 12 compares the time-domain response of the best-of-run genetically evolved controller from generation 32 (curve 1202) for a 1 volt unit step with K=1 and τ=1 with the time-domain response of the controller presented in Dorf & Bishop (curve 1204). The faster rising curve (1202) shows the performance of the genetically evolved controller while the slower-rising curve (1204) shows the performance of the controller presented in Dorf & Bishop.

The rise time is the time required for the plant output to first reach a specified percentage of the reference signal. For the FIG. 12 run, the percentage was set at 90%. The rise time for the best-of-run controller from generation 32 (curve 1202) is 256 milliseconds. This is 62% of the 415-millisecond rise time for the Dorf & Bishop controller (curve 1204).

The settling time is the first time for which the plant-response reaches and stays within a specified percentage of the reference signal. For the FIG. 12 run, this was specified as 2%. The settling time for the best-of-run controller from generation 32 (curve 1202) is 304 milliseconds. Because the genetically evolved controller gets into this 2% range and never departs that range thereafter, it is termed a deadbeat controller (Dorf & Bishop, page 598). The Dorf & Bishop controller (curve 1204) first reaches the 98% level at 477 milliseconds; however, it "rings" and subsequently falls below the 98%, level. It does not settle until 944 milliseconds. For the FIG. 12 run, the genetically evolved controller (curve 1202) settling time is 32% of the 944-millisecond settling time for the Dorf & Bishop controller (curve 1204).

The overshoot is the percentage by which the plant response exceeds the reference signal. The best-of-run controller from generation 32 (curve 1202) reaches a maximum value of 1.0106 at 369 milliseconds (i.e., has a 1.06% overshoot). The Dorf & Bishop controller (curve 1204) reaches a maximum value of 1.020054 at 577 milliseconds (i.e., has an overshoot of slightly above 2%).

The curves for other values of K and τ similarly favor the genetically evolved controller.

Figure 13:
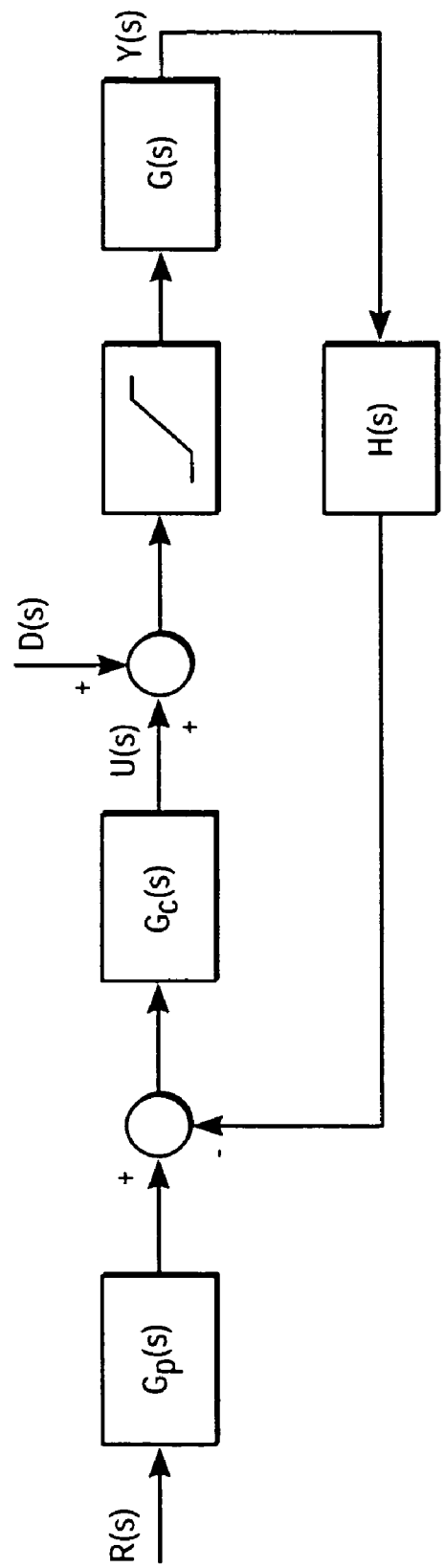
FIG. 13 shows a model for an entire system containing a pre-filter, a compensator, and a point for adding disturbance.

FIG. 13 presents an exemplary model for the entire system. Referring to FIG. 13, the reference signal R(s) is fed through pre-filter $G_p(s)$. The plant output Y(s) is passed through H(s) and then subtracted, in continuous time, from the pre-filtered reference signal. This difference (error) is fed into the compensator $G_c(s)$. The plant G(s) has one input and one output, Y(s). $G_c(s)$ has one input, the difference, and one output, U(s). Disturbance, D(s), may be added to the output U(s) of $G_c(s)$. The resulting sum is subjected to a limiter (in the range between −40 and +40 volts for this exemplary problem).

Figure 14:
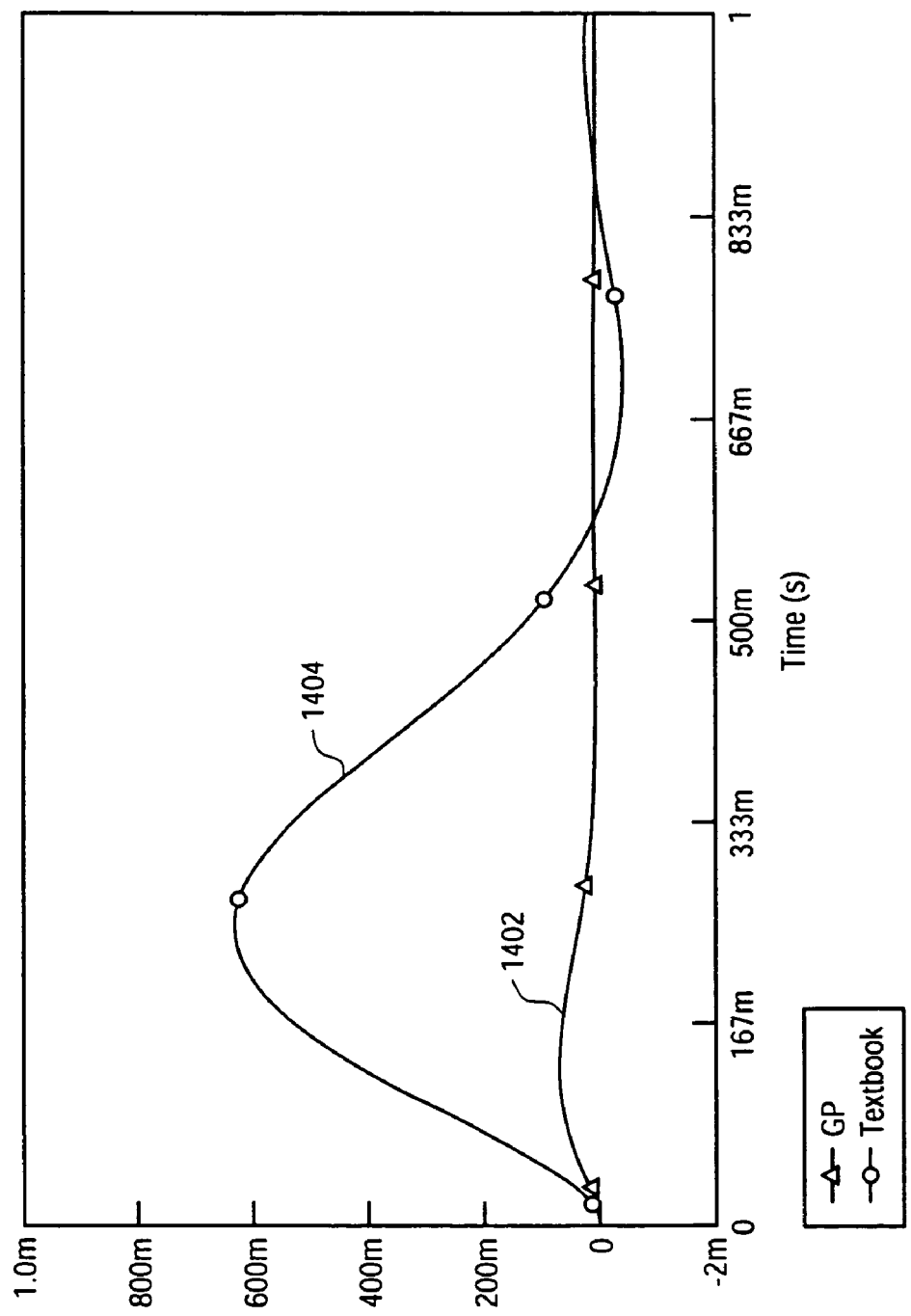
FIG. 14 compares the effect of disturbance on the best-of-run controller from generation 32 for the two-lag plant and a textbook controller.

FIG. 14 compares the effect of disturbance on the best-of-run controller from generation 32 (curve 1402) and the controller presented in Dorf & Bishop (curve 1404). The upper curve (1404) is the time-domain response to a 1-volt disturbance signal with K=1 and τ=1 for the controller presented in Dorf & Bishop. The peak value of response to the 1-volt disturbance signal for curve 1404 is 5,775 microvolts. The lower curve (1402) applies to the best-of-run controller from generation 32 and which peaks at 644 microvolts.

The curves for other values of K and τ are similar.

Figure 15:
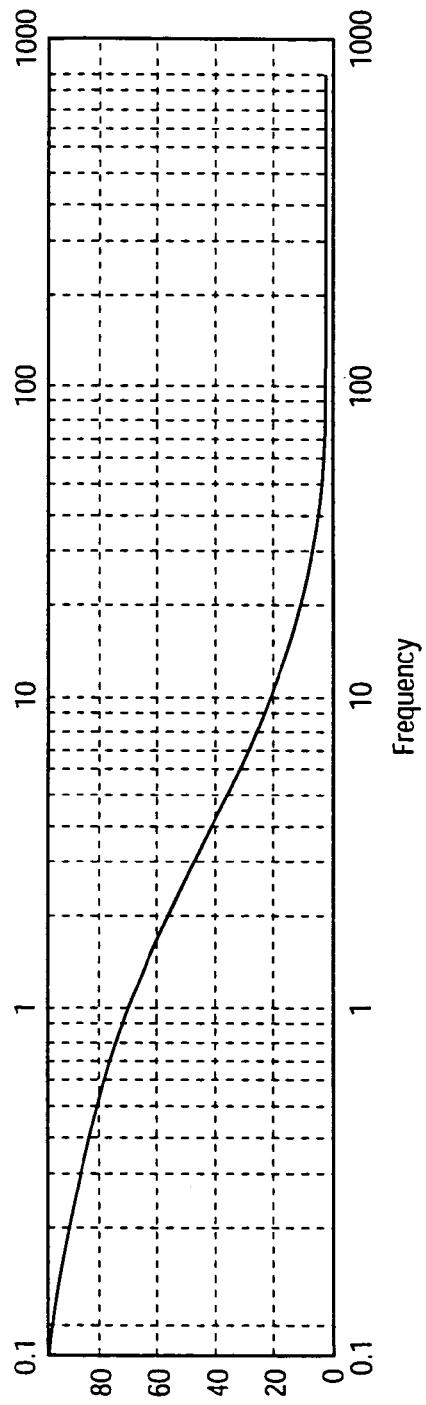
FIG. 15 is the magnitude portion of the Bode plot of the open loop transfer function versus the frequency of input for the best-of-run controller from generation 32 for the two-lag plant.

FIG. 15 is the magnitude portion of the Bode plot of the open loop transfer function versus the frequency of input for the best-of-run controller from generation 32.

Figure 16:
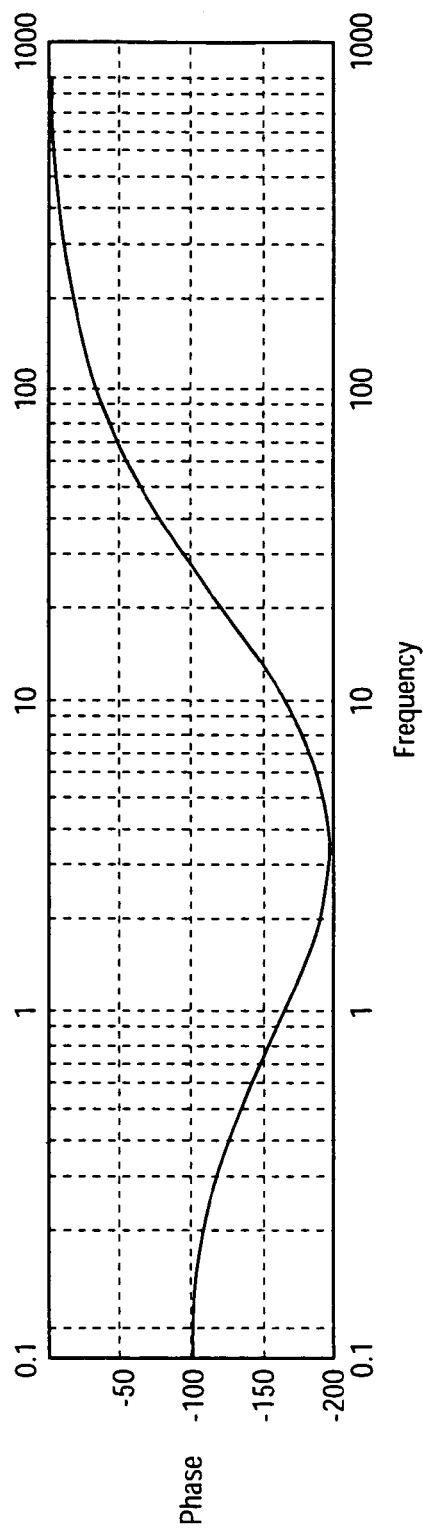
FIG. 16 is the phase portion of the Bode plot of the open loop transfer function versus the frequency of input for the best-of-run controller from generation 32 for the two-lag plant.

FIG. 16 shows the phase portion of the Bode plot of the open loop transfer function versus the frequency of input for the best-of-run controller from generation 32

Table 2 compares the average performance (over the eight combinations of values for K, τ, and the step size of the reference signal) of the best-of-run controller from generation 32 (Genetically evolved controller) and the controller presented in Dorf & Bishop (Dorf & Bishop).

In one embodiment, the system bandwidth is the frequency of the reference signal above which the plant's output is attenuated by at least a specified degree in comparison to the plant's output at a specified lower frequency (e.g., DC or very low frequencies). For this example, the specified degree of attenuation was 3 db.

Referring to Table 2, the best-of-run controller from generation 32 is 2.42 times better than the Dorf & Bishop controller as measured by the integral of the time-weighted absolute error, has only 71% of the rise time in response to the reference input, has only 32% of the settling time, and is 8.97 times better in terms of suppressing the effects of disturbance at the plant input. Both controllers have approximately the same bandwidth (i.e., around 1 Hz).

TABLE 2

Comparison for two-lag plant.

| | Units | Genetically evolved controller | Dorf & Bishop |
|---|---|---|---|
| Disturbance sensitivity | μVolts/Volt | 644 | 5,775 |
| ITAE | millivolt sec$^2$ | 19 | 46 |
| Bandwidth (3 dB) | Hz | 1.5 | 1 |
| Rise time | milliseconds | 296 | 465 |
| Settling time | milliseconds | 304 | 944 |

Referring again to FIG. 13, the above results may be compared to the results in Dorf & Bishop by structuring the entire system as a pre-filter and compensator.

The transfer function for the pre-filter, $G_{p\text{-}dorf}(S)$, of the controller presented in Dorf & Bishop is $$G_{p-dorf}(s) = \frac{42.67}{42.67 + 11.38s + s^2}$$

and the transfer function for the compensator, $G_{c\text{-}dorf}(s)$, is $$G_{c-dorf}(s) = \frac{12(42.67 + 11.38s + s^2)}{s}.$$

In one embodiment, after applying standard block diagram manipulations, the transfer function for the best-of-run controller from generation 32 for the two-lag plant may be expressed as a transfer function for a pre-filter and a transfer function for a compensator. In one embodiment, the transfer function for the pre-filter, $G_{p32}(s)$, for the best-of-run individual from generation 32 for the three-lag plant is $$G_{p32}(s) = \frac{1(1+.1262s)(1+.2029s)}{(1+.03851s)(1+.05146)}.$$
$$(1+.08375)(1+.1561s)(1+.1680s)$$

The transfer function for the compensator, $G_{c32}(s)$, for the best-of-run individual from generation 32 for the two-lag plant is $$G_{c32}(s) = \frac{7487.05 + 1300.63s + 71.2511s^2 + 1.2426s^3}{s}$$

The S$^3$ term (with an s in the denominator) indicates a second derivative. Thus, the compensator consists of a second derivative in addition to proportional, integrative, and derivative functions. In this illustrative problem, the user did not preordain, prior to the run, that a second derivative should be used. For this run of the problem, the evolutionary process produced a better value of fitness by incorporating a second derivative into the automatically created controller. In addition, the user did not preordain any the topological arrangement of the processing blocks within the automatically created controller. For this problem, the automated process made the decisions concerning the total number of processing blocks to be employed in the controller, the type of each block, the interconnections between the blocks, the values of all parameters for the blocks, and the existence (none in FIG. 11) of internal feedback between the processing blocks of the controller.

In summary, for this problem, genetic programming automatically created a robust controller for a two-lag plant without the benefit of user-supplied information concerning: the total number of functions to be employed in the controller, the type of each processing block, the topological interconnections between the functions, the values of parameters for the functions, or the existence of internal feedback, if any, within the controller. For this problem, the genetically evolved controller created a second derivative.

Three-lag Plant Problem

An example of the process for automatically synthesizing a controller is presented below in which a problem calling for the design of a robust controller for a three-lag plant is described. This controller is described in *PID Controllers: Theory, Design, and Tuning* by Karl J. Astrom and Tore Hagglund, $2^{nd}$ Ed., Instrument Society of America, Research Triangle Park, N.C.: 1995 (hereinafter Astrom & Hagglund). In this section, the search technique of genetic programming is applied to this problem to synthesize the controller.

This example uses a proportional, integrative, and derivative (PID) controller as it is especially suitable for purposes of illustration of one embodiment as it delivers credible performance on this problem.

As will be seen in this section, the controller produced by genetic programming is better than 7.2 times as effective as the Astrom & Hagglund controller as measured by the integral of the time-weighted absolute error, has only 50% of the rise time in response to the reference input, has only 35% of the settling time, and is 92.7 dB better in terms of suppressing the effects of disturbance at the plant input.

A goal of this illustrative problem is to create both the topology and parameter values for a controller for a three-lag plant such that plant output reaches the level of the reference signal so as to minimize the integral of the time-weighted error (ITAE), such that the overshoot in response to a step input is less than 2%, and such that the controller is robust in the face of significant variation in the plant's internal gain, K, and the plant's time constant, τ.

Specifically, the transfer function of the plant is $$G(s) = \frac{K}{(1+\tau s)^3}.$$

The plant's internal gain, K, is varied from 1 to 2 and the plant's time constant, τ, is varied from 0.5 to 1.0.

In one embodiment, an additional constraint was added to the problem. The constraint is that the input to the plant is limited to the range between −10 and +10 volts.

Preparatory Steps for Three-Lag Plant

Program Architecture for Three-Lag Plant

Since there is one result-producing branch in the program tree for each output from the controller and this problem involves a one-output controller, each program tree has one result-producing branch. Each program tree also has up to five automatically defined functions. Each program tree in the initial random generation (generation 0) has no automatically defined functions. However, in subsequent generations, architecture-altering operations may insert and delete automatically defined functions to particular individual program trees.

Terminal Sets for Three-Lag Plant

In this problem, a constrained syntactic structure permits only a single perturbable numerical value to appear as the argument for establishing each numerical parameter value for each signal processing block. That is, the second of the five embodiments (described above) for representing numerical parameter values for signal processing block functions was used. In this problem, the perturbable numerical value initially ranges from −5.0 to +5.0. These perturbable numerical values were perturbed during the run by a special Gaussian mutation operation that operates only on perturbable numerical values.

The terminal set, T, for every part of the result-producing branch and any automatically defined functions, except as the argument for establishing the numerical parameter value for a signal processing block, is

T={CONSTANT__0, REFERENCE__SIGNAL, CONTROLLER__OUTPUT, PLANT__OUTPUT}.

Function Sets for Three-Lag Plant

The function set, F, for the result-producing branch and any automatically defined functions for this problem is F={GAIN, INVERTER, LEAD, LAG, LAG2, DIFFERENTIAL__INPUT__INTEGRATOR, DIFFERENTIATOR, ADD__SIGNAL, SUB__SIGNAL, ADD__3__SIGNAL, ADF0, ADF1, ADF2, ADF3, ADF4}.

Fitness Measure for Three-Lag Plant

For this illustrative problem, the fitness of a controller was measured using 10 element as follows:
(1) eight time-domain-based elements based on a modified integral of time-weighted absolute error (ITAE) measuring the achievement of the desired value of the plant response, the controller's robustness, and the controller's avoidance of overshoot,
(2) one time-domain-based element measuring the controller's stability when faced with an extreme spiked reference signal, and
(3) one time-domain-based element measuring disturbance rejection.

The fitness of an individual controller is the sum of the detrimental contributions of these 10 elements of the fitness measure. The smaller the fitness, the better.

The first eight elements of the fitness measure together evaluate how quickly the controller causes the plant to reach the reference signal, the robustness of the controller in face of significant variations in the plant's internal gain and the plant's time constant, and the success of the controller in avoiding overshoot. These eight elements of the fitness measure represent the eight choices of a particular one of two different values of the plant's internal gain, K, in conjunction with a particular one of two different values of the plant's time constant r, in conjunction with a particular one of two different values for the height of the reference signal. For this illustrative problem, the two values of K were 1.0 and 2.0 and the two values of τ were 0.5 and 1.0. For this problem, the first reference signal was a step function that rises from 0 to 1 volts at t=100 milliseconds and the second reference signal rises from 0 to 1 microvolts at t=100 milliseconds. The two values of K and τ were used in order to obtain a robust controller. The two step functions were used to deal with the non-linearity caused by the limiter. For each of these eight fitness cases, a transient analysis was performed in the time domain using the SPICE simulator (Quarles et al.).

The contribution to fitness for each of these eight elements of the fitness measure was based on the integral of time-weighted absolute error (ITAE)

$$\int_{t=0}^{9.6} t|e(t)|A(e(t))Bdt.$$

The integration runs from time t=0 to t=9.6 seconds. Here e(t) is the difference (error) at time t between the plant output and the reference signal. The integral of time-weighted absolute error penalizes differences that occur later more heavily than differences that occur earlier.

For this problem, the integral of time-weighted absolute error was modified in three ways.

First, a discrete approximation to the integral was used by considering 120 80-millisecond time steps between t=0 to t=9.6 seconds.

Second, each fitness case was multiplied by the reciprocal of the amplitude of the reference signals so that both reference signals (1 microvolt and 1 volt) were equally influential. Specifically, B was a factor that was used to normalize the contributions associated with the two step functions. B multiplies the difference e(t) associated with the 1-volt step function by 1 and multiplies the difference e(t) associated with the 1-microvolt step function by $10^6$.

Third, the integral contained an additional weight, A, that varied depending on e(t) and that heavily penalizes non-compliant amounts of overshoot. The function A weights all variation below the reference signal and up to 2% above the reference signal by a factor of 1.0 and heavily penalizes overshoots over 2% by a factor 10.0.

For this problem, the ninth element of the fitness measure for the three-lag plant problem evaluated the stability of the controller when faced with an extreme spiked reference signal. The spiked reference signal rises to $10^{-9}$ volts at time t=0 and persists for 10-nanoseconds. The reference signal is then 0 for all other times. For this problem, an additional transient analysis was performed using the SPICE simulator for 121 fitness cases representing times t=0 to t=120 microseconds. If the plant output never exceeded a fixed limit of $10^{-8}$ volts (i.e., a order of magnitude greater than the pulse's magnitude) for any of these 121 fitness cases, then this element of the fitness measure was zero. However, if the absolute value of plant output exceeded $10^{-8}$ volts for any time t, then the contribution to fitness was 500×(0.000120-t), where t is a first time (in seconds) at which the absolute value of plant output exceeds $10^{-8}$ volts. This penalty is a ramp starting at the point (0, 0.06) and ending at the point (1.2, 0), so that 0.06 seconds is the maximum penalty and 0 is the minimum penalty.

For this problem, the tenth component of the fitness measure was based on disturbance rejection. The component was computed based on a time-domain analysis for 9.6 seconds. In this problem, the reference signal was held at a value of 0. A disturbance signal consisting of a unit step was added to the CONTROLLER_OUTPUT at time t=0 and the resulting disturbed signal was provided as input to the plant, for this problem, the detrimental contribution to fitness was the absolute value of the largest single difference between the plant output and the reference signal (which is invariant at 0 throughout).

Controllers that cannot be simulated by SPICE were assigned a high penalty value of fitness ($10^8$).

Control Parameters for Three-Lag Plant

For this illustrative problem for genetic programming, the population size, M, was 66,000. The percentages of genetic operations on each generation on and after generation 5 were 47% one-offspring crossovers on internal points of the program tree other than numerical constant terminals, 9% one-offspring crossovers on points of the program tree other than numerical constant terminals, 9% one-offspring crossovers on numerical constant terminals, 9% reproductions, 1% mutations on points of the program tree other than numerical constant terminals, 20% mutations on numerical constant terminals, 1% subroutine creations, 1% subroutine duplications, and 1% subroutine deletions.

In this problem, since all the programs in generation 0 had a minimal architecture consisting of just one result-producing branch, the appearance of automatically defined functions was accelerated by using an increased percentage for the architecture-altering operations prior to generation 5. Specifically, the percentages for the genetic operations on each generation up to and including generation 5 were 45% one-offspring crossovers on internal points of the program tree other than numerical constant terminals, 9% one-offspring crossovers on points of the program tree other than numerical constant terminals, 5% one-offspring crossovers on numerical constant terminals, 9% reproductions, 1% mutations on points of the program tree other than numerical constant terminals, 20% mutations on numerical constant terminals, 5% subroutine creations, 5% subroutine duplications, and 1% subroutine deletions.

A maximum size of 150 points (for functions and terminals) was established for each result-producing branch and a maximum size of 100 points was established for each automatically defined function.

The other parameters for controlling the runs of genetic programming are default values that are applied to many problems, such as those found in *Genetic Programming III: Darwinian Invention and Problem Solving* by John R. Koza, Forrest H Bennett III, David Andre, and Martin A. Keane, San Francisco, Calif.; Morgan Kaufmann Publishers, 1999.

Termination for Three-Lag Plant

The maximum number of generations, G, is set to an arbitrary large number (e.g., 501) and the run was manually monitored and manually terminated when the fitness of many successive best-of-generation individuals appeared to have reached a plateau. The single best-so-far individual is harvested and designated as the result of the run.

Parallel Implementations for Three-Lag Plant

In one embodiment, the processing logic generates and executes a run on a Beowulf-style parallel cluster computer system consisting of 66 processors (each containing a 533-MHz DEC Alpha microprocessor and 64 megabytes of RAM) arranged in a two-dimensional 6×11 toroidal mesh. The system has a DEC Alpha type computer as host. The processors are connected with a 100 megabit-per-second Ethernet. The processors and the host use the Linux operating system. The so-called distributed genetic algorithm on island model for parallelization was used (*Genetic Programming III: Darwinian Invention and Problem Solving* by John R. Koza, Forest H. Bennett III, David Andre, and Martin A. Keane, San Francisco, Calif.; Morgan Kaufmann Publishers, 1999). That is, subpopulations (referred to herein as demes) are situated at each of the processing nodes of the system. The population size may be, for example, Q=1,000 at each of the D=66 demes (semi-isolated subpopulations) so that the total population size, M, is 66,000. Generations are run asynchronous on each node. After the genetic operations are performed locally on each node, four boatloads of emigrants, each consisting of B=2% (the migration rate used in one embodiment of the system) of the node's subpopulation (selected probabilistically on the basis of fitness) are dispatched to each of the four adjacent processing nodes. The immigrants are assimilated into each destination processing node just after that node dispatches its immigrants to its neighboring nodes.

Results for Three-Lag Plant

The best individual from generation 0 of the only run of this problem had a fitness of 14.35.

Twenty-four percent of the programs of generation 0 for this run of this problem produce controllers that cannot be simulated by SPICE. The unsimulatable programs are the worst-of-generation programs for each generation and receive the high penalty value of fitness ($10^8$). However, the percentage of unsimulatable programs drops to 6% by generation and remains around 6% thereafter. In other words, the vast majority of the offspring created by Darwinian selection and the crossover operation are simulatable after just a few generations.

Figure 17:
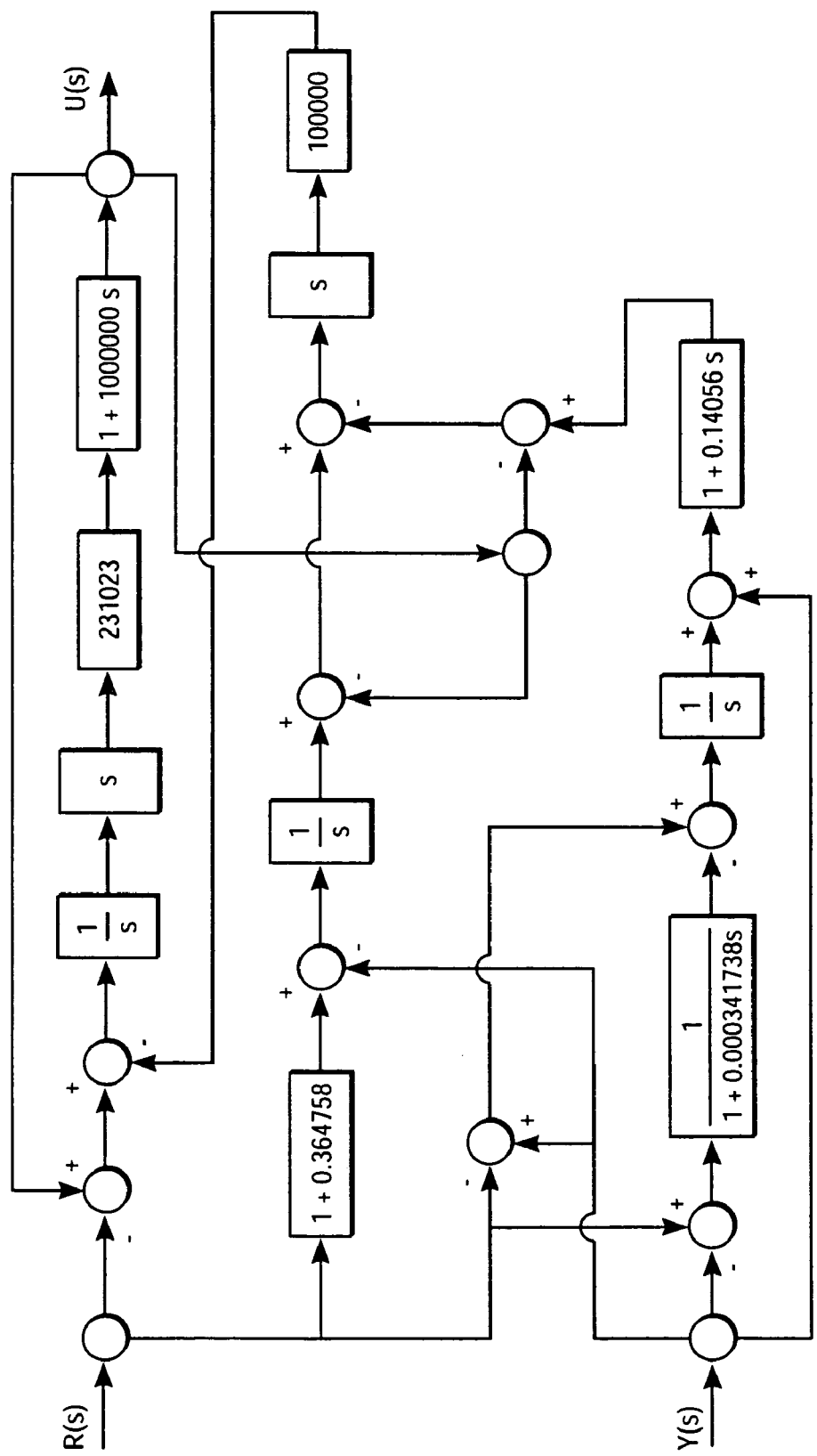
FIG. 17 shows best-of-run genetically evolved controller from generation 31 in the form of a block diagram for three-lag plant.

The best-of-run individual emerged in generation 31 and had a near-zero fitness of 1.14. FIG. 17 shows this individual controller in the form of a block diagram.

Table 3 shows the contribution of each of the 10 elements of the fitness measure of best-of-run individual of generation 31 for a three-lag plant.

TABLE 3

Fitness of best-of-run individual of generation 31 for a three-lag plant.

| | Step size (volts) | Internal Gain, K | Time constant, $\tau$ | Fitness |
|---|---|---|---|---|
| 1 | 1 | 1 | 1.0 | 0.3757 |
| 2 | 1 | 1 | 0.5 | 0.1895 |
| 3 | 1 | 2 | 1.0 | 0.2305 |
| 4 | 1 | 2 | 0.5 | 0.1630 |
| 5 | $10^{-6}$ | 1 | 1.0 | 0.0454 |
| 6 | $10^{-6}$ | 1 | 0.5 | 0.0453 |
| 7 | $10^{-6}$ | 2 | 1.0 | 0.0442 |
| 8 | $10^{-6}$ | 2 | 0.5 | 0.0458 |
| 9 | Spiked reference signal | | | 0.0 |
| 10 | Disturbance | | | $3 \times 10^{-6}$ |
| | TOTAL FITNESS | | | 1.1394 |

Note that the test involving the spiked reference signal made no detrimental contribution to fitness for this best-of-run individual. Also, note that the detrimental contribution to fitness for this best-of-run individual for disturbance was negligible.

Table 4 shows (for each of the eight combinations of step size, internal gain, K, and time constant, $\tau$) the values of disturbance rejection (in microvolts out per disturbance volt), integral of time-weighted error (in volt-second$^2$), closed loop bandwidth (in Hertz), rise time (90%), and settling time (2%), for the best-of-run individual of generation 31 for a three-lag plant.

The system bandwidth is the frequency of the reference signal above which the plant's output is attenuated by at least a specified degree (3 db in this problem) in comparison to the plant's output at a specified lower frequency (e.g., DC or very low frequencies).

TABLE 4

Characteristics of best-of-run individual of generation 31 for a three-lag plant.

| | Step size | K | $\tau$ | Disturbance | ITAE | Bandwidth | Rise time | Settling time |
|---|---|---|---|---|---|---|---|---|
| 1 | 1 | 1 | 1.0 | 4.3 | 0.360 | 0.72 | 1.25 | 1.87 |
| 2 | 1 | 1 | 0.5 | 4.3 | 0.190 | 0.72 | 0.97 | 1.50 |
| 3 | 1 | 2 | 1.0 | 4.3 | 0.240 | 0.72 | 0.98 | 1.39 |
| 4 | 1 | 2 | 0.5 | 4.3 | 0.160 | 0.72 | 0.90 | 1.44 |
| 5 | $10^{-6}$ | 1 | 1.0 | 4.3 | 0.069 | 0.72 | 0.64 | 1.15 |
| 6 | $10^{-6}$ | 1 | 0.5 | 4.3 | 0.046 | 0.72 | 0.53 | 0.97 |
| 7 | $10^{-6}$ | 2 | 1.0 | 4.3 | 0.024 | 0.72 | 0.34 | 0.52 |
| 8 | $10^{-6}$ | 2 | 0.5 | 4.3 | 0.046 | 0.72 | 0.52 | 0.98 |
| | AVERAGE | | | 4.3 | 0.142 | 0.72 | 0.77 | 1.23 |

Table 5 shows (for each of the eight combinations of step size, internal gain, K, and time constant, $\tau$) the values of disturbance rejection (in microvolts out per disturbance volt), integral of time-weighted error (in volt-second$^2$), closed loop bandwidth (in Hertz), rise time (90%), and settling time (2%), for the PID solution (Astrom and Hagglund 1995) for a three-lag plant.

TABLE 5

Characteristics of PID solution (Astrom and Hagglund 1995) for a three-lag plant.

| | Step size | K | $\tau$ | Disturbance | ITAE | Bandwidth | Rise time | Settling time |
|---|---|---|---|---|---|---|---|---|
| 1 | 1 | 1 | 1.0 | 186,000 | 2.6 | 0.248 | 2.49 | 6.46 |
| 2 | 1 | 1 | 0.5 | 156,000 | 2.3 | 0.112 | 3.46 | 5.36 |
| 3 | 1 | 2 | 1.0 | 217,000 | 2.0 | 0.341 | 2.06 | 5.64 |
| 4 | 1 | 2 | 0.5 | 164,000 | 1.9 | 0.123 | 3.17 | 4.53 |
| 5 | $10^{-6}$ | 1 | 1.0 | 186,000 | 2.6 | 0.248 | 2.49 | 6.46 |
| 6 | $10^{-6}$ | 1 | 0.5 | 156,000 | 2.3 | 0.112 | 3.46 | 5.36 |
| 7 | $10^{-6}$ | 2 | 1.0 | 217,000 | 2.0 | 0.341 | 2.06 | 5.64 |
| 8 | $10^{-6}$ | 2 | 0.5 | 164,000 | 1.9 | 0.123 | 3.17 | 4.53 |
| | AVERAGE | | | 180,750 | 2.2 | 0.21 | 2.8 | 5.5 |

Table 6 compares the average performance of the best-of-run controller from generation 31 for a three-lag plant (genetically evolved controller) and the PID controller presented in Astrom and Hagglund (PID controller) over the eight combinations of values for K, $\tau$, and the step size of the reference signal.

TABLE 6

Comparison of average characteristics for two-lag plant.

| | Units | Genetically evolved controller | PID controller |
|---|---|---|---|
| Disturbance sensitivity | μvolts/volt | 4.3 | 180,750 |
| ITAE | millivolt seconds$^2$ | 0.142 | 2.2 |
| Bandwidth (3 dB) | Hertz | 0.72 | 0.21 |
| Rise time | milliseconds | 0.77 | 2.8 |
| Settling time | milliseconds | 1.23 | 5.5 |

Astrom and Hagglund did not consider seven of the eight combinations of values for K, τ, and the step size used in computing the averages in table 6, whereas the genetically evolved controller problem used all eight combinations of values in the run. Accordingly, table 7 compares the performance of the best-of-run controller from generation 31 for a three-lag plant (genetically evolved controller) and the PID controller of Astrom and Hagglund (PID controller) for the specific value of plant internal gain, K, of 1.0 used in Astrom and Hagglund, the specific value of the plant time constant, τ of 1.0 used in Astrom and Hagglund, and the specific step size of the reference signal of 1.0 volts used in Astrom and Hagglund.

TABLE 7

Comparison of characteristics for K = 1.0,
τ = 1.0, and step size of 1.0 for two-lag plant.

| | Units | Genetically evolved controller | PID controller |
|---|---|---|---|
| Disturbance sensitivity | μvolts/volt | 4.3 | 186,000 |
| ITAE | volt seconds$^2$ | 0.360 | 2.6 |
| Bandwidth (3 dB) | Hertz | 0.72 | 0.248 |
| Rise time | seconds | 1.25 | 2.49 |
| Settling time | seconds | 1.87 | 6.46 |

As can be seen in table 7, the best-of-run genetically evolved controller from generation 31 is 7.2 times better than the controller of Astrom and Hagglund as measured by the integral of the time-weighted absolute error, has only 50% of the rise time in response to the reference input, has only 35% of the settling time, and is 92.7 dB better in terms of suppressing the effects of disturbance at the plant input. The genetically evolved controller has 2.9 times the bandwidth of the PID controller.

Figure 18:
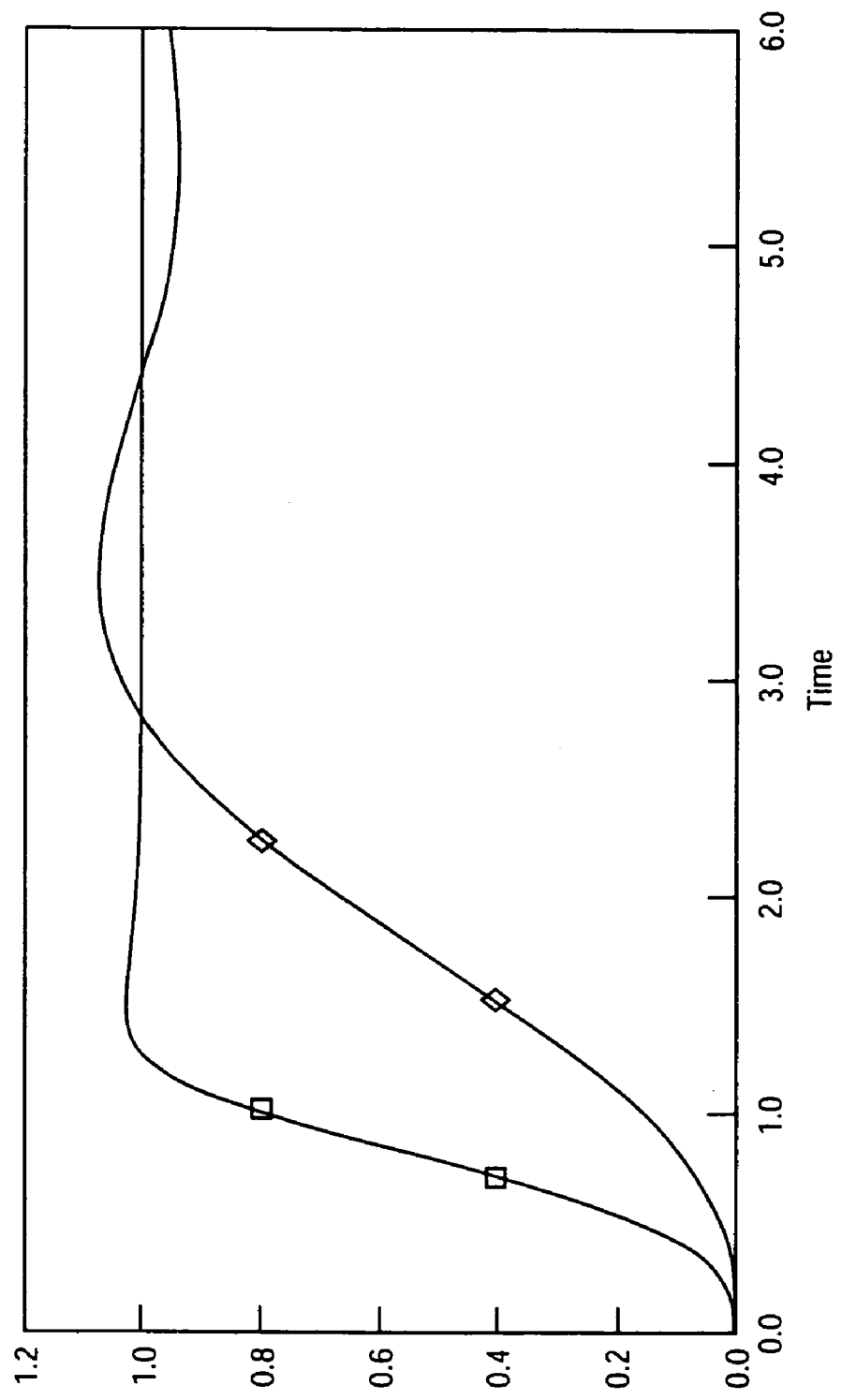
FIG. 18 compares the time-domain response of the best-of-run genetically evolved controller from generation 31 with the time-domain response of a previously published PID controller.

FIG. 18 compares the time-domain response of the best-of-run genetically evolved controller from generation 31 for a 1 volt unit step with K=1 and τ=1 with the time-domain response of the controller presented by Astrom and Hagglund. The faster rising curve in FIG. 18 shows the performance of the genetically evolved controller while the slower-rising curve shows the performance of the controller presented in Astrom and Hagglund.

The rise time is the time required for the plant output to first reach a specified percentage (90% here) of the reference signal. The rise time for the best-of-run genetically evolved controller from generation 31 was 1.25 seconds. This is 50% of the 2.94-second rise time for the Astrom and Hagglund controller.

The settling time is the first time for which the plant response reaches and stays within a specified percentage (2% here) of the reference signal. The settling time for the best-of-run genetically evolved controller from generation 31 was 1.87 seconds. That is, the best-of-run genetically evolved controller from generation 31 settled in 35% of the 6.49-second settling time for the Astrom and Hagglund controller.

The overshoot is the percentage by which the plant response exceeds the reference signal. The best-of-run genetically evolved controller from generation 31 reached a maximum value of 1.023 at 1.48 seconds (i.e., has a 2.3% overshoot). The Astrom and Hagglund controller reached a maximum value of 1.074 at 3.47 seconds (i.e., a 7.4% overshoot).

After applying standard block diagram manipulations, the transfer function for the best-of-run controller from generation 31 for the three-lag plant can be expressed as a transfer function for a pre-filter and a transfer function for a compensator. The transfer function for the pre-filter, $G_{p31}(s)$, for the best-of-run individual from generation 32 for the three-lag plant is $$G_{p31}(s) = \frac{(1+0.2083s)(1+0.0002677s)}{(1+0.000345s)}.$$

The transfer function for the compensator, $G_{c31}(s)$, for the best-of-run individual from generation 31 for the three-lag plant is $$G_{c31}(s) = 300{,}000.$$

The feedback transfer function, $H_{31}(s)$, for the best-of-run individual from generation 31 for the three-lag plant is $$H_{31}(s) = 1 + 0.42666s + 0.046703s^2.$$

Figure 19:
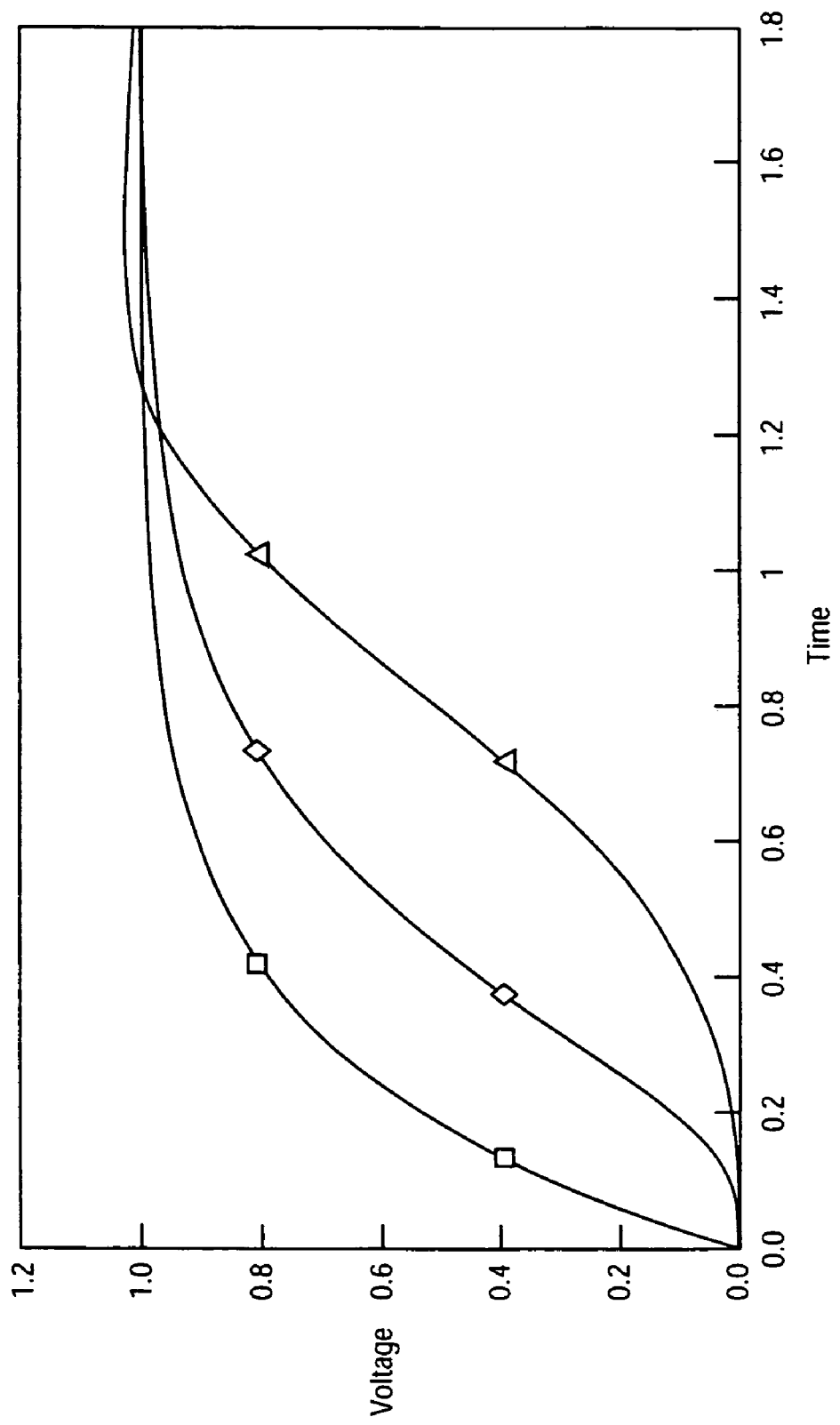
FIG. 19 compares the plant response of system for the genetically evolved controller from generation 31 for three step sizes of the reference signal.

FIG. 19 compares the plant response of system while being controlled by the genetically evolved controller from generation 31 (expressed as percentage of the final value, where 1.0 denotes 100% in the figure) for three step sizes of the reference signal (1 microvolt, 100 millivolts, and 1 volt). The leftmost curve is the response for 1 microvolt. Note that if controlled system were linear, all three curves would coincide. However, as can be seen in this Figure, as the step size increases, the time required to reach the final value also increases.

Problem Involving Plant with a Five-Second Delay

Another example of the process for automatically synthesizing a controller is presented below in which a problem calling for the design of a controller for a three-lag plant where there is a five-second delay in the feedback from the plant output to the controller is described. A delay in the feedback adds considerably difficulty in the design of an effective controller.

A goal of this illustrative problem is to create both the topology and parameter values for a controller for a three-lag plant (as described above) with the addition of a five-second delay in the feedback from the plant output to the controller such that plant output reaches the level of the reference signal so as to minimize the integral of the time-weighted error (ITAE), and the overshoot in response to a step input is less than 2%.

Specifically, the transfer function of the three-lag plant is $$G(s) = \frac{Ke^{-5s}}{(1+\tau s)^3}$$

In one embodiment, an additional constraint was added to the problem in which the input to the plant is limited to the range between −40 and +40 volts.

Preparatory Steps for the Problem with
Five-Second Delay

Program Architecture for Plant with Five-Second
Delay

Since there is one result-producing branch in the program tree for each output from the controller and this problem involves a one-output controller, each program tree has one result-producing branch. Each program tree also has up to five automatically defined functions. Each program tree in the initial random generation (generation 0) has no automatically defined functions. However, in subsequent generations, architecture-altering operations may insert and delete automatically defined functions to individual program trees.

Terminal Sets for Plant with Five-Second Delay

In this problem, a constrained syntactic structure permits only a single perturbable numerical value to appear as the argument for establishing each numerical parameter value for each signal processing block. That is, the second of the five embodiments (described above) for representing numerical parameter values for signal processing block functions was used. In this problem, the perturbable numerical value initially ranges from −5.0 to +5.0. These perturbable numerical values were perturbed during the run by a special Gaussian mutation operation that operates only on perturbable numerical values.

The terminal set, T, for every part of the result-producing branch and any automatically defined functions, except as the argument for establishing the numerical parameter value for a signal processing block, is

T={CONSTANT_0, REFERENCE_SIGNAL, CONTROLLER_OUTPUT, PLANT_OUTPUT}.

Function Sets for Plant with Five-Second Delay

The function set, F, for the result-producing branch and any automatically defined functions for this problem is F={GAIN, INVERTER, LEAD, LAG, LAG2, DIFFERENTIAL_INPUT_INTEGRATOR, DIFFERENTIATOR, ADD_SIGNAL, SUB_SIGNAL, ADD_3_SIGNAL, DELAY, ADF0, ADF1, ADF2, ADF3, ADF4}.

Fitness Measure for Plant with Five-Second Delay

For this illustrative problem, the fitness of a controller was measured using six elements as follows:
(1) five time-domain-based elements based on a modified integral of time-weighted absolute error (ITAE) measuring the achievement of the desired value of the plant response and the controller's avoidance of overshoot, and
(2) one time-domain-based element measuring disturbance rejection.

The fitness of an individual controller is the sum of the detrimental contributions of these six elements of the fitness measure. The smaller the fitness, the better.

The first five elements of the fitness measure together evaluate how quickly the controller causes the plant to reach the reference signal and the success of the controller in avoiding overshoot.

For this problem, the first reference signal was a step function that rises from 0 to 1 volts at t=100 milliseconds and the second reference signal rises from 0 to 1 microvolts at t=100 milliseconds. The two step functions were used to deal with the non-linearity caused by the limiter. The various values of K and τ were used in order to expose genetic programming to a variety of values of internal gain and the time constant of the plant so that genetic programming did not engage in pole elimination. For each of these five fitness cases, a transient analysis was performed in the time domain using the SPICE simulator (Quarles et al.).

Table 8 shows these five elements of the fitness measure for plant with a five-second delay.

TABLE 8

Five of the six elements of the fitness measure for plant with a five-second delay.

| | Step size (volts) | Internal Gain, K | Time constant, τ |
|---|---|---|---|
| 0 | 1 | 1 | 1 |
| 1 | 1 | 1.1 | 1 |
| 2 | $10^{-6}$ | 1 | 1 |
| 3 | $10^{-6}$ | 1.1 | 1 |
| 4 | 1 | 1 | 0.5 |

The contribution to fitness for each of these five elements of the fitness measure was based on the integral of time-weighted absolute error (ITAE)

$$\int_{t=5}^{36} (t-5)|e(t)|A(e(t))B\,dt.$$

Because of the built-in five-second time delay, the integration runs from time t=5 seconds to t=36 seconds. Here e(t) is the difference (error) at time t between the delayed plant output and the reference signal. The integral of time-weighted absolute error penalizes differences that occur later more heavily than differences that occur earlier.

For this problem, the integral of time-weighted absolute error was modified in three ways.

First, a discrete approximation to the integral was used by considering 120 300-millisecond time steps between t=5 to t=36 seconds.

Second, each fitness case was multiplied by the reciprocal of the amplitude of the reference signals so that both reference signals (1 microvolt and 1 volt) were equally influential. Specifically, B was a factor that was used to normalize the contributions associated with the two step functions. B multiplies the difference e(t) associated with the 1-volt step function by 1 and multiplies the difference e(t) associated with the 1-microvolt step function by $10^6$.

Third, the integral contained an additional weight, A, that varied depending on e(t) and that heavily penalizes non-compliant amounts of overshoot. The function A weights all variation below the reference signal and up to 2% above the reference signal by a factor of 1.0 and heavily penalizes overshoots over 2% by a factor 10.0.

For this problem, the sixth component of the fitness measure was based on a disturbance rejection. The component was computed based on a time-domain analysis for 36.0 seconds. In this problem, the reference signal was held at a value of 0. A disturbance signal consisting of a unit step was added to the CONTROLLER_OUTPUT at time t=0 and the resulting disturbed signal was provided as input to the plant. For this problem, the detrimental contribution to fitness was 500/36 times the time required to bring the plant output to within 20 millivolts of the reference signal of 0 volts (i.e., to reduce the effect to within 2% of the 1-volt disturbance signal) assuming that the plant settles to within this range within 36 seconds. If the plant did not settle to within this range within 36 seconds, the detrimental contribution to fitness was 500 plus the absolute value of the plant output in volts times 500. For example, if the effect of the disturbance was never reduced below 1 volts, the detrimental contribution to fitness would be 1000.

Controllers that cannot be simulated by SPICE were assigned a high penalty value of fitness ($10^8$).

Control Parameters for Plant with Five-Second Delay

For this illustrative problem, the population size, M, was 500,000. The percentages of genetic operations on each generation on and after generation 5 were 47% one-offspring crossovers on internal points of the program tree other than numerical constant terminals, 9% one-offspring crossovers on points of the program tree other than numerical constant terminals, 9% one-offspring crossovers on numerical constant terminals, 9% reproductions, 1% mutations on points of the program tree other than numerical constant terminals, 20% mutations on numerical constant terminals, 1% subroutine creations, 1% subroutine duplications, and 1% subroutine deletions. In this problem, since all the programs in generation 0 had a minimal architecture consisting of just one result-producing branch, the appearance of automatically defined functions was accelerated by using an increased percentage for the architecture-altering operations prior to generation 5. Specifically, the percentages for the genetic operations on each generation up to and including generation 5 were 45% one-offspring crossovers on internal points of the program tree other than numerical constant terminals, 9% one-offspring crossovers on points of the program tree other than numerical constant terminals, 5% one-offspring crossovers on numerical constant terminals, 9% reproductions, 1% mutations on points of the program tree other than numerical constant terminals, 20% mutations on numerical constant terminals, 5% subroutine creations, 5% subroutine duplications, and 1% subroutine deletions.

A maximum size of 150 points (for functions and terminals) was established for each result-producing branch and a maximum size of 100 points was established for each automatically defined function.

The other parameters for controlling the runs of genetic programming are default values that are applied to many problems, such as those found in *Genetic Programming III: Darwinian Invention and Problem Solving* by John R. Koza, Forrest H Bennett III, David Andre, and Martin A. Keane, San Francisco, Calif.; Morgan Kaufmann Publishers, 1999.

Termination for Plant with Five-Second Delay

The maximum number of generations, G, is set to an arbitrary large number (e.g., 501) and the run was manually monitored and manually terminated when the fitness of many successive best-of-generation individuals appeared to have reached a plateau. The single best-so-far individual is harvested and designated as the result of the run.

Parallel Implementations for Plant with Five-Second Delay

For this problem, the processing logic generates and executes a run on a Beowulf-style parallel cluster computer system consisting of 1,000 Pentium II 350 MHz processors (each with 64 megabytes of RAM) arranged in a two-dimensional 25×40 toroidal mesh. The system has a Pentium II 350 MHz type computer as host. The processors are connected with a 100 megabit-per-second Ethernet. The processors and the host use the Linux operating system. The so-called distributed genetic algorithm or island model for parallelization was used (*Genetic Programming III: Darwinian Invention and Problem Solving* by John R. Koza, Forest H Bennett III, David Andre, and Martin A. Keane, San Francisco, Calif.; Morgan Kaufmann Publishing, 1999). That is, subpopulations (referred to here as demes) are situated at each of the processing nodes of the system. The population size may be, for example, Q=500 at each of the D=1,000 demes (semi-isolated subpopulations) so that the total population size, M, is 500,000. Generations are run asynchronously on each node. After the genetic operations are performed locally on each node, one boatload of emigrants, each consisting of B=8% (the intra-box migration rate) of the node's subpopulation (selected probabilistically on the basis of fitness) are dispatched to the processor housed in the same box, and three boatloads of emigrants, each consisting of B=2% (the inter-box migration rate) of the node's subpopulation (selected probabilistically on the basis of fitness) are dispatched to each of the three toroidally adjacent nodes in adjacent boxes.

Results for Plant with Five-Second Delay

The best individual in generation 0 for the run of this problem had a fitness of 1146.4.

Figure 20:
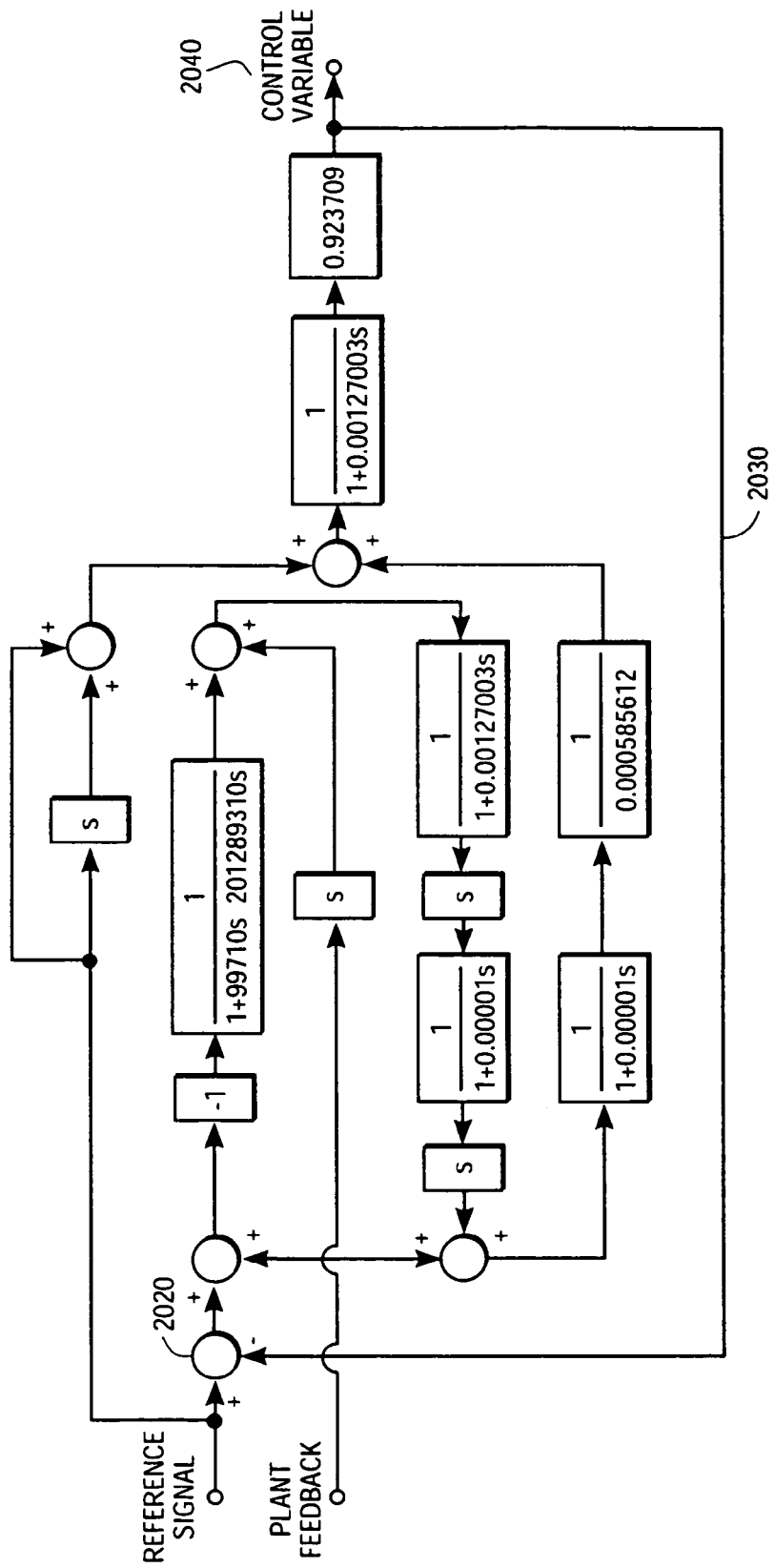
FIG. 20 shows feedback into the controller of the output of the best-of-generation controller from generation 82 in the form of a block diagram for plant with five-second delay

The best-of-generation individual from generation 82 (i.e., the individual with the best value of fitness for generation 82) had a fitness of 336.6. This best-of-generation individual's result-producing branch had 102 points and its four automatically defined functions had 5, 39, 5, and 14 points, respectively (for a total of 165 points). As can be seen in FIG. 20, this controller feeds its own output (the control variable 2040) back into the controller. Control variable 2050 is fed back via connection 2030 to subtraction block 2020 inside the controller. Note that this type of direct feedback of the controller output into the controller is different from (the more ordinary) feedback of the plant output into a controller.

The best-of-generation individual from generation 155 had a fitness of 927.93. This best-of-generation individual's result-producing branch had 147 points and its three automatically defined functions had 55, 11, and 50 points, respectively (for a total of 263 points). This individual scored 4 hits. This controller is shown in FIG. 21. Referring to FIG. 21, the inputs to the controller are reference signal 5000 and plant output 5090 and the output of the controller is control variable 5080.

This best-of-generation controller from generation 155 had internal feedback. The internal feedback forms a closed loop involving eight signal processing blocks (5050, 5032, 5034, 5036, 5038, 5040, 5042, and 5044). There is a cycle from any of these eight blocks back to itself. Specifically, the output of addition block 5050 is fed back internally via connection 5060 to takeoff point 5030. The signal at takeoff point 5030 is sent to two points, one of which is GAIN block 5032. The output of GAIN block 5032 is the input to GAIN block 5034. The output of GAIN block 5034 is one of the inputs to addition block 5036. The output of addition block 5036 is one of the two inputs to addition block 5038. The output of addition block 5038 is input to block 5040. The output of block 5040 is input to block 5042. The output of block 5042 is one of the inputs to addition block 5044. The output of addition block 5044 is one of the inputs to addition block 5050—thus completing the cycle.

The internal feedback inside the controller contained in the best-of-generation individual from generation 155 was created by a references automatically defined function ADF0 from the 147-point result-producing branch. There is also a reference to ADF0 inside the 55-point automatically defined function ADF0. This recursive reference creates the internal feedback. Note that this type of internal feedback within a controller is different from the (the more ordinary) feedback of the plant output into a controller.

For this problem, the best-of-run individual (i.e., the individual with the best fitness during the entire run) emerged in generation 156. This best-of-run individual from generation 156 had a fitness of 328.2 and scored 3 hits. The best-of-run individual's result-producing branch had 125 points and its four automatically defined functions had 5, 50, 3, and 56 points, respectively (for a total of 234 points). Because of its size (in comparison to the size of the best-of-generation individual form generation 82), this controller is not shown here. As shown in table 9, this best-of-run individual from generation 156 had only slightly better fitness than the best-of-generation individual from generation 82. All but 0.1 of the slightly improved fitness value (328.2. versus 336.6) of this considerably larger best-of-run individual from generation 156 arose from fitness case 5 (the disturbance test).

TABLE 9

Fitness of two individuals for plant with a five-second delay

|   | Best-of-generation individual from generation 82 | Best-of-run individual from generation 156 |
|---|---|---|
| 0 | 40.6 | 40.6 |
| 1 | 11.6 | 11.6 |
| 2 | 38.9 | 38.9 |
| 3 | 10.1 | 10.1 |
| 4 | 37.0 | 36.9 |
| 5 | 198.3 | 190.1 |
| TOTAL | 336.6 | 328.2 |

Two-Lag Plant Problem using Time-Varying Signals as Parameter Values

Several additional aspects are illustrated when parameter values of signal processing blocks are established by signals that potentially vary with time while the controller is operating.

The two-lag plant problem (described earlier) was rerun, while employing the fifth embodiment (described earlier) for establishing the parameter values for signal processing blocks. This particular run used perturbable numerical values and the parameter values of signal processing blocks were established by signals that potentially vary with time while the controller is operating.

Figure 25:
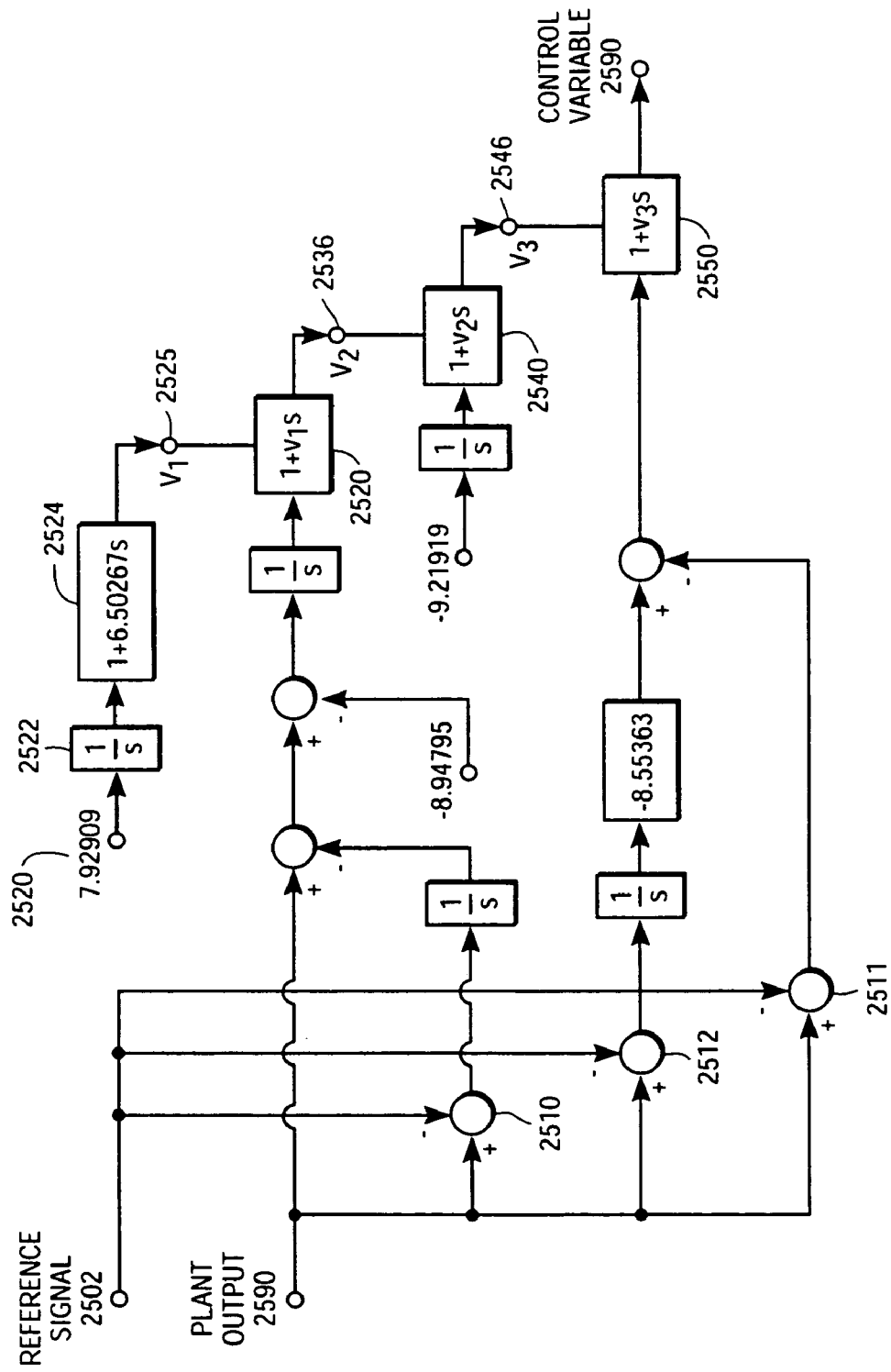
FIG. 25 shows the best-of-generation controller from generation 16 of a run in which time-varying signals are used to establish parameter values for signal processing blocks in a controller.

FIG. 25 shows the best-of-generation controller from generation 16 of this particular rerun. This controller has a fitness of 0.26. In the figure, the reference signal 2502 and the fed-back plant output 2590 are inputs to the controller, while control variable 2580 is the output (control variable) of the controller.

FIG. 25 shows some of the many variations and possibilities that may emerge within the scope of the present invention.

As can be seen in FIG. 25, the parameter value V1 (2526) for the two-argument LEAD block 2528 is established by 2520, 2522, and 2524. The constant 7.92969 (a perturbable numerical value) is fed into integration block 2522. The output of integration block 2522 is fed into LEAD block 2524 (whose time constant is 5.50257) to establish value V1. This value V1 (2526) then becomes the time constant of LEAD block 2528. Since signal 2520 is a constant-valued signal that is integrated over time, the result V1 (2526) is a linearly increasing value while the controller operates. That is, the time-constant for LEAD block 2528 varies during the time that the controller operates. Thus, LEAD block 2528 is a voltage-controlled LEAD function.

In addition, the first input of LEAD block 2528 is based on both reference signal 2502 and fed-back plant output 2590 and is thus also a time-varying signal. The output of LEAD block 2528 is labeled V2 (2536) and becomes the parameter value for LEAD block 2540. The output of LEAD block 2540 is labeled V3 (2546). Thus, LEAD block 2540 is a voltage-controlled LEAD function.

In turn, value V3 (2546) establishes the time-constant for LEAD block 2550. The first input of LEAD block 2550 is based on both reference signal 2502 and fed-back plant output 2590 and is a time-varying signal. The output of LEAD block 2550 is control variable 2580 (i.e., the overall output of the controller). Thus, LEAD block 2550 is a voltage-controlled LEAD function. In a similar way, the parameter value(s) of any other signal processing block (e.g., LAG, LAG2) can become voltage-controlled.

Note that both the fourth or fifth embodiment for establishing the parameter values of signal processing blocks enable any signal in the controller (e.g., any voltage) to vary the characteristics of any signal processing block possessing parameters during the time the controller is operating. Thus, when either the fourth or fifth embodiment for establishing the parameter values is being used, each LAG block may become a voltage-controlled LAG whose time-constant may vary during the time the controller is operating (and similarly for each LEAD block, each LAG2 block, and so forth). In contrast, the parameters of signal processing blocks (e.g., the time-constants of LAG, LEAD, and LAG2 blocks) in almost all conventional controllers are kept constant during the time the controller operates. Moreover, GAIN blocks (which multiply a time-domain signal by a fixed constant amplification factor) are very common in conventional controllers, whereas multipliers (which multiply two time-domain signals) are relatively rarer in conventional controllers. In other words, a common feature of the fourth and fifth embodiments is that the value of the parameters for signal processing blocks that possess parameters (such as LAG, LEAD, LAG2, and so forth) are partially (or potentially) dependent on time-varying signals available inside the controller (such as the plant outputs, the reference signals, the controller's own outputs, and the plant's internal states, if any) and that they are also partially (or potentially) dependent on global variables that may be available inside the controller (perhaps the temperature, the plant's production rate, line speed, flow rate, or the like, or some other free variable characterizing the operation of the plant). Genetic programming is capable of, and advantageous for, implementing such global variables. The fourth or fifth embodiment for establishing the parameter values of signal processing blocks thus greatly increase the flexibility of the topology of controllers that may be automatically created by the process of the present invention.

In FIG. 25, the reference signal 2502 is subtracted from the fed-back plant output 2590 in three places (at 2510, 2512, and 2514). The program tree for this best controller from generation 16 consists of an 82-point result-producing branch, but no automatically defined functions. That is, the three subtractions are implemented in this particular controller without resort to an automatically defined function and a takeoff point. Instead, three identical subtraction blocks are used. The result is equivalent to using an automatically defined function and a takeoff point.

It should be appreciated that there are many variations possible within the spirit the present invention based on dualities and transformations that are well known in the field of electrical engineering and control engineering, including transformations where current or frequency are employed.

Parallel Computer System

Parallel processing is advantageous, but not required, for implementation of the present invention because a considerable amount of computer time may be required to produce a satisfactory controller.

The process of the present invention is especially amenable to parallelization because of the uncoupled nature of the time-consuming fitness measurement for different individuals encountered during the run. In control problems, relatively little time is expended on tasks such as the creation of the initial population at the beginning of the run and the execution of the genetic operations during the run (e.g., reproduction, crossover, mutation, and architecture-altering operations). The task of measuring the fitness of each individual in each generation of the evolving population is usually the dominant component of the computational burden of a run of a problem of controller synthesis. Parallelization may be used with almost 100% efficiency by genetic programming.

Genetic programming may be efficiently parallelized using various approaches, including the distributed approach using semi-isolated subpopulations (described immediately below) or the "master-slave" approach by which time-consuming work (notably the fitness evaluation) is "farmed out" to the individual processing nodes of a parallel computer by a central supervisory processor and the results of the work then collected by the central supervisory processor. This "farming out" approach may be especially appropriate for parallel implementations of simulated annealing and hill climbing search algorithms.

The asynchronous island model for parallelization is advantageous for runs of genetic programming for the process of the embodiments described here. In this approach, the population for a given run is divided into semi-isolated subpopulations called demes. Each subpopulation is assigned to a separate processor of the parallel computing system. A variety of embodiments may be used to implement this approach. In one embodiment, the run begins with the random creation of the initial population and each individual in a subpopulation is randomly created locally on its local processor. Similarly, the genetic operations are performed locally at each processor. In particular, the selection of individuals to participate in crossover is localized to the processor. The time-consuming task of measuring the fitness of each individual is performed locally at each processor.

Upon completion of a generation (or other interval), a relatively small percentage of the individuals in each subpopulation are probabilistically selected (based on fitness) for emigration from each processor to other nearby processors. The processors of the overall parallel system operate asynchronously in the sense that generations start and end independently at each processor and in the sense that the time of migration is not synchronized. In one embodiment, the immigrants to a particular destination wait in a buffer at their destination until the destination is ready to assimilate them. The immigrants are then inserted into the subpopulation at the destination processor in lieu of the just-departed emigrants. The overall iterative process on the sending processor then proceeds to the next generation. The guiding principle in implementing this parallel approach is always to fully utilize the computing power of each processor. Thus, for example, if a full complement of immigrants has not yet been received when a processor is ready to assimilate immigrants, one advantageous embodiment is to make up the deficiency in immigrants with randomly chosen copies of the just-departed emigrants from that processor. Similarly, if a processor receives two groups of immigrants from a particular other processor before it finishes its current generation, another advantageous embodiment is that the later immigrants may overwrite the previous immigrants from the other processor. The inter-processor communication requirements of migration are low because only a modest number of individuals migrate during each generation and because each migration is separated by a comparatively long periods of time for fitness evaluation.

Because the time-consuming task of measuring fitness is performed independently for each individual at each processor, the asynchronous island model for parallelization delivers an overall increase in the total amount of work performed that is nearly linear with the number of independent processors. That is, nearly 100% efficiency is routinely realized when an evolutionary algorithm is run on a parallel computer system using the asynchronous island model for parallelization. This near-100% efficiency is in marked contrast to the efficiency achieved in parallelizing the vast majority of computer calculations.

In one embodiment, the processing logic generates and executes a run on a parallel Beowulf-style computer system consisting of 56 Dec Alpha® 533 megahertz (MHz) processors with 64 megabytes of Random Access Memory (RAM) arranged in a two-dimensional 7×8 toroidal mesh with a DEC Alpha® computer as host. The DEC Alpha® processors communicate by way of a 100 megabit-per-second Ethernet. The so-called distributed genetic algorithm or island model for parallelization is used (*Genetic Programming III: Darwinian Invention and Problem Solving* by John R. Koza, Forrest H Bennett III, David Andre, and Martin A. Keane, San Francisco, Calif.; Morgan Kaufmann Publishers, 1999). That is, subpopulations (referred to herein as demes) are situated at each of the processors of the system. The population size may be, for example, Q=20,000 at each of the D=56 demes, so that the total population size, M, is 1,120,000. The initial random subpopulations of generation zero are created locally at each processor. Generations are run asynchronously on each node. After the genetic operations are performed locally on each node, four boatloads of emigrants, each consisting of B=2% (the migration rate used in one embodiment of the system) of the node's subpopulation (selected on the basis of fitness) are dispatched to each of the four toroidally adjacent processors. The immigrants are assimilated into each destination processor just after that node dispatches its immigrants to its neighboring nodes.

A 56-node parallel system with a 533-MHz DEC Alpha® microprocessor at each processor operates at about 30 giga-hertz (GHz) in the aggregate. The DEC Alpha® processor has a total of four instruction units. Two of these are integer units and two are floating-point units. The instruction units are pipelined and able to produce a result on every clock cycle if the pipelines are kept full.

In one embodiment, the system is arranged as a computing cluster or Beowulf style system. The system has a host computer with a 533-MHz DEC Alpha® microprocessor with 64 megabytes of RAM (running the Linux operating system). The host contains a 4 giga-byte (GB) hard disk, video display, and keyboard. Each of the processors of the system contains a 533-MHz DEC Alpha® microprocessor with 64 megabytes (MB) of RAM. There is no disk storage at the processors. The processors do not directly access input-output devices or the host's file system. The processors also run the Linux operating system. The processors are arranged in a toroidal network with each processor communicating with four toroidally adjacent neighbors. The communication between processors is by means of 100 megabit-per-second Ethernet. A system such as this can be built with "Commodity Off The Shelf" (COTS) products.

Approximately half of 64 MB of RAM is available for the storage of the population (with the remainder housing the Linux operating system, the application software, and buffers for exporting and importing individuals, and other items of overhead). Memory is a potential constraining consideration for the genetic programming. For genetic programming, a population of 32,000 individuals, each occupying 1,000 bytes of RAM, can be accommodated with 32 MB of RAM. Using the commonly used one-byte-per-point method of storing individual program trees in genetic programming, each individual in the population can possess 1,000 points (functions or terminals). Each processor may, therefore, accommodate a population of 32,000 1,000-point individuals. Depending on the intended size of individuals in the population for the user's particular application, it may be desirable to install more than 64 MB of RAM on each processor.

The 100 megabit-per-second Ethernet is sufficient to handle the migration of individuals in most practical runs of genetic programming using the island model. Migration usually occurs at a low rate (e.g., about 2%) in each of four directions on each generation for each processor. For example, if the population size is 32,000 at each processor and 2% of the population migrates in each of four directions, then communication of 640 individuals (640,000 of data if each individual consists of 1,000 bytes) is required for every generation for each processor. If one generation is processed every 15 minutes (900 seconds), this amounts to transmission of 711 bytes per second for each processor. This inter-node communication does not tax a 100 megabit-per-second Ethernet. The Ethernet also easily handles the end-of-generation messages (usually involving less than 10,000 bytes each and occurring only once per generation) from each of the processors to the host processor (as well as other less frequent messages).

The DEC Alpha® 164LX processor is available on a motherboard with the ATX form factor. A standard mid-tower-style case for a DEC Alpha® motherboard with the AIX form factor is available as an off-the-shelf commodity product. Such a case solves the electromagnetic emission problems associated with a 533 MHz microprocessor as well as the heat dissipation requirements associated with the Alpha® chip. The use of standard cases does not minimize the space occupied by the system; however, it provides a highly cost-effective solution to the emission and heat problems. The standard 230 watt power supplies (produced and priced as a commodity product) are similarly cost-effective. Each processor has three fans (one for the Alpha® microprocessor chip, one for the power supply, and one for the case). The fan on the microprocessor contains a sensor that shuts down the node if it fails.

An Ethernet ("dumb") hub may be sufficient for a 10-node system. However, in a larger system, for example, (such as a 56-node system), Ethernet ("smart") switches are required in conjunction with the hubs. In one embodiment, a 16 port switch such as a Bay Networks Bay Stack 350T 16-port 10/100 BT Ethernet switch for every 15 processors is suitable.

An uninterruptable power supply (UPS) providing 15 minutes of support for the system is advisable.

Linux is the most common operating system used on individual nodes of Beowulf-style parallel computer systems (whether the nodes are Alpha® processors, Pentium® processors, or other processors). The Linux operating system is remarkably robust. The relatively small size of the Linux operating system obviates the need for disk storage at each processor. Since the main requirement for memory in genetic programming work is storage of the population and the relatively small genetic programming application, in one embodiment no hard disks are used at each processor. In this embodiment, diskless booting of the processors is handled by using the BOOTP protocol and configuring the host computer as a BOOTP server.

In one embodiment, the host computer receives the end-of-generation reports from each processor. The host creates an output file containing statistics about the run and all pace-setting individuals. In this embodiment, this file is stored on the hard disk of the host computer. Since communication between the host processor and the processors is by means of Ethernet, in one embodiment, the host computer need not be an Alpha® processor and need not employ the Linux operating system. In alternate embodiments, it is possible to have a heterogeneous mixture of processors with different types of computers, running different operating systems, at various nodes in the overall system.

In another embodiment, the parallel duster computer system consists of 1,000 Pentium II 350 MHz processors (each with 64 megabytes of RAM) arranged in a two-dimensional 25×40 toroidal mesh. The system has a Pentium II 350 MHz type computer as host. The processors are connected with a 100 megabit-per-second Ethernet. The processors and the host use the Linux operating system.

Figure 22:
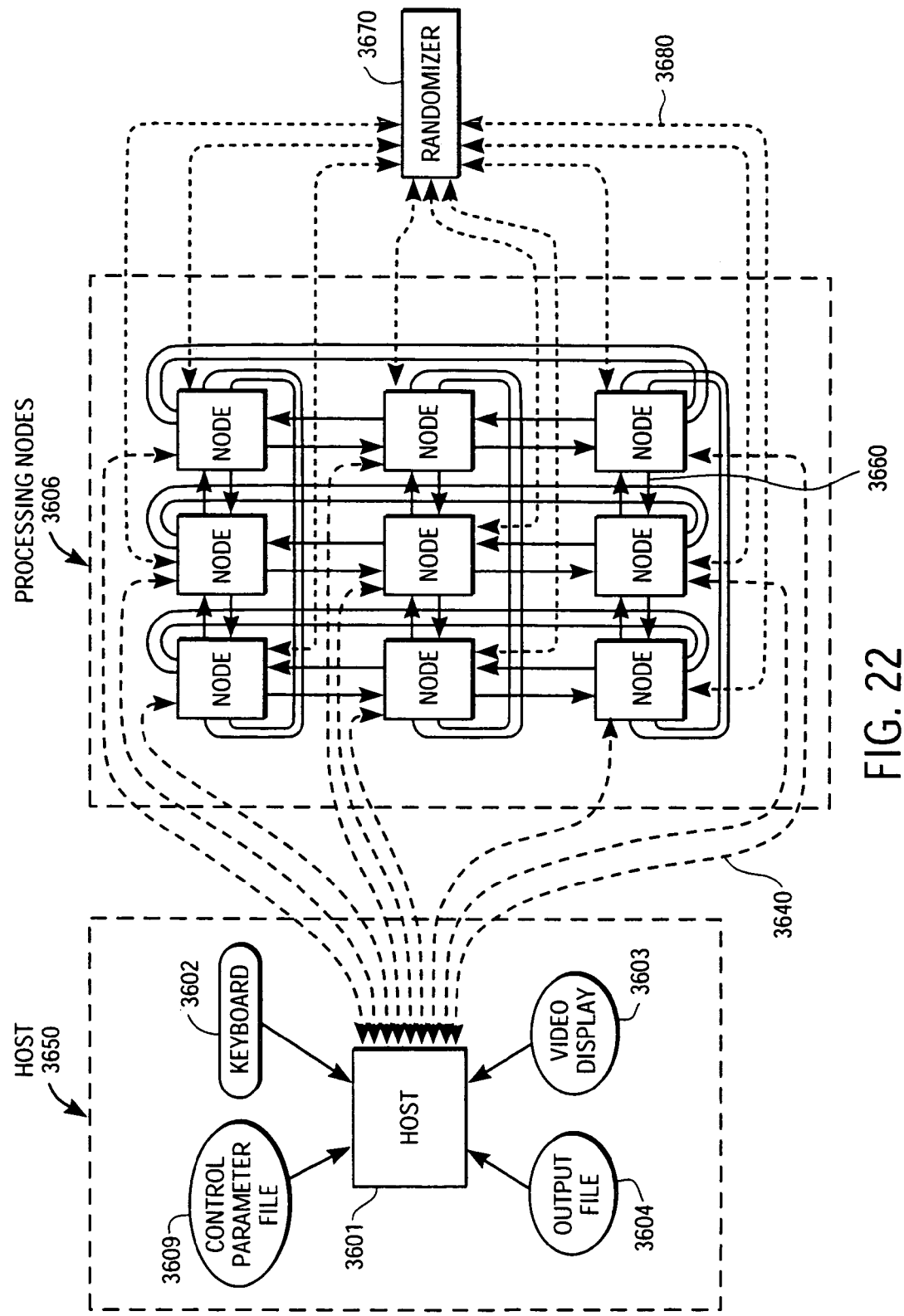
FIG. 22 illustrates the parallel genetic programming system.

FIG. 22 illustrates one embodiment of the physical elements of a parallel processing system. The various elements or the system are arranged in an overall structure consisting of the following:

(1) The Host 3650 consists of host processor 3601. Host processor 3601 has a keyboard 3602, a video display monitor 3603, and a large disk memory 3604. In one embodiment, there are three processes resident on Host processor 3601, namely a process for starting a run on each of the plurality of processors of the system, a process for collecting the results produced by the processors during the run, and a process for visually displaying and viewing the results being produced during a run.

(2) The group of processing nodes 3606 contains a plurality of processors of the parallel system. Only nine such processors are shown in this figure for reasons of space; however, the examples above were run on parallel systems involving 66 and 1,000 such processing nodes. In one embodiment, there are four processes that are resident on each processing node of the parallel system, namely a Monitor process, a Breeder process, an Exporter process, and an Importer Process. These processors are often referred to as processing nodes of the parallel system.

(3) Communication lines (shown as dotted lines in the figure) between the host 3601 and each of the processing nodes of the parallel system. One such communication line 3640 is indicated in the figure. In one embodiment, Ethernet is used for these communications lines.

(4) Communication lines (shown as solid lines in the figure) between the various processing nodes of the parallel system. These communications lines are arranged in a 3 by 3 toroidal arrangement in the figure in which each processing node has four neighbors (often called north, east, west, and south). One such communication line 3660 is indicated in the figure. In one embodiment, Ethernet is used for these communications lines.

(5) In one embodiment, there is a Randomizer 3670 is connected by communication lines (shown as dotted lines in FIG. 22) to each of processing nodes of the parallel system. In one embodiment, Ethernet is used for these communications lines.

Figure 23:
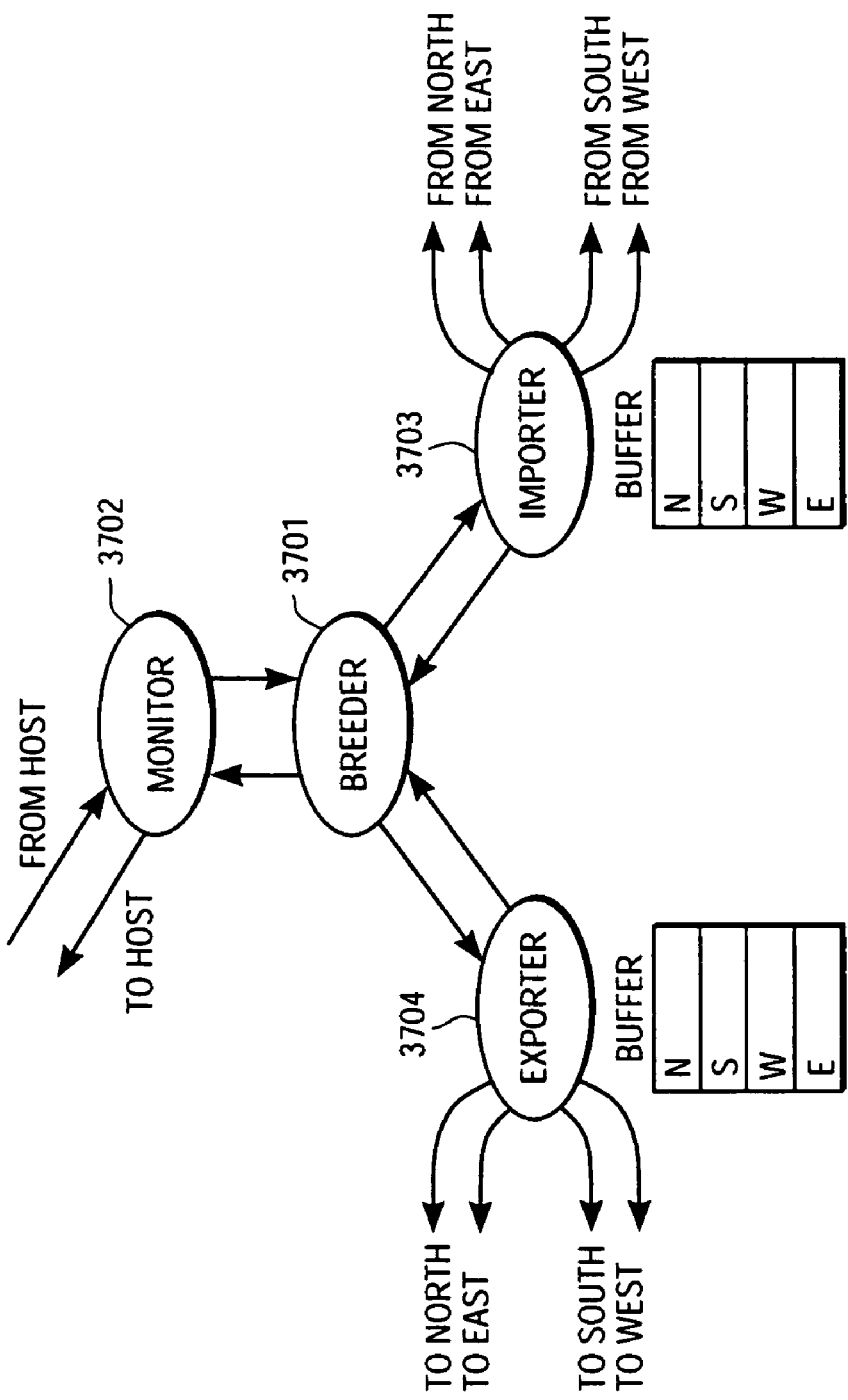
FIG. 23 illustrates the four processes resident on each node of one embodiment of a parallel genetic programming system.

FIG. 23 illustrates the four processes resident on each node of one embodiment of a parallel genetic programming system, namely the Monitor process 3702, the Breeder process 3701, the Exporter process 3704, and the Importer Process 3703. The primary process on each of the processing nodes is the Breeder process 3701, which executes the bulk of the steps of the search algorithm (genetic programming). The other three processes permit asynchronous communication between the processing nodes of the system. They allow the Breeder process 3701 to efficiently exploit the computational power of the processor at each processing node. The Monitor process of a given processing node communicates with the Starter process and Recorder Process of the host computer and the Breeder process of the processing node. The Breeder also communicates with the Importer and Exporter process of the processing node. In one embodiment (in which each processing node has four neighbors), the Exporter process has four buffers for briefly storing emigrants that are about to leave for the four toroidally adjacent processing nodes. Also, the Importer process has four buffers for storing arriving immigrants they (asynchronously) arrive from the four toroidally adjacent processing nodes.

Figure 24:
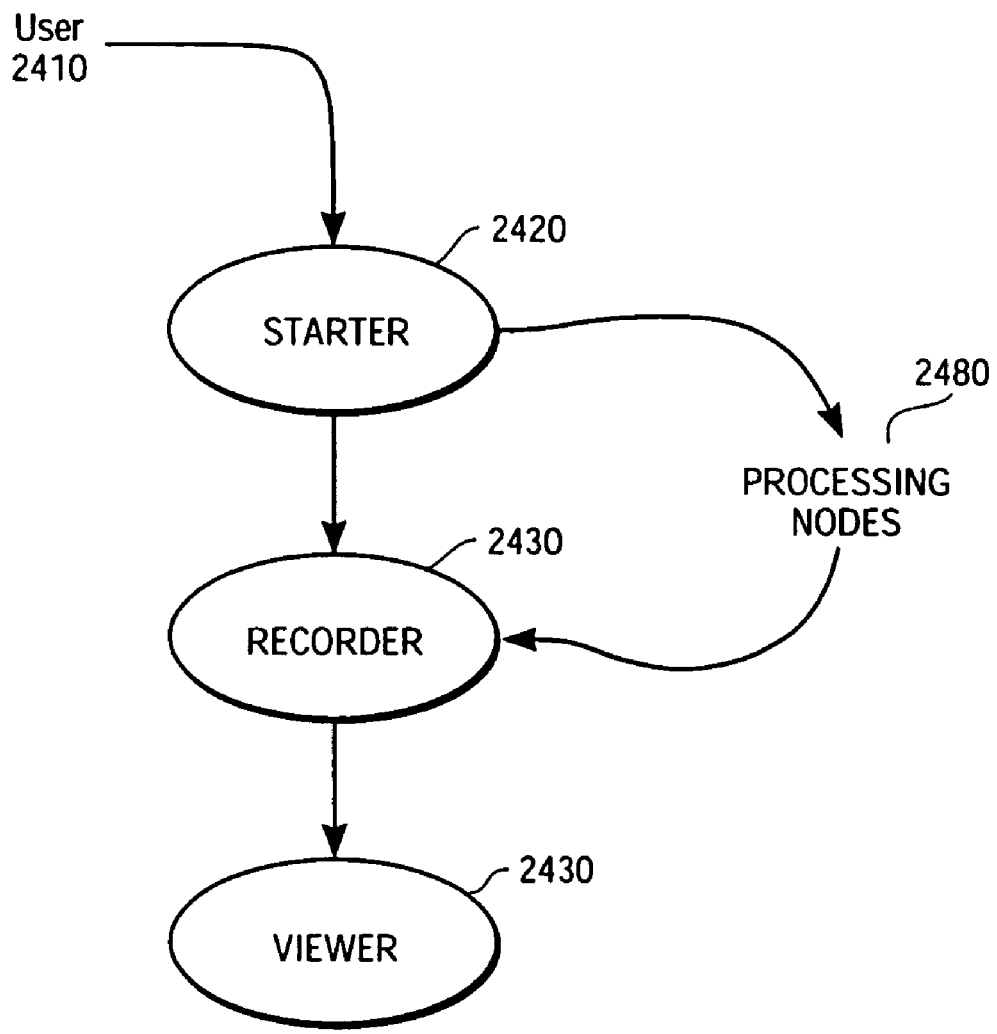
FIG. 24 illustrates the processes resident on the host processor of one embodiment of a parallel genetic programing system.

FIG. 24 illustrates the processes resident on the host processor of one embodiment of a parallel genetic programming system. In one embodiment, the host processor houses various processes, including the Starter process, the Recorder process, and the Viewer process.

Three Processes Resident on the Host Processor

As shown in FIG. 24, the human user 2410 initiates a run by sending a command to the Starter process 2420 resident on the host processor. This command may be entered on a keyboard 3602 (FIG. 22) and the control parameters for the run may be supplied from a file (such as 3609 in FIG. 22).

The Starter process 2420 (FIG. 24) at the host processor then initiates the run by sending a start-up message to each of the processing nodes 2480 (FIG. 24) of the parallel system. The start-up message is communicated on the Ethernet and is received by the Monitor process 3702 (FIG. 23) at each processing node of the parallel system.

The Starter process 2420 (FIG. 24) also sends a message that starts up a Recorder process 2430 on the host processor. After doing this, the Starter process 2420 performs no additional function during the run.

As each generation is completed on each processing node of the parallel system, each processing node sends an end-of-generation message to the Recorder process at the host processor. The end-of-generation message is communicated on the Ethernet and is sent by the Monitor process 3702 (FIG. 23) of the reporting processing node. In an alternate embodiment, these reporting messages are sent less frequently than once per generation per processing node. The Recorder process stores some of the information in the received end-of-generation messages on an output file 3604 (FIG. 22). In one embodiment, the entire end-of-generation message is stored onto the output file only if the report contains a new best value of fitness (a so-called pace-setting individual) or a new best number of hits.

In one embodiment, there is a Viewer process 2430 (FIG. 24) associated with the Recorder process of the host processor. The Recorder process starts up the Viewer process. The Recorder process extracts important information from each end-of-generation message and communicates this information to the Viewer process. This information may consist of an indication that the Recorder process has received a message from each processor of the parallel system within a specified time period. For example, if there are 1,000 processors, the Viewer process may present to the human user (by means of a video monitor 3603, for example) a 25 by 40 array of colored squares wherein the color of each square indicates that the Recorder process has received a message from the particular processor within the previous 15 minutes. For example, in one embodiment, a square in this array is green if the Recorder process has received a message from a particular processor within the past 15 minutes; yellow if the Recorder process has received a message from a particular processor between 15 and 60 minutes ago; and red if the Recorder process has not received a message from a particular processor in the past hour.

This 25 by 40 array of colored squares provides the human user with an overall picture of activity in the parallel system and may indicate that a particular processor is not operating.

In a similar manner, the Recorder process may additionally communicate to the Viewer process the best value of fitness achieved on each processing node of the parallel system. A second 25 by 40 array of squares may be presented to the human user, wherein each square contains the best numerical value of fitness achieved at that particular processor of the parallel system. Likewise, another 25 to 40 array of squares may be presented to the human user, wherein each square contains the best number of hits achieved at that particular processor of the parallel system.

The Recorder process may also communicate to the Viewer process other important summary information about the run, including, for example, the best overall value of fitness and the best overall number of hits achieved so far during the run. In one embodiment, this information may be presented as a graph.

The division of functions between the Starter process and the Recorder process enables results to be collected from a run even if the host computer fails momentarily during the run. If the host computer fails during the run, the end-of-generation messages directed to the Recorder process will be lost. However, as soon as the host computer and the Recorder process is restored, the Recorder process begins anew collecting information about the latest generation of each processing node of the parallel system. In one embodiment, the Recorder process adds information to output file 3604 (FIG. 22) by incrementing the contents of the file. Thus, although some intermediate information may be lost, the final result of the run will not be lost.

The function of the Starter process and the Recorder process may, in one embodiment, be combined into one process at the host computer. However, it is preferable to divide the above-described functions between the Starter process and the Recorder process since this division of functions means that the continuous operation is not required of the host computer. This division adds a degree of fault-tolerance to the overall parallel system. Additional fault tolerance may be achieved by employing two processors, each containing a Recorder process (with all messages from the processing nodes being sent to both Recorders).

The Starter process sends the initial start-up messages to each of the processing nodes. In one embodiment, at the beginning of a run of genetic programming, the Starter process reads in a set of control parameters from file 3609 on Host computer 3601. Then, the Starter process sends a start-up message to the Monitor process of each processing node (which will, in turn, be sent by the Monitor process to the Breeder process of that particular processing node).

In one embodiment, the start-up message includes the following:
- the size of the subpopulation that is to be created at the processing node,
- the control parameters for creating the initial random subpopulation at that processing node, including the particular method of generation (from the several commonly used methods) and the maximum size for each initial random individual (including the size of each result-producing branch in generation 0 and, if applicable, the size of each function-defining branch in generation 0),
- the control parameters specifying the percentage of each genetic operation (e.g., reproduction, crossover, mutation, architecture-altering) to be performed for each generation,
- the maximum number of generations to be run at the processing node,
- the perpetual run number for the run (for administrative purposes),
- if applicable, the number of primed individuals to be seeded into the initial population at generation 0 of each processing node (and, if there are any, the primed individuals themselves),
- if applicable, to the method of representing numerical parameters for the run, the common system-wide table of about constant numerical values for the problem,
- if applicable, to the particular problem, the actual fitness cases for the run or the common system-wide randomizer seed for creating fitness cases for the run at each processing node, and
- various additional control parameters that may be required for the particular problem or run.

After sending the start-up message, the Starter process terminates.

Four Processes Resident on Each Processing Node

There are four processes resident on each node of one embodiment of the parallel genetic programming system, namely the Monitor process, the Breeder process, the Exporter process, and the Importer Process.

Monitor Process

The Monitor process of each processing node begins by continually awaiting a start-up message from the Starter process of the Host processor. Once it has received the start-up message, it continually awaits messages from the Breeder process of its processing node (and, if applicable, random numbers from Randomizer 3670).

Upon receipt of a start-up message from the Starter process, in one embodiment, the Monitor process passes this start-up message to the Breeder process on its processing node.

The Monitor process also passes the following messages from the Breeder process of its processing node to the Recorder process of the Host:

End-of-Generation: The end-of-generation message contains the best-of-generation individual for the current subpopulation on the processing node and statistics about that individual such as its fitness and number of hits. This message also contains statistical information, such as the fitness (and hits) for the worst-of-generation individual of the processing node, the average fitness (and hits) for the subpopulation as a whole, and the variance of the fitness (and hits) of the subpopulation as a whole. There are numerous alternative embodiments of this message entailing different information or different frequencies of providing the information.

Eureka: The eureka message announces that the processing node has just created an individual in its subpopulation that satisfies the success predicate of the problem (if one is prespecified) and contains the just-created individual and various statistics about it. If the termination criterion for the problem specifies that the run ends with achievement of the success predicate, this message may also (if appropriate) cause the Breeder process to terminate. The just-created individual from the processing node will ordinarily become the best-of-run individual for the entire run. In control problems (and other optimization problems), there may not be a termination criteria for a problem (since the best attainable values may not be known in advance).

Trace: The trace message announces that the Breeder process has reached certain milestones in its code (e.g., received its start-up message, completed creation of the initial random subpopulation for the node, encountered a problem-specific event that is worthy of reporting to the Host).

Error: The error message announces that the Breeder process has encountered certain anticipatable error conditions.

The Breeder Process

After the Breeder process of a processing node receives the start-up message, in one embodiment, it performs the following steps in connection with generation 0:
- Creates the initial random subpopulation of individuals for the node.
- If necessary, creates the fitness cases for the problem at the processing node.

In the main generational loop, the Breeder process of a processing node iteratively performs the following steps:
- Fitness Evaluation Task: Evaluates the fitness of every individual in the subpopulation at its processing node,
- Emigration: Selects (typically probabilistically, based on fitness) a small number of individuals to be emigrants at the end of generation (except generation 0) and sends these emigrants to a buffer of the Exporter process of the processing node,
- Immigration: Assimilates the immigrants currently waiting in the buffers of the Importer process of the processing node,
- Reporting: Creates an end-of-generation report for the subpopulation at the processing node,
- Genetic Operations: Performs the genetic operations (e.g., reproduction, crossover, mutation, architecture-altering) on the subpopulation at the processing node.

In one embodiment, the entire system runs until one individual is created that satisfies the success predicate of the problem, until every processing node has completed an originally targeted maximum number of generations to be run, or until the run is manually terminated (usually because the run appears to be making no additional progress). A processing node that reaches the originally targeted maximum number of generations before all the other nodes have reached that originally targeted generation is permitted to continue running up to an absolute maximum number of generations (usually 120% of the originally targeted maximum number).

For most problems the amount of computer time required to measure the fitness of individuals varies considerably among subpopulations. The presence of just one or a few time-consuming programs in a particular subpopulation can dramatically affect the amount of computer time consumed by one processing node in running a generation. Any attempt to synchronize the activities of the algorithm at the various processing nodes would require slowing every processing node to the speed of the slowest. Therefore, each processing node operates asynchronously with respect to all other processing nodes. After a few generations, the various processing nodes of the system will typically be working on different generations.

Because of the asynchrony of the generations on nearby processors, the exporting and importing of migrating programs take place in a manner that does not require that the breeder ever wait for a neighboring process to finish a generation. To allow the Breeder process nearly uninterrupted computing time, the Exporter process and the Importer process handle the communication. The Monitor process acts in a similar fashion for communication with the Host. The use of multiple processes is also important in preventing potential communication dead-locks.

The Exporter Process

In one embodiment, emigrants are sent to the four toroidally adjacent nodes (north, east, south, and west) of the given processing node. The Exporter process interacts with the Breeder process of its processing node toward the end of the Breeder's main generational loop for each generation (except generation 0). At that time, the Breeder sends four groups of emigrants to a buffer of the Exporter process. The number of individuals in each group is specified by the migration percentage, B. The Exporter process then immediately sends one group of emigrants to the Importer process of each of the four neighboring processing nodes. Because the Exporter process is a separate process, it enables the Breeder process to immediately resume its work without waiting for the successful completion of shipment of the emigrants to their destinations.

It should be appreciated that there are many possible arrangements for communicating between processing nodes of a parallel system. In one embodiment, communication between processing nodes is by means of Ethernet. The destination of a message is determined by its address. Thus, a message can be directed to any processing node of the parallel system by means of the Ethernet. The choice of 4 neighbors arranged in a toroidal geometry has proved to be productive.

The Importer Process

The purpose of the Importer is to store incoming groups of emigrants in its four buffers until the Breeder is ready to incorporate them into the subpopulation at the processing node. In one embodiment, when a group of immigrants arrives from any one of the four neighboring processing nodes, the Importer consumes the immigrants from that channel and places them into the buffer associated with that neighbor.

The Importer process interacts with the Breeder process when the Breeder process is ready to assimilate immigrants. In one embodiment, this occurs immediately after the Breeder process deals with the Exporter process for a given generation. At that time, the Breeder process calls for the contents of the Importer's four buffers. If all four buffers are full, the four groups of immigrants replace the emigrants that were just dispatched by the Breeder process to the Exporter process of the node. In one embodiment, if fewer than four buffers of the Importer process are full, the new immigrants replace as many of the just-dispatched emigrants as possible.

Because the generations run asynchronously at each processing node, one of the neighbors of a particular processing node may complete processing of two generations while the given processing node completes only one generation. In that event, the second group of immigrants will arrive from the faster neighbor at the Importer process at the destination node before the buffers of the Importer process at the destination node have been emptied by the Breeder process of that node. In that event, in one embodiment, the newly arriving immigrants overwrite the previously arrived, but not yet assimilated, immigrants in that particular buffer. This overwriting is usually advantageous because individuals coming from a later generation of a given processing node are likely to be more fit than immigrants from an earlier generation of the same node.

Randomizer Processor

Runs of probabilistic algorithms typically require prodigious numbers of random integers at various stages.

Consider first the process of creating the initial generation (generation 0) of the population for a run genetic programming. Each individual in the population of individuals is a rooted, point-labeled tree with ordered branches. A typical tree consists of many functions and terminals (points). For example, in the two-lag plant problem described above, the maximum number of functions and terminals was established at 150 for the result-producing branch alone. The process for generating a the tree begins by randomly choosing (using a uniform random probability distribution) one function or terminal from the combined set of functions and terminals. The chosen function or terminal becomes the label for the root of the tree. For example, if there are 15 functions in the function set and four terminals in the terminal set (as there are, for example, for the result-producing branch used in the two-lag plant problem described above, excluding consideration, for the moment, of the arithmetic-performing subtrees), a random integer from 1 to 19 would be chosen in order to create the root of the overall program tree. Whenever a point of the tree being grown is labeled with a function possessing z arguments, then z lines are created to radiate out from that point. Then, for each radiating line, one function or terminal from the combined set of (19) functions and terminals is randomly chosen (using a uniform random probability distribution) to be the label for the endpoint of that radiating line. Whenever a function is chosen to be the label for any such endpoint, the generating process continues recursively as just described. Whenever a terminal is chosen to be the label for any point, that point becomes an endpoint of the tree and the generating process is terminated for that point. Creation of typical single individual program tree for generation 0 of the illustrative two-lag plant problem might entail choosing 50, 100, or even 150 random integers (each between 1 and 19). If a population of 1,000 individuals were created on each processing node of a parallel computer system, then (using 100 points as a rough approximate average size) 100,000 random integers (each between 1 and 19) are required to create the initial random population for one processing node. If, for sake of argument, each of these 100,000 random integers were represented by one byte (the maximum using the one-byte-per-point representation scheme that is used herein), then 100,000 bytes are required. Ideally, the choice of each of these 100,000 random integers should be statistically independent from each other.

During each generation of a run of genetic programming, various generation operations are performed (e.g., mutation, crossover, architecture-altering operations, and reproduction).

In the mutation operation, the same random growth process used to create individuals for the initial generation (generation 0) of the population is used to grow new subtrees within the individuals (in lieu of a subtree in the individual program tree). If the mutation operation is performed on 1% of the population (i.e., 10 of 1,000 individuals residing on one processing node of the parallel system) and the average new subtree is of size 50, then 500 random integers (each between 1 and 19) might be required. If, for sake of argument, each of these 500 random integers were represented by one byte (the maximum using the one-byte-per-point representation scheme that is used herein), then 500 bytes of random integers are required for the mutation operation for each generation. Ideally, the choice of each of these 500 random integers should be statistically independent from each other.

If the crossover operation is performed with a probability of 86% on the individuals in the population (i.e., on 860 of 1,000 individuals residing on one processing node of the parallel system), then two crossover points must be chosen for each crossover operation that is to be performed. The individuals participating in crossover are, in general, of different sizes (although each would have 150 or fewer points in the present example). If one parent participating in crossover has, for example, 97 points and the second parent has, for example, 136 points, then one integer between 1 and 97 must be randomly chosen and another integer 1 and 136 must be randomly chosen in order to perform the crossover operation on these two parents. The choice of both of these random integers should be statistically independent from each other. The execution of 860 crossovers thus requires 1,720 random integers. Ideally, each of the 1,720 random integers should be statistically independent from each other.

The architecture-altering operations that are performed on each generation also require a modest additional number of random integers. In total, about 2,220 random integers are required for the genetic operations for each generation. If, for sake of argument, each of these random integers were represented by 8 bits, then 2,220 bytes of random integers are required for the genetic operations for each generation.

In addition, the selection of individuals to participate in the genetic operations requires random numbers. Two individuals are selected for each crossover (i.e., 1,720 selections for a population of 1,000 on each processing node with a crossover probability of 86%). One individual is selected for each mutation, reproduction, and architecture-altering operation (i.e., 140 selections for a population of 1,000). If each of these 1,860 selections is made from a tournament of size seven, then 13,020 random integers (each between 1 and 1,000) is required. If, for sake of argument, each of these 13,020 random integers were represented by 10 bits, then 16,275 bytes of random integers are required for selection for each generation.

In total, about 18,495 random bytes are required to service a single generation of a run of genetic programming with a population with 1,000 individuals. Assume, for sake of argument, that processing of each individual (notably the fitness evaluation) requires 1 second of computer time (a reasonable amount of time for the type of problems described above). Then, in round numbers, a generation involving 1,000 individuals consumes about 17 minutes of computer time. This translates into about 85 generations per day and about 1,572,075 random integers for the 85 generations. With these assumptions, a one-day run of generation programming with 85 generations requires about 1,672,000 random bytes (i.e., about 100,000 for generation 0 and about 1,572,075 for the 85 succeeding generations) for each processing node with 1,000 individuals.

In a parallel system consisting of 1,000 processing nodes (each with 1,000 individuals), 1,672,000,000 random bytes might required per day for a run of genetic programning (using the control parameters of the two-lag plant problem described above). This requirement is equivalent to about 19,820 random bytes per second.

The search techniques of simulated annealing and hill-climbing each employ a problem-specific mutation (modification) operation. Again assuming that processing of each individual (notably the fitness evaluation) requires 1 second of computer time, then 84,400 individuals could be processed per day on a processor for a run of simulated annealing or hill-climbing. If, for sake of argument, the probabilistic mutation operation were similar to the mutation operation of genetic programming, then 500 random bytes are required per second (i.e., a considerable number, but less than that required by a run of genetic programming).

It is common to generate the random integers required by probabilistic algorithms using a pseudo-random number generator. A pseudo-random number generator is a well-defined, deterministic, known, reproducible mathematical algorithm that produces what appear to be random numbers (i.e., numbers that satisfy various statistical tests that the user may think appropriate). In many implementations of probabilistic algorithms, the 1,672,000 random integers (required by one processing node for the illustrative one-day run involving 85 generations of genetic programming) are produced by 1,672,000 successive invocations of a single pseudo-random number generator starting with a single seed at generation 0. Thus, each of the 1,672,000 random integers are related to each other by a chain of 1,672,000 successive invocations of the pseudo-random number generator. Streams of numbers produced by pseudo-random number generators are anything but random, and the term "pseudo-random number generator" is an oxymoron.

It is known that the results of probabilistic algorithms can be biased because the shortcomings in pseudo-random number generators. This bias can be eliminated by using a stream of random numbers that are statistically independent from one another. Such a stream of random numbers can be created by a certain physical processes (such as one based on neutron emissions or a chaotic electronic circuit). There are several commercially available boards (that can be inserted into PC type computer) that produce a stream of statistically independent random number by a physical process. On such product is produced by ComScire Inc. whose model J20KP produces 2,500 bytes per second. Other boards from this particular supplier can produce 67,500 bytes per second.

In one embodiment of the present invention, there is a separate processor 3670 in FIG. 22 (or, in an alternate embodiment, a separate process) that is dedicated to the task of producing random integers using a physical process. The random integers are communicated to the Monitor process of each of processing nodes of the parallel system by communication lines, such as communication line 3680 (shown as dotted lines in FIG. 22). The transmission of the random integers to particular processing nodes is done in bulk (i.e., by packaging 2,000 random numbers into one message). Upon receiving a package of random numbers, the Monitor process passes the random numbers to the Breeder process of its processing node. The Breeder process stores the random numbers in a buffer and draws on them as needed.

In order to maximize the overall usage of the computational resources of each processing node of the parallel system, the Breeder is programmed so that it never waits on the Randomizer process for an updated supply of random number seeds. Instead, it is generally preferable to reuse random integers (accessing them in different orders) as opposed to stopping the activity of the Breeder.

Hierarchical Patterns of Migration

When 66 processing nodes are used, one satisfactory implementation is to use a 6 by 11 toroidal arrangement in which each processing nodes sends 8% of its population (chosen probabilistically based on fitness) to its four neighboring processing nodes (i.e., 2% to four other nodes). This approach continues to be workable when larger numbers of processing nodes are used. For example, with 1,000 processing nodes, a 25 to 40 toroidal arrangement may be used.

However, as the number of processing nodes increases, it becomes advantageous to employ a hierarchical pattern of migration. For example, when 1,000 processing nodes are used, it is advantageous to subdivide the 25 by 40 arrangement into a new 5 by 10 arrangement in which each component of the new 5 by 10 arrangement is itself a 4 by 5 subgroup of processing nodes. As before, each of the 1,000 processing nodes continues to send emigrants to its four adjacent neighbors. However, if the destination of the emigrants from a particular processing node is inside its own subgroup, the migration rate is increased (from the low rate of 2% to, for example, a higher rate such as 8%), whereas if the destination is outside its own 4 by 5 subgroup, the migration rate remains at the low rate of 2%. The net effect of 8% migration in each of (up to) four directions within the 4 by 5 subgroup is, after just a few generations with, that the entire subpopulation of the subgroup (say 20,000 is there are 1,000 individuals at each processing node) is highly intermixed (and effectively a single subpopulation).

There are two advantages to such a hierarchical pattern of migration.

First, inter-processor communication is less taxing because the vast majority of inter-processor traffic is within a small local group of processing nodes. Thus, the parallel system becomes more scalable. Moreover, this small local group of processing nodes can, in practice, be serviced by an inexpensive Ethernet hub (as opposed to a more expensive Ethernet switch).

Second, the effective subpopulation (deme) size is larger (20,000 versus 1,000 in the above example). Thus, there is a greater variety of subtrees and genetic material available for breeding at the deme level.

It should be appreciated that the number of processing nodes and the arrangement of subgroups used in the above example are merely illustrative of the general principle of hierarchical patterns of migration, namely that there is a relatively large amount of migration within each group of nodes, but a relatively low amount of migration between the groups.

CONCLUSION

A general automated method for synthesizing the design of both the topology and parameter values for a controller has been described. The automated method automatically makes decisions concerning the total number of signal processing blocks to be employed in the controller, the type of each signal processing block, the topological interconnections between the signal processing blocks, the values of all parameters for the signal processing blocks, and the existence, if any, of internal feedback between the signal processing blocks within the controller. The general automated method may simultaneously optimize prespecified performance metrics (such as minimizing the time required to bring the plant outputs to the desired values as measured by the integral of the time-weighted absolute error or the integral of the squared error), satisfy time-domain constraints (such as overshoot, disturbance rejection, limits on control variables, and limits on state variables), and satisfy frequency domain constraints (bandwidth).

Several variations in the implementation of genetic programming that are useful for the automated synthesis of controllers have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A system-implemented interactive process for creating the at least one controller that satisfies prespecified design goals, the at least one controller for controlling a plant by producing at least one control signal to control plant operation, the iterative process invoking iterations, each of which comprises:
    ascertaining the degree to which each controller programmatic entity in the population of controller programmatic entities satisfies the prespecified design goals;
    selecting from among the population of controller programmatic entities, wherein a controller specified by one controller programmatic entity that satisfies the prespecified design goals to a greater degree than another controller specified by another programmatic entity is more likely to be preferred, wherein the prespecified design goals are partially based on a rise time; and
    creating at least one candidate controller programmatic entity by applying an operation to modify at least one of the selected controller programmatic entities.

2. An article of manufacture having one or more recordable media with executable instruction thereon which, when executed by a system, cause the system to create at least one controller that satisfies prespecfied design goals through a system-implemented iterative process, the at least one controller for controlling a plant by producing at least one control signal to control operation of the plant, the iterative process invoking iterations, each of which comprises:
    selecting at least one controller programmatic entity from among a group of one or more controller programmatic entity, the at least one controller programmatic entity representing a controller having a set of processing blocks that includes at least one of a lead block, a lag block, and integrator block, a differential input integrator, and a differentiator, wherein a controller specified by one controller programmatic entity that satisfies the prespecified design goals to a greater degree than another controller specified by another programmatic entity is more likely to be preferred, wherein the prespecified design goals are partially based on a rise time; and creating at least one candidate controller programmatic entity by applying an operation to modify at least one of the selected controller programmatic entities.

3. A system for creating at least one controller that satisfies prespecified design goals through an iterative process, the at least one controller for controlling a plant by producing at least one control signal to control operation of the plant operation to match a reference signal indicative of a desired response for a plant, the system comprising and iteratively invoking:

means for dividing a population of controller programmatic entities into a plurality of subpopulations of controller programmatic entities, wherein each controller represented by the controller programmatic entities processes time domain input signals as part of generating the reference signal;

means for ascertaining a degree to which each controller programmatic entity in the subpopulation of controller programmatic entities satisfies the prespecified design goals using a separate processor for each of the subpopulations;

means for selecting from among the subpopulation of controller programmatic entities, wherein a controller specified by one controller programmatic entity that satisfies the prespecified design goals to a greater degree than another controller specified by another programmatic entity is more likely to be preferred, wherein the prespecified design goals are partially based on a rise time; and means for creating at least one candidate controller programmatic entity by applying an operation to modify at least one of the selected controller programmatic entities.

4. A system-implemented interactive process for creating the at least one controller that satisfies prespecified design goals, the at least one controller for controlling a plant by producing at least one control signal to control plant operation, the iterative process invoking iterations, each of which comprises:

ascertaining the degree to which each controller programmatic entity in the population of controller programmatic entities satisfies the prespecified design goals;

selecting from among the population of controller programmatic entities, wherein a controller specified by one controller programmatic entity that satisfies the prespecified design goals to a greater degree than another controller specified by another programmatic entity is more likely to be preferred, wherein the prespecified design goals are partially based on a settling time; and creating at least one candidate controller programmatic entity by applying an operation to modify at least one of the selected controller programmatic entities.

5. An article of manufacture having one or more recordable media with executable instruction thereon which, when executed by a system, cause the system to create at least one controller that satisfies prespecfied design goals through a system-implemented iterative process, the at least one controller for controlling a plant by producing at least one control signal to control operation of the plant, the iterative process invoking iterations, each of which comprises:

selecting at least one controller programmatic entity from among a group of one or more controller programmatic entity, the at least one controller programmatic entity representing a controller having a set of processing blocks that includes at least one of a lead block, a lag block, and integrator block, a differential input integrator, and a differentiator, wherein a controller specified by one controller programmatic entity that satisfies the prespecified design goals to a greater degree than another controller specified by another programmatic entity is more likely to be preferred, wherein the prespecified design goals are partially based on a settling time; and creating at least one candidate controller programmatic entity by applying an operation to modify at least one of the selected controller programmatic entities.

6. A system for creating at least one controller that satisfies prespecified design goals through an iterative process, the at least one controller for controlling a plant by producing at least one control signal to control operation of the plant operation to match a reference signal indicative of a desired response for a plant, the system comprising and iteratively invoking:

means for dividing a population of controller programmatic entities into a plurality of subpopulations of controller programmatic entities, wherein each controller represented by the controller programmatic entities processes time domain input signals as part of generating the reference signal;

means for ascertaining a degree to which each controller programmatic entity in the subpopulation of controller programmatic entities satisfies the prespecified design goals using a separate processor for each of the subpopulations;

means for selecting from among the subpopulation of controller programmatic entities, wherein a controller specified by one controller programmatic entity that satisfies the prespecified design goals to a greater degree than another controller specified by another programmatic entity is more likely to be preferred, wherein the prespecified design goals are partially based on a settling time; and means for creating at least one candidate controller programmatic entity by applying an operation to modify at least one of the selected controller programmatic entities.

7. A system-implemented interactive process for creating the at least one controller that satisfies prespecified design goals, the at least one controller for controlling a plant by producing at least one control signal to control plant operation, the iterative process invoking iterations, each of which comprises:

ascertaining the degree to which the at least one controller programmatic entity satisfies the prespecified design goals, said at least one controller programmatic entity representing a controller comprising a set of processing blocks;

selecting at least one controller programmatic entity from among a group of one or more controller programmatic entity, wherein a controller specified by one controller programmatic entity that satisfies the prespecified design goals to a greater degree than another controller specified by another programmatic entity is more likely to be preferred; and creating at least one candidate controller programmatic entity by applying an operation to modify at least one of the selected controller programmatic entities, wherein that at least one candidate controller programmatic entity represents a controller having a voltage controlled gain.

8. An article of manufacture having one or more recordable media with executable instruction thereon which, when executed by a system, cause the system to create at least one controller that satisfies prespecified design goals through a system-implemented iterative process, the at least one controller for controlling a plant by producing at least one control signal to control operation of the plant, the iterative process invoking iterations, each of which comprises:

selecting at least one controller programmatic entity from among a group of one or more controller programmatic entity, the at least one controller programmatic entity representing a controller having a set of processing blocks that includes at least one of a lead block, a lag block, and integrator block, a differential input integrator, and a differentiator, wherein a controller specified by one controller programmatic entity that satisfies the prespecified design goals to a greater degree than another controller specified by another programmatic entity is more likely to be preferred; and creating at least one candidate controller programmatic entity by applying an operation to modify at least one of the selected controller programmatic entities, wherein that at least one candidate controller programmatic entity represents a controller having a voltage controlled gain.

9. A system for creating at least one controller that satisfies prespecified design goals through an iterative process, the at least one controller for controlling a plant by producing at least one control signal to control operation of the plant operation to match a reference signal indicative of a desired response for a plant, the system comprising and iteratively invoking:

means for dividing a population of controller programmatic entities into a plurality of subpopulations of controller programmatic entities, wherein each controller represented by the controller programmatic entities processes time domain input signals as part of generating the reference signal;

means for ascertaining a degree to which each controller programmatic entity in the subpopulation of controller programmatic entities satisfies the prespecified design goals using a separate processor for each of the subpopulations;

means for selecting from among the subpopulation of controller programmatic entities, wherein a controller specified by one controller programmatic entity that satisfies the prespecified design goals to a greater degree than another controller specified by another programmatic entity is more likely to be preferred; and means for creating at least one candidate controller programmatic entity by applying an operation to modify at least one of the selected controller programmatic entities, wherein that at least one candidate controller programmatic entity represents a controller having a voltage controlled gain.

10. A system-implemented interactive process for creating the at least one controller that satisfies prespecified design goals, the at least one controller for controlling a plant by producing at least one control signal to control plant operation, the iterative process invoking iterations, each of which comprises:

ascertaining the degree to which the at least one controller programmatic entity satisfies the prespecified design goals, said at least one controller programmatic entity representing a controller comprising a set of processing blocks;

selecting at least one controller programmatic entity from among a group of one or more controller programmatic entity, wherein a controller specified by one controller programmatic entity that satisfies the prespecified design goals to a greater degree than another controller specified by another programmatic entity is more likely to be preferred; and creating at least one candidate controller programmatic entity by applying an operation to modify at least one of the selected controller programmatic entities, wherein that at least one candidate controller programmatic entity represents a controller having a voltage controlled lag2.

11. An article of manufacture having one or more recordable media with executable instruction thereon which, when executed by a system, cause the system to create at least one controller that satisfies prespecified design goals through a system-implemented iterative process, the at least one controller for controlling a plant by producing at least one control signal to control operation of the plant, the iterative process invoking iterations, each of which comprises:

selecting at least one controller programmatic entity from among a group of one or more controller programmatic entity, the at least one controller programmatic entity representing a controller having a set of processing blocks that includes at least one of a lead block, a lag block, and integrator block, a differential input integrator, and a differentiator, wherein a controller specified by one controller programmatic entity that satisfies the prespecified design goals to a greater degree than another controller specified by another programmatic entity is more likely to be preferred; and creating at least one candidate controller programmatic entity by applying an operation to modify at least one of the selected controller programmatic entities, wherein that at least one candidate controller programmatic entity represents a controller having a voltage controlled lag2.

12. A system for creating at least one controller that satisfies prespecified design goals through an iterative process, the at least one controller for controlling a plant by producing at least one control signal to control operation of the plant operation to match a reference signal indicative of a desired response for a plant, the system comprising and iteratively invoking:

means for dividing a population of controller programmatic entities into a plurality of subpopulations of controller programmatic entities, wherein each controller represented by the controller programmatic entities processes time domain input signals as part of generating the reference signal;

means for ascertaining a degree to which each controller programmatic entity in the subpopulation of controller programmatic entities satisfies the prespecified design goals using a separate processor for each of the subpopulations;

means for selecting from among the subpopulation of controller programmatic entities, wherein a controller specified by one controller programmatic entity that satisfies the prespecified design goals to a greater degree than another controller specified by another programmatic entity is more likely to be preferred; and means for creating at least one candidate controller programmatic entity by applying an operation to modify at least one of the selected controller programmatic entities, wherein that at least one candidate controller programmatic entity represents a controller having a voltage controlled lag2.

* * * * *